US010521188B1

(12) United States Patent
Christie et al.

(10) Patent No.: US 10,521,188 B1
(45) Date of Patent: Dec. 31, 2019

(54) MULTI-USER TV USER INTERFACE

(71) Applicant: Apple Inc.

(72) Inventors: Gregory N. Christie, San Jose, CA (US); Alessandro Sabatelli, San Francisco, CA (US); William M. Bachman, San Jose, CA (US); Imran Chaudhri, San Francisco, CA (US); Jeffrey L. Robbin, Los Altos, CA (US); Jim A. Young, Livermore, CA (US); Joe Howard, San Jose, CA (US); Marcel Van Os, San Francisco, CA (US); Patrick L. Coffman, San Francisco, CA (US); Stephen O. Lemay, Palo Alto, CA (US); Jeffrey Ma, Redwood City, CA (US); Lynne Kress, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/276,633

(22) Filed: Sep. 26, 2016

Related U.S. Application Data

(63) Continuation of application No. 15/224,370, filed on Jul. 29, 2016, now abandoned, which is a
(Continued)

(51) Int. Cl.
*G06F 3/16* (2006.01)
*H04N 21/422* (2011.01)
*H04N 21/431* (2011.01)

(52) U.S. Cl.
CPC ......... *G06F 3/167* (2013.01); *H04N 21/4222* (2013.01); *H04N 21/42203* (2013.01); *H04N 21/4316* (2013.01)

(58) Field of Classification Search
CPC ........ H04N 21/42203; H04N 21/4222; H04N 21/4316; G06F 3/167
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002

OTHER PUBLICATIONS

Matthew Panzarino, "Apple announces voice activated Siri assistant feature for iOS 5, integrates Wolfram Alpha and Wikipedia", Oct. 4, 2011, thenextweb.com, pp. 1-6.*
(Continued)

*Primary Examiner* — Nicholas T Corbo
(74) *Attorney, Agent, or Firm* — Kubota & Basol LLP

(57) ABSTRACT

Systems and methods for a media content system. A media content provider includes storage for storing and serving video content to subscribers. The media content provider records and or otherwise stores video content from around the world. The system includes display devices configured to identify and tailor content to multiple individual users. Each user may have individual settings which provide for a customized viewing environment and experience. The system is configured to identify users of the system in order to tailor the content as appropriate. In addition, identification of users allows for the identification of the subscription content that corresponds to the user. Based upon identification of a user and corresponding subscription, the user's subscription content may be streamed to any location. In this manner, the
(Continued)

users subscribed content may follow the user from home to a friend's house, or elsewhere.

45 Claims, 42 Drawing Sheets

Related U.S. Application Data continuation of application No. 14/271,179, filed on May 6, 2014, which is a continuation of application No. 14/141,240, filed on Dec. 26, 2013, now abandoned.

(60) Provisional application No. 61/800,889, filed on Mar. 15, 2013, provisional application No. 61/747,658, filed on Dec. 31, 2012.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,170,931 B2 | 5/2012 | Ross et al. | |
| 8,299,889 B2 | 10/2012 | Kumar et al. | |
| 8,479,122 B2 | 7/2013 | Hotelling et al. | |
| 8,516,525 B1 | 8/2013 | Jerding et al. | |
| 8,613,023 B2 | 12/2013 | Narahara et al. | |
| 2003/0126600 A1 | 7/2003 | Heuvelman | |
| 2005/0012599 A1 | 1/2005 | DeMatteo | |
| 2005/0186988 A1 | 8/2005 | Lim et al. | |
| 2006/0029374 A1* | 2/2006 | Park | G11B 27/002 386/241 |
| 2006/0197753 A1 | 9/2006 | Hotelling | |
| 2006/0271968 A1 | 11/2006 | Zellner | |
| 2006/0282856 A1 | 12/2006 | Errico et al. | |
| 2007/0157220 A1* | 7/2007 | Cordray | H04H 60/65 725/9 |
| 2007/0204057 A1 | 8/2007 | Shaver et al. | |
| 2008/0189742 A1 | 8/2008 | Ellis et al. | |
| 2009/0119754 A1 | 5/2009 | Schubert | |
| 2010/0009629 A1 | 1/2010 | Jung et al. | |
| 2010/0211636 A1 | 8/2010 | Starkenburg et al. | |
| 2010/0229194 A1 | 9/2010 | Blanchard et al. | |
| 2010/0293586 A1 | 11/2010 | Rodrigues et al. | |
| 2011/0119715 A1* | 5/2011 | Chang | G08C 17/02 725/53 |
| 2011/0154305 A1 | 6/2011 | LeRoux et al. | |
| 2011/0289064 A1* | 11/2011 | Lebeau | G06F 17/3087 707/706 |
| 2012/0272261 A1 | 10/2012 | Reynolds et al. | |
| 2013/0014159 A1 | 1/2013 | Wiser et al. | |
| 2013/0033643 A1* | 2/2013 | Kim | G06F 3/017 348/563 |
| 2013/0326554 A1 | 12/2013 | Shkedi | |
| 2014/0088952 A1 | 3/2014 | Fife et al. | |
| 2014/0109204 A1 | 4/2014 | Papillon et al. | |

OTHER PUBLICATIONS

Bohn, D. (Jan. 6, 2014). "Rebooting webOS: how LG rethought the smart TV," located at: http://www.theverge.com/2014/1/6/5279220/rebooting-webos-how-lg-rethought-the-smart-tv, last visited: Feb. 24, 2014, seven pages.

Grey, M. (Jun. 11, 2013). "Comcast's new X2 platform moves your DVR recordings from the box to the cloud," located at: http://www.engadget.com/2013/06/11/comcast-x2-platform/ last visited: Feb. 24, 2014, fifteen pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated May 29, 2015, for U.S. Appl. No. 14/271,179, filed May 6, 2014, 23 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Dec. 15, 2016, for U.S. Appl. No. 14/271,179, filed May 6, 2014, nine pages.

Non-Final Office Action dated Sep. 21, 2017, for U.S. Appl. No. 14/271,179, filed May 6, 2014, eleven pages.

Non-Final Office Action dated Oct. 3, 2017, for U.S. Appl. No. 15/224,370, filed Jul. 29, 2016, thirteen pages.

Non-Final Office Action dated Jul. 23, 2018, for U.S. Appl. No. 15/943,316, filed Apr. 2, 2018, eight pages.

\* cited by examiner

FIG. 28

MULTI-USER TV USER INTERFACE

CROSS-REFERENCE TO RELATED APPLICATIONS

This application is a continuation of U.S. patent application Ser. No. 15/224,370, filed Jul. 29, 2016, which is a continuation of U.S. patent application Ser. No. 14/271,179, filed May 6, 2014, which is a continuation of U.S. patent application Ser. No. 14/141,240, filed Dec. 26, 2013, which claims benefit of: U.S. Provisional Patent Application No. 61/800,889, filed Mar. 15, 2013; and U.S. Provisional Patent Application No. 61/747,658, filed Dec. 31, 2012, the entire disclosures of which are incorporated herein by reference for all purposes.

BACKGROUND OF THE INVENTION

Field of the Invention

This invention relates to multimedia systems, and more particularly, to delivery of media content.

Description of the Relevant Art

For many years, broadcast television was the sole provider of video content to viewer's homes across the globe. As time has passed, and particularly with the advent of the Internet, numerous other sources of video content have arisen. In addition to broadcast television, cable television and satellite based television providers have begun providing access to video on demand and other audio and video content. In addition, special purpose set-top boxes, such as that provided by Roku®, provided a gateway for viewer's to access other sources of video content not provided by their television service provider. With such boxes, viewers were able to connect to these other content providers in order to obtain desired video content. At present, there are countless video providers in the marketplace. In addition, music and other audio content is available through various communication channels. Many are subscription based services, and some provide free content. While the explosion of video content providers in the marketplace may seem a boon for viewer's, the large number of choices and providers complicates the viewing experience.

In view of the above, improved media content delivery systems, methods and mechanisms are desired.

SUMMARY OF EMBODIMENTS

Systems and methods for a media content delivery service are contemplated.

Embodiments are contemplated in which a system includes display devices configured to identify individual users and tailor content accordingly. Each user may have individual settings which provide for a customized viewing environment and experience. The system is configured to identify users of the system in order to tailor the content as appropriate. In various embodiments, users of the system may be registered with the system and have settings established which are particular to the given user. Particular users may be identified based on user input such as login information or biometric data. In addition, identification of users allows for the identification of subscription content that corresponds to the user. Based upon identification of a user and corresponding subscription, the user's subscription content may be streamed to any location. In this manner, the users subscribed content may follow the user from home to a friend's house, or elsewhere.

In addition to the above, multiple users of a given system may each have a television viewing environment tailored to their desires. For example, express settings may be established for users which define the types of content allowed for that user. Additionally, such settings may establish what functions are permitted by each user. In addition to the above, identification of individual users allows for personal viewing histories, friends, and otherwise. Based on such histories and friends, recommendations and further tailoring of content may be made.

These and other embodiments are contemplated and will be appreciated upon reference to the following description and drawings.

BRIEF DESCRIPTION OF THE DRAWINGS

FIG. 28 depicts one embodiment of a video display and user interface.

Figure 1:
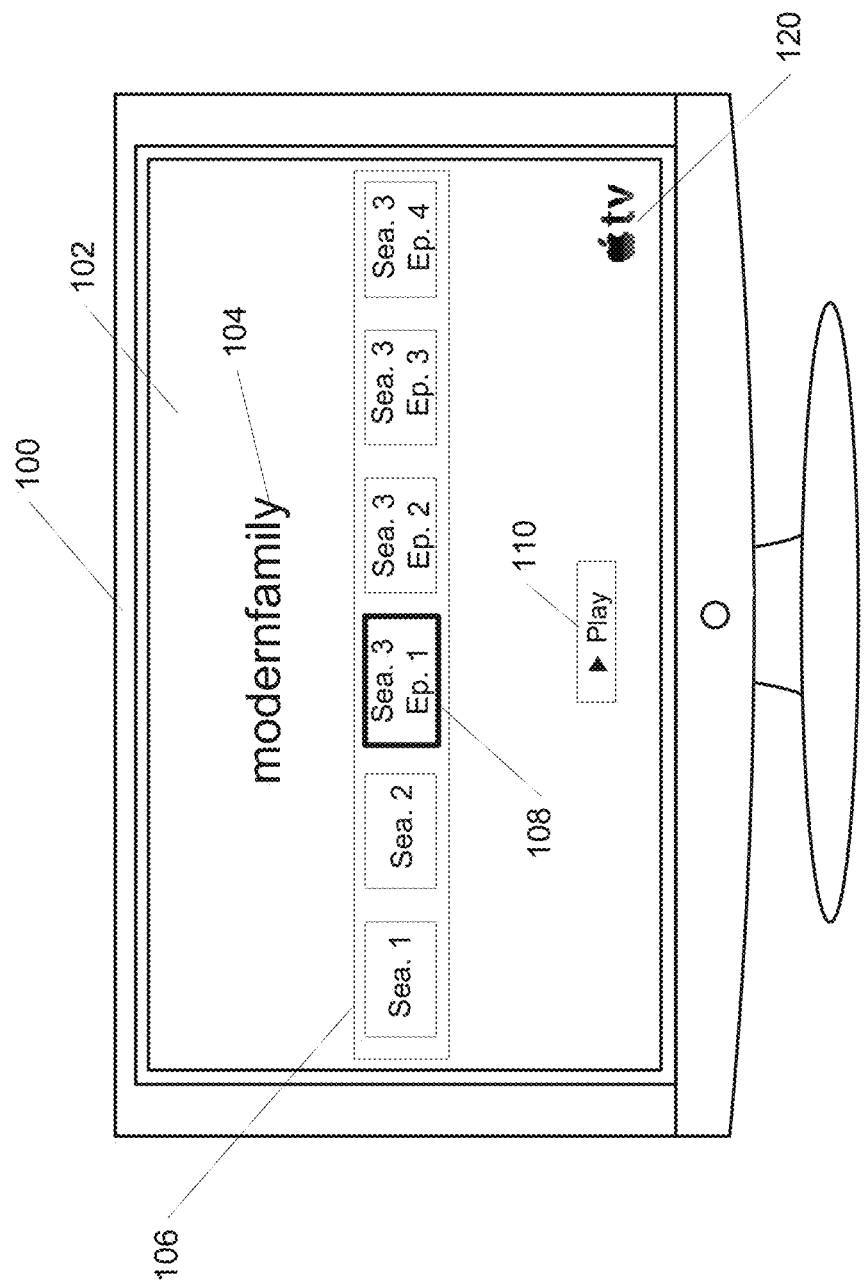
FIG. 1 depicts one embodiment of a video display.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of a television 100 and television display 102 is shown. In the example shown, the television display 102 is displaying video content related to a television show. In particular, the title 104 of a television show is depicted along with an episode bar 106 and play icon 110. In the embodiment shown, the content depicted by the display 102 is provided according to a subscription a viewer has with a television subscription service. In one embodiment, this television subscription service is an Apple TV® service indicated by the icon 120. In various embodiments, the title 104, bar 106, and icon 110 may be generated as an overlay on top of another image, such as a still picture, video content, animation, or otherwise. Such overlays may be produced by a set-top box, circuitry incorporated into the television 100 itself, or a provider of video content (e.g., the Apple TV service). In other embodiments, rather than an overlay, the title 104, bar 106, and/or 110 may be integrally generated as part of an image or video displayed on the display portion 102 of the television. As used herein, "overlay" is intended to include not only the generation of overlays on top of other content, by the content that is integrally generated as part of the video content as well.

As shown in the example, bar 106 includes six images which correspond to subject matter related to the show titled 104 above. As shown, subject matter corresponding to three seasons of the show ("modernfamily") are depicted. In particular, images corresponding to season 1 (Sea. 1), season 2 (Sea. 2), and season 3 (Sea. 3) are shown. For season 3, separate images are shown to correspond to particular episodes of season 3; namely, episodes 1-4 (Ep. 1-Ep. 4). In various embodiments, the images depicted within the bar 106 may be still images or video corresponding to the related season or episode, or otherwise.

Also shown in FIG. 1, one of the particular images 108 is indicated to have "focus". As is understood by those skilled in the art, "focus" generally refers to the selection of a graphical element on a display in order to display information related to the selected item, prepare the item for further selection in order to further traverse a graphical user interface, and so on. In this example, focus is illustrated by the use of a broader outline on image 108 than is used for the other images within bar 106. Numerous other alternative ways for indicating focus are known in the art, such as the use of different lighting, colors, animations, etc. All such alternatives are contemplated. Focus in this case may be used to identify a particular image within bar 106 which is intended as a target when the play icon 110 is selected by a user. In this manner, selecting play 110 while image 108 is selected (i.e., has focus) may result in episode 1 of season 3 of the modernfamily television series being played on the display 102.

While FIG. 1 depicts seasons and episodes of a television series available for viewing, what is not shown to the television viewer in this example is that the content corresponding to the images in bar 106 has been aggregated from multiple sources corresponding to multiple subscriptions. As used herein, subscriptions to these multiple services may be referred to as secondary subscriptions, while a subscription to the service corresponding to the display 102 (e.g., the Apple TV service) may be referred to as the primary subscription. In various embodiments, the primary subscription may be to Apple TV in which case Apple TV may be referred to as the "primary provider", and the other multiple service providers may be referred to as "secondary providers". It is noted that in some cases, a secondary provider may not provide all of the content to which it provides access. In some embodiments, a subscription with a secondary provider simply gives a viewer the right to access the data from a different provider. Various such alternatives are possible and are contemplated. In contrast to the scenario depicted in FIG. 1, in a typical scenario a viewer may have a subscription to a service such as the NETFLIX service which provides television, movie, and other video content. When displaying available content for viewing, the NETFLIX service displays content available from NETFLIX. Alternatively, a service such as the TIVO® service may depict content available from multiple sources corresponding to multiple subscriptions. However, when accessing such content, the viewer accesses a particular service provider in order to obtain the desired content assuming the viewer has a subscription. In such a case, the TIVO service simply points the viewer to a service which provides content. The viewer than connects to that service to obtain content. In contrast to the above, not only does bar 106 in FIG. 1 identify content corresponding to multiple providers which may require multiple secondary subscriptions, all of the corresponding content has been aggregated by the provider of the service that corresponds to the primary subscription (e.g., Apple TV).

Figure 2:
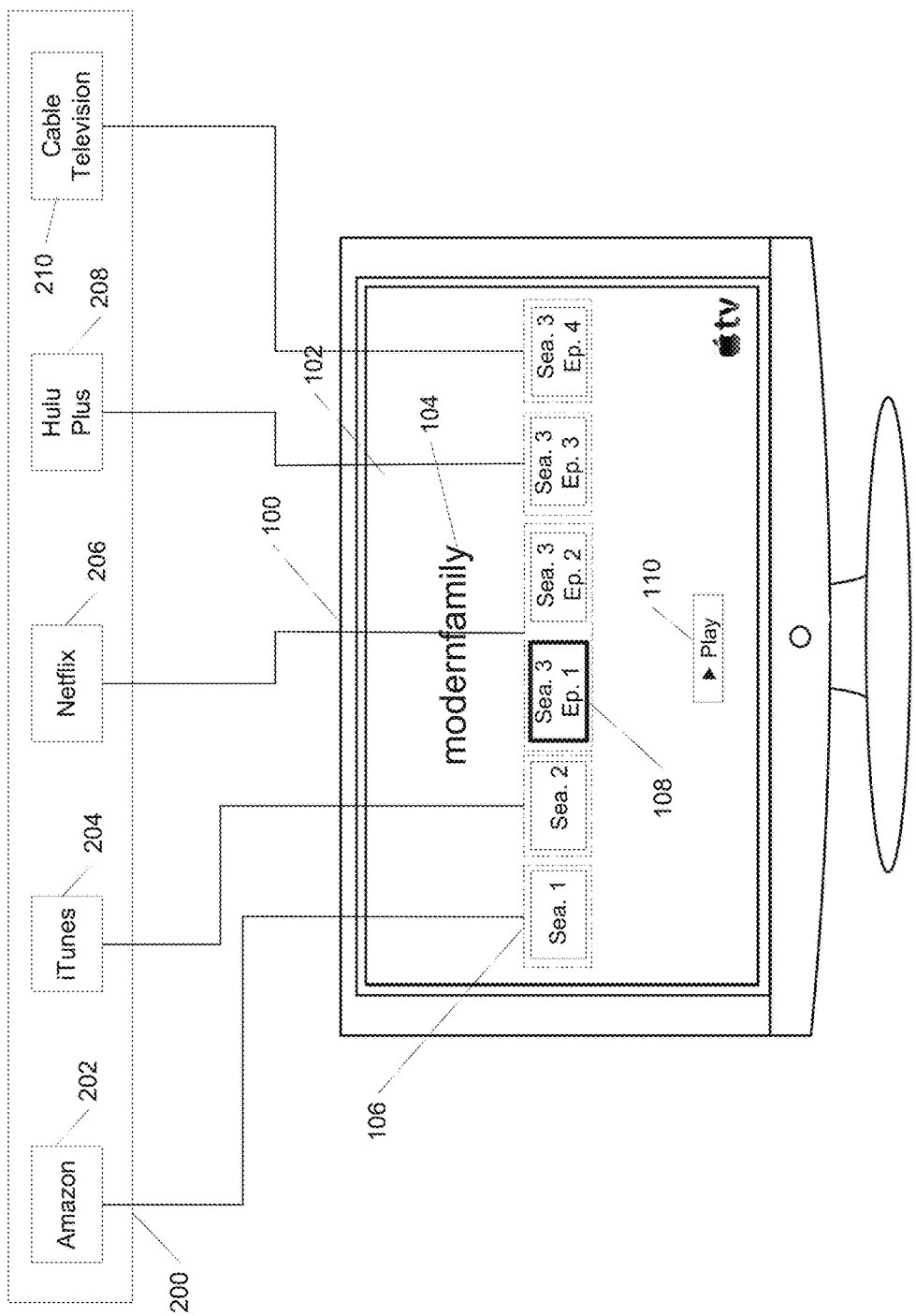
FIG. 2 depicts one embodiment of a video display and secondary sources.

For example, FIG. 2 illustrates the television 100 and display 102 of FIG. 1 with like items having identical reference numerals. FIG. 2 illustrates that the content identified within bar 106 corresponds to different subscription based services 200. For example, season 1 (Sea. 1) is available from the Amazon® service 202, season 2 (Sea. 2) is available from the Apple iTunes® service 204, episodes 1 and 2 of season 3 are available from the Netflix® service 206, episode 3 of season 3 is available from the Hulu Plus® service 208, and episode 4 of season 4 is available from a cable television service 210. In the example shown, a viewer of the display 102 has a subscription to a service provided by the source of the display 102. For example, the viewer may have a subscription to an Apple TV® service (the primary subscription). In various embodiments, the Apple TV service has recorded or otherwise obtained and aggregated content corresponding to all of the sources/providers shown in block 200. Such content may have been obtained directly from the providers themselves, or otherwise. In such an embodiment, whether the viewer selects to view episode 3 or episode 4 of season 3 (each of which corresponds to a different provider and subscription), or any of the other content shown in block 106, the content will be provided by the Apple TV service.

Figure 3:
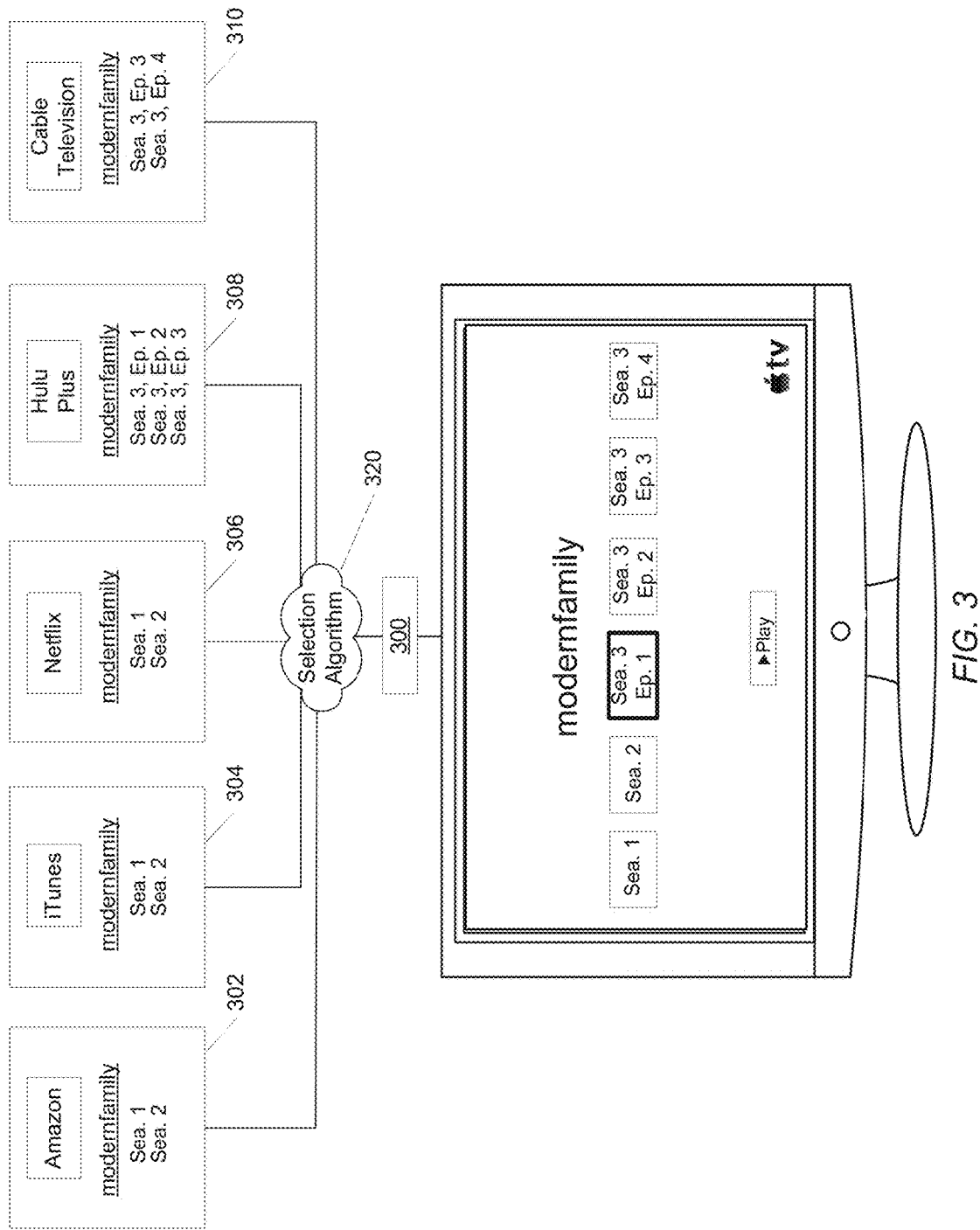
FIG. 3 depicts one embodiment of a video display and secondary sources.

FIG. 3 illustrates one embodiment in which a selection algorithm is used for determining what content is shown as available. Such an algorithm(s) may also be used to select particular content for display when multiple options are available. For example, as shown in FIG. 3, each of the services/providers (302, 204, 306, 308, 310) depict relevant content available corresponding to the modernfamily television series. As can be seen, there is significant duplication among the services in available content. As such, a selection algorithm 320 may be used to select from among the available content. Also, shown in this example is a set-top box 300 coupled to the television. In various embodiments, selection algorithm may include hardware and/or software based processes performed at a server(s) (now shown in FIG. 3), in the set-top box or television itself, at a content provider, or any combination thereof. For example, there may be multiple options available for the episode 1, season 3. This particular episode is available from both provider 308 and provider 310. In addition, each of these providers may have this particular episode available in high definition (HD), standard definition (SD). Other options may be available as well. Given the various options, selection of which to display as being available may be made. Alternatively, if selecting "play" by the viewer causes the episode to immediately begin playing automatically, then a selection algorithm may be needed to determine which is provided. Whichever option is selected, it will have been stored by the primary subscription service and provided by this primary subscription service (e.g., Apple TV) rather than one of the services/providers (302, 204, 306, 308, 310). Further details regarding the above mentioned selection algorithms will be discussed in greater detail below.

Figure 4:
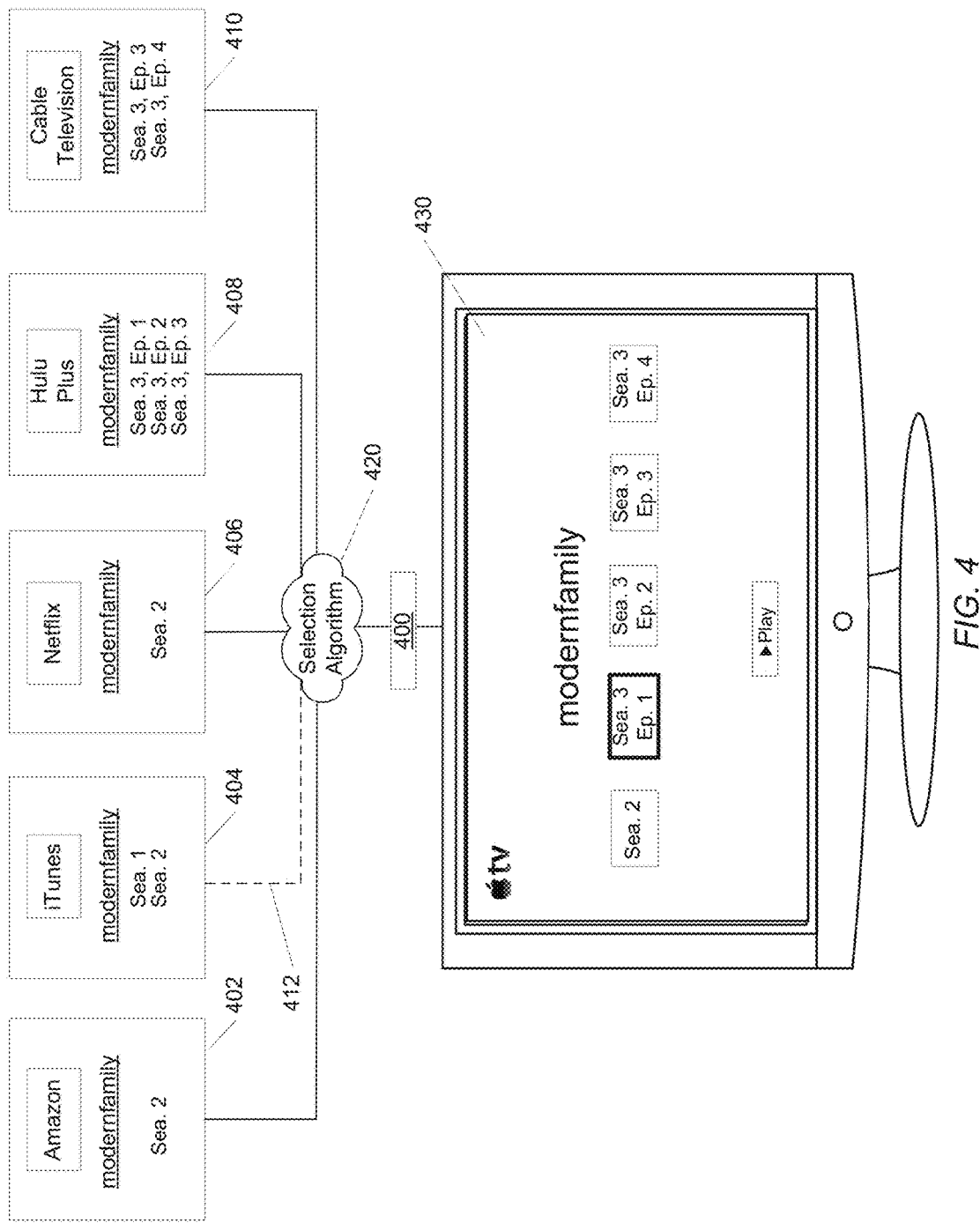
FIG. 4 depicts one embodiment of a video display and secondary sources.

In various embodiments, the content shown as being available in block 106 may also be based upon content that is available for viewing (irrespective of whether the viewer has a current subscription for the content), or content that is available based on the viewer's current subscription(s). The approach used to choose what is shown as being available may be programmable (e.g., based on user settings in a set-top box, based on a service provider's preferences, or otherwise) and may be a combination of the above approaches. FIG. 4 depicts an embodiment in which the content shown as being available is based on whether or not the viewer has a secondary subscription to an available service. In various embodiments, a viewer may be able to view and manage their various primary and secondary subscriptions using interfaces provided by the primary provider on the display. In the example shown in FIG. 4, providers 402-410, selection algorithm 420, set-top box 300 and display 430 are shown. Each of the providers 402-410 are shown coupled to the algorithm 420 by a line. In the embodiment shown, a line coupled from a provider 402-410 to the selection algorithm indicates that the primary subscription based service (Apple TV) provides content corresponding to the given provider (e.g., based on an agreement between the primary subscription service provider and the secondary subscription service provider). A solid line in this case is used to indicate that the viewer has a subscription to the corresponding provider/service and a dashed line indicates the viewer does not have a subscription to the provider/service.

Figure 5:
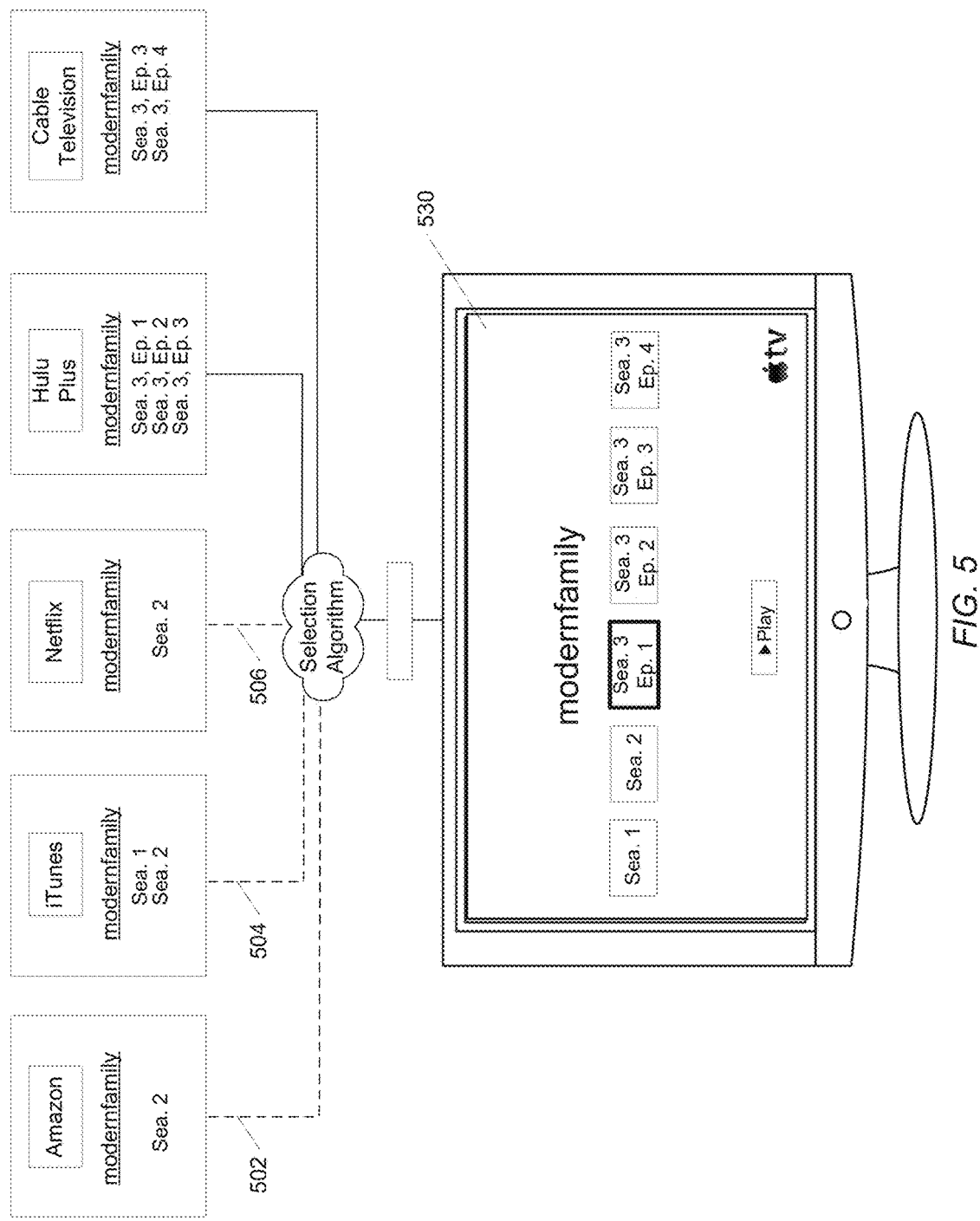
FIG. 5 depicts one embodiment of a video display and secondary sources.

As seen in FIG. 4, the iTunes service is the only provider of season 1 (Sea. 1) of the modernfamily television series. As shown by the dashed line 412, the viewer which corresponds to the subscription displayed on the display 430 does not have a currently valid subscription to this service. Consequently, season 1 (Sea. 1) does not show up as being available on the display 430. As an example, a viewer may not want content displayed when a subscription is not available in order to reduce the amount of content displayed. FIG. 5 illustrates the approach wherein content is shown to the viewer as being available irrespective of whether or not the viewer has a (secondary) subscription for the content. In the example of FIG. 5, lines 502, 504, and 506 show the viewer does not have a subscription to the Amazon, iTunes, or Netflix services. Nevertheless, all content is shown as being available to the viewer on the display 530. Having briefly described a television service with primary and secondary subscriptions, and the aggregation of all content by the primary subscription service, we now turn to a discussion of the system in general.

Figure 6:
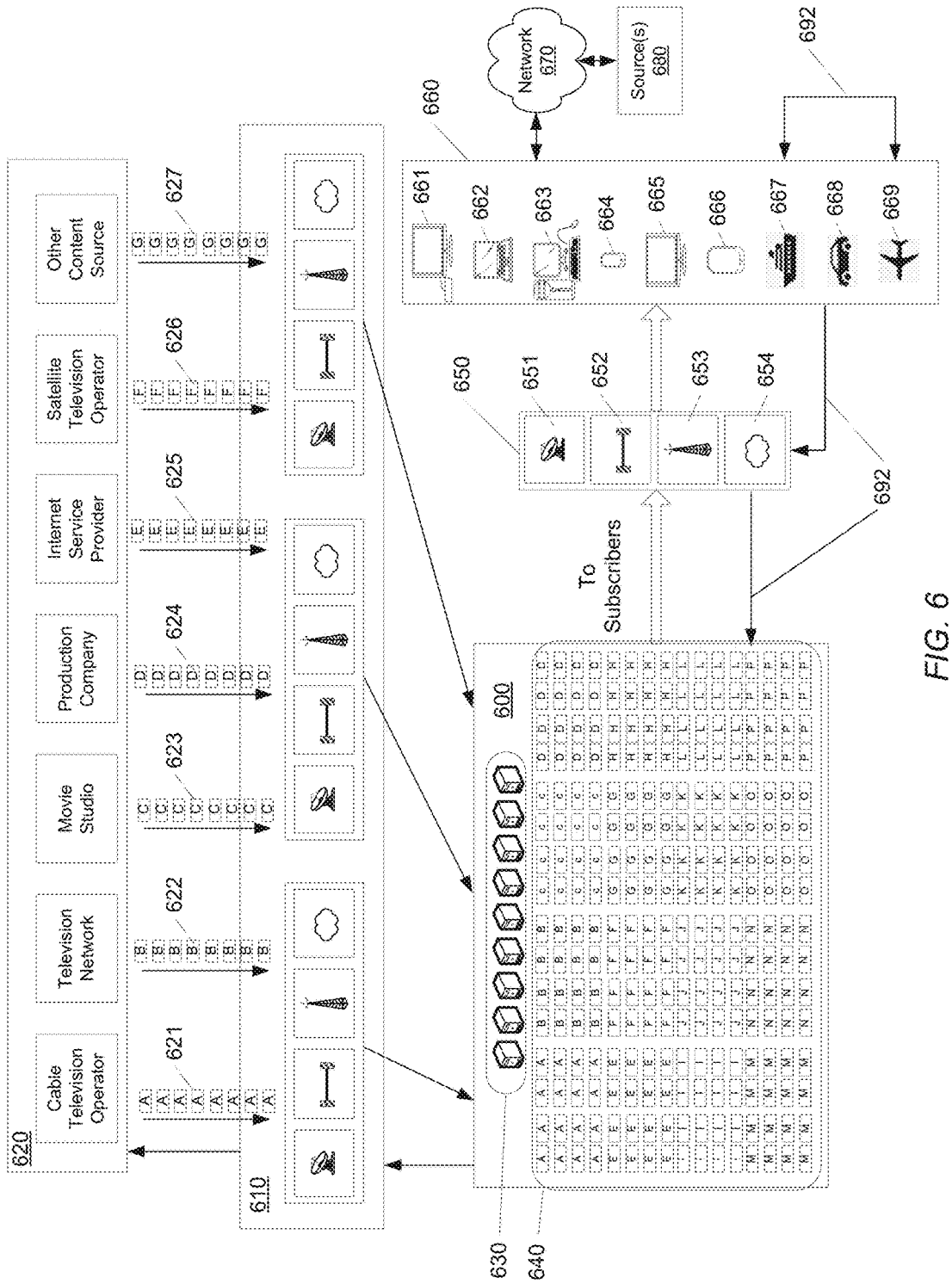
FIG. 6 depicts one embodiment of a portion of a television system.

FIG. 6 illustrates one embodiment of a system corresponding to the above description. In the embodiment shown, a "server farm" 600 is shown that includes a large number of servers 630 and an immense data store 640. In various embodiments, the server farm 600 corresponds to a cloud based service whereby content and services are delivered over a network such as the Internet. Also shown are multiple content providers 620 coupled to the server farm 600 via multiple communication pathways 610. In various embodiments, providers 620 may include subscription based providers which provide paid and/or free content. In various embodiments, the purchase of an application (app) may provide access to particular content. For example, the purchase of a major league baseball app may provide access to content related to major league baseball. In a sense, the purchase of the app effectively serves as a subscription. The application may then be executable (e.g., by the set-top box) to provide an enhanced viewing experience for baseball related viewing. Server farm 600 is also shown coupled to convey content to subscribers 660 via multiple pathways 650. Transmission pathways 650 may include satellite based transmission 651, cable based systems 652, terrestrial or broadband radio service (BRS) based systems 653, the Internet and/or other networks 654, a combination of these systems, or some other appropriate system of transmission. In the embodiment shown, providers 620 includes cable television operators, television networks, movie studios, production companies, Internet service providers, satellite television operators, and other providers/sources of content. In various embodiments, one or more of the providers 620 corresponds to a subscription based service whereby subscribers are entitled to gain access to video content.

Also shown in FIG. 6 is the conveyance of content 621-627 by each of the providers 620 via one or more pathways 610 to server farm 600. It is noted that while the term server farm—singular—is used, in various embodiments the server farm 600 is in fact multiple farms which are distributed as will be discussed shortly. Similar to pathways 650, pathways 610 may include any of a variety of transmission media and may include a variety of transmission protocols. Content 621-627 may generally include video content and related metadata which describes the content and/or other particular regarding the content. Such other particulars may include information regarding licensing related information, subscriber information, pricing information, or otherwise. For ease of illustration, the content 621-627 is shown with a corresponding designation A-G which serves to indicate the content corresponds to a given provider. For example, content 621 which is conveyed by a Cable Television Operator includes the designation "A". Corresponding data within the server farm 600 data store 640 includes the designation "A" as well. In various embodiments, designation "A" for data within data store 640 may serve to indicate that a subscription to the Cable Television Operator includes access to this data. It is noted that such designations for use in relation to data within the data store 640 will form part of the metadata maintained by the server farm 600. While content within the data store 640 is shown with a given designation for ease of illustration, in various embodiments particular data in the data farm 600 may be associated with multiple providers 620 and multiple subscriptions. Accordingly, particular content such as an episode of a television show would be associated with multiple providers 620 and metadata maintained by the server farm 600 would indicate as much. Therefore, while the illustration of FIG. 6 may depict content as being segregated by provider or subscription (A-P), in various embodiments such segregation or identification is merely logical based on metadata. In various embodiments, data storage reduction techniques such as deduplication and single instance storage will be used for the data store 640.

While the previous figures have discussed the television system in terms of conveying content for display on a television. As shown in FIG. 6, the target 660 of video content conveyed by server farm 600 may be any of various different types of targets. Exemplary targets 660 shown in FIG. 6 included a set-top box coupled to a television 661, a laptop computer 662, a desktop computer 663, a smart phone, cellular phone, wearable portable device (e.g., a wristwatch type display), other handheld mobile device 664, a television, a tablet computer, a cruise ship for distribution as part of an on-board video system, an automobile (e.g., for display on an integrated video screen), or aircraft for individual distribution to passengers or broader distribution as part of an on-board video system. Other targets capable of displaying video content are possible and are contemplated.

FIG. 6 also illustrates that targets 660 may communicate with server farm 600 via paths 692. Such communication may include requests for video content, receiving device performance related information, viewer profile related information, or otherwise. Also shown is a communication path 692 that illustrates target devices may communicate with other target devices. Such communication may be peer-to-peer based type communication or otherwise. FIG. 6 also shows targets 660 coupled via a network 670 couple to other sources 680. These other sources 680 may provide access to other sources of video content, Internet based content, or content directly provided by one or more of providers 620.

As discussed above, in various embodiments a viewer may have a primary subscription and one or more second subscriptions. For example, in FIG. 6 a viewer corresponding to one of the targets 660 may have a primary subscription to Apple TV which in the example shown corresponds to server 600 and related operations. In such an embodiment, the primary subscription may be based on monthly fee, annual fee, or other periodic fee. Alternatively, the primary subscription may be based on the purchase of a set-top box or television with integrated components to support the primary subscription service. Still further, the primary subscription may be based on a combination of a periodic fee, the purchase of equipment, per item purchases, and/or otherwise. Whichever approach is used in a given case for the subscription, the primary subscription generally provides access by the viewer to content maintained within the server farm of the primary subscription service provider (e.g., Apple TV). While content available to the viewer is maintained and provided by the primary subscription service provider, which content is available to the viewer according to the primary subscription is based upon one or more secondary subscriptions of the viewer.

As an example, a viewer may have a cable television subscription (secondary subscription). In addition, the viewer may have a subscription to Apple TV (e.g., the service provider associated with server farm 600). The cable television operator (e.g., as shown as a provider 620) broadcasts video content, such as live television and video-on-demand content, 24 hours a day. Server farm 600 is configured to record and/or otherwise capture all content broadcast/provided by the cable television operator and store the content as part of the data store 640. For example, data designated "A" in data store 640 may represent video content broadcast and/or otherwise provided or available from the cable television operator. Given the viewer's secondary subscription to the cable television operator service, the viewer's primary subscription to Apple TV (server farm 600) entitles the viewer to access all of the content in the data store 640 that corresponds to the cable operator. Consequently, the viewer may view live television broadcasts of the cable television operator which are provided by the server farm 600 rather than the cable television operator. Additionally, as the server farm 600 is constantly recording/gathering all of the cable operator content, the viewer may have access to content which was broadcast by the cable television operator a week ago, a month ago, or even a year ago, depending on how long the server farm maintains the data and has rights to convey the data.

In various embodiments, the server farm 600 is in principle generally configured to record all video data everywhere all of the time. In other words, the server farm 600 operator may seek to store all video content available for viewing globally. Such an approach may include storing all previously available video content anywhere in the world and continuously recording all newly available video content. Acquisition of video content may generally necessitate license agreements with various copyright holders and providers. As noted earlier, particular content which has been acquired and resides in the server farm 600 may be associated with multiple providers. However, while multiple providers may provide subscribers access to particular video content, it generally will not be the case that the server farm 600 operator will need agreements with all such providers in order to acquire the content. Rather, in most cases, video content will have been acquired and stored as part of the content 640. The server farm 600 operator will then form agreements with providers 620 which will entitle subscribers with primary subscriptions to the server farm service 600 and a given secondary subscription to another service 620 to access secondary subscription available content from the server farm 600. Depending on a viewer's secondary subscriptions, content within the server farm 600 that is accessible to the viewer will vary. In various embodiments, rather than subscribing to all of a secondary provider's content, viewers may be able to subscribe to a subset of the content offered by a secondary provider. For example, a viewer may subscribe to only a particular network, a particular television series, a particular night of the week (e.g., the Thursday night lineup), subscribe according to varying durations (e.g., just the next two weeks), and so on. Numerous such alternatives are possible and are contemplated.

Figure 7:
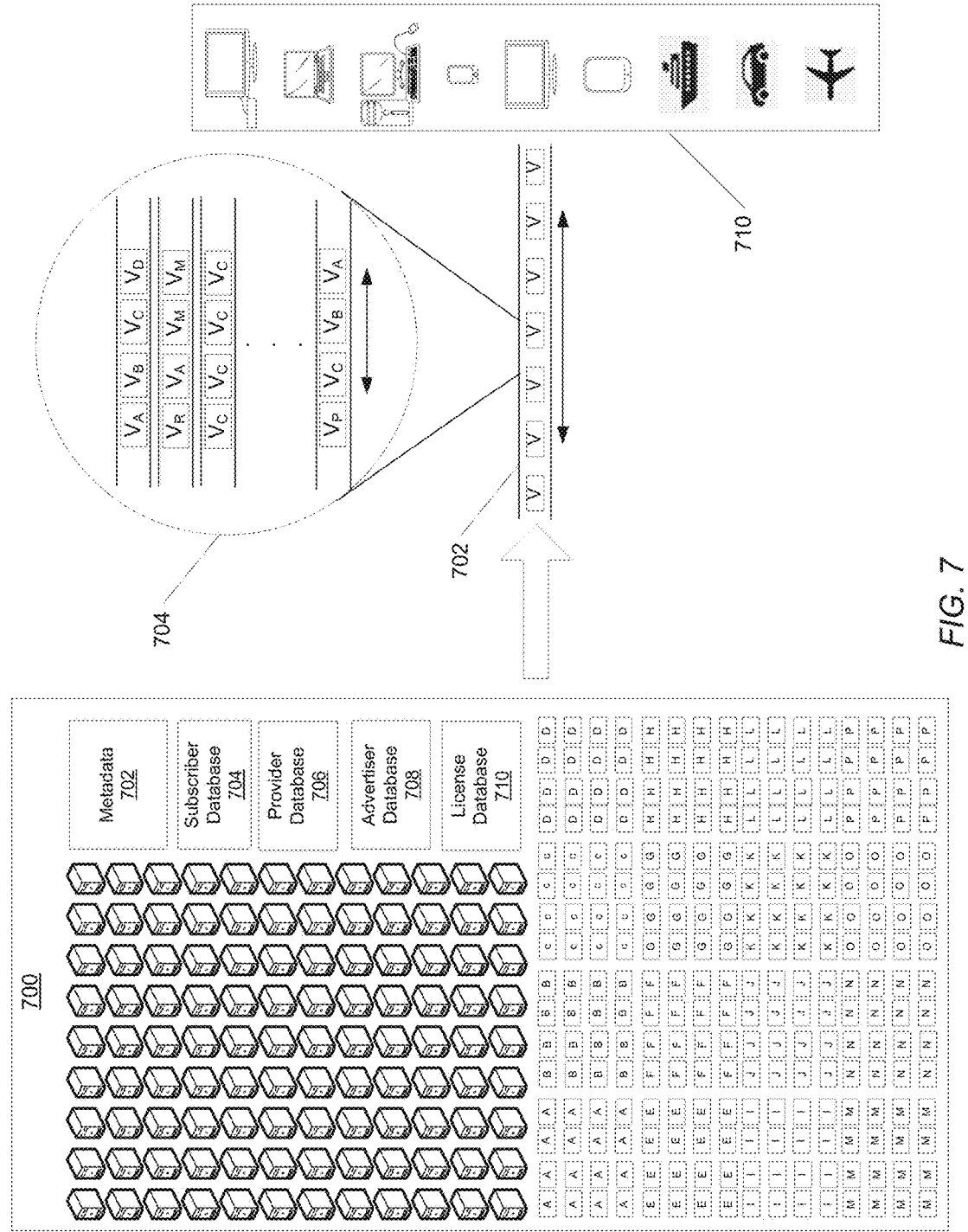
FIG. 7 depicts one embodiment of a portion of a television system.

While the embodiment of FIG. 6 contemplates a primary subscription provider and multiple secondary subscription providers 620, the viewing experience provided to the viewer is generally managed solely by the primary subscription provider. FIG. 7 illustrates a primary subscription based server farm 700 coupled to provide video content to targets 710. As previously discussed, server farm 700 stores data associated with multiple secondary subscription providers. By having a suitable secondary subscription, a viewer gains access to data in the server farm 600 that represents data also provided by the secondary subscription provider. However, the secondary subscription provider does not provide the content to the viewer. Rather, the content is provided by the primary subscription provider. In some embodiments, the viewer may be able to receive content from a secondary provider. In some embodiments, responsive to a purchase by a viewer, the primary provider may obtain content from the secondary provider (assuming the primary provider does not already have the content) and convey/forward the content to the viewer. Conveying/forwarding the content in such a case may include reformatting and/or modifying associated metadata to conform to the primary provider's system requirements.

Additionally, the video environment within which the video content is provided (e.g., via a set-top box provided by the primary subscription provider, etc.) is controlled by the primary subscription provider. Such an approach eliminates or minimizes the viewer's need to navigate or otherwise deal with disparate secondary provider environments. To further enhance the viewer's experience, complications associated with managing secondary subscriptions may be managed through the primary subscription. For example, the primary subscription provider may identify content available to a viewer via a secondary subscription. Should the viewer wish to subscribe to the secondary provider, this may be done through the primary subscription service and may even be billed as part of the primary subscription service billing. This may be accomplished via the primary subscription service interface using a consistent visual/graphical and approach. In such a manner, the system provides the viewer with a consistent interface and viewing experience.

As illustrated in FIG. 7, server farm 700 includes multiple databases configured to store data associated with the stored video content. These databases include metadata 702, subscriber databases 704, provider databases 706, advertiser databases 708, and license databases 710. Metadata 702 may generally include data that identifies the nature of video content—type, size, title, duration, cast, secondary providers, etc. Subscriber databases 704 may include information regarding primary subscriptions and perhaps secondary subscriptions. Provider databases 706 may include information regarding secondary subscription providers. Advertiser databases 708 may include information regarding advertisers, advertisements, and corresponding agreements. License databases 708 may include license data related to stored content. It is noted that these databases are exemplary only. Numerous other and/or alternative databases may be maintained. As shown, server farm 700 conveys video data to targets 710 via a path 702. As depicted, the video content and associated metadata along path is conveyed in a manner to provide a consistent viewing experience—visually illustrated as "V"—which generally seeks to eliminate viewing experience differences generally associated with different video content providers. View 704 illustrates that differences associated with the video content regarding secondary subscriptions or otherwise are subjugated (e.g., identified via the metadata) to the larger viewing presentation. In this manner, viewers can access all content they are entitled to according to secondary subscriptions with one or more providers from a single provider via a single provider interface. Additionally, as all content is stored—the viewer may access content which was at one time provide by the secondary provider but is no longer provided by that provider. In various embodiments, the viewing experience is controlled by the primary provider by providing the hardware and/or software with which subscribers access the video content, or by controlling specifications of the hardware and/or software used by the subscribers.

Figure 8:
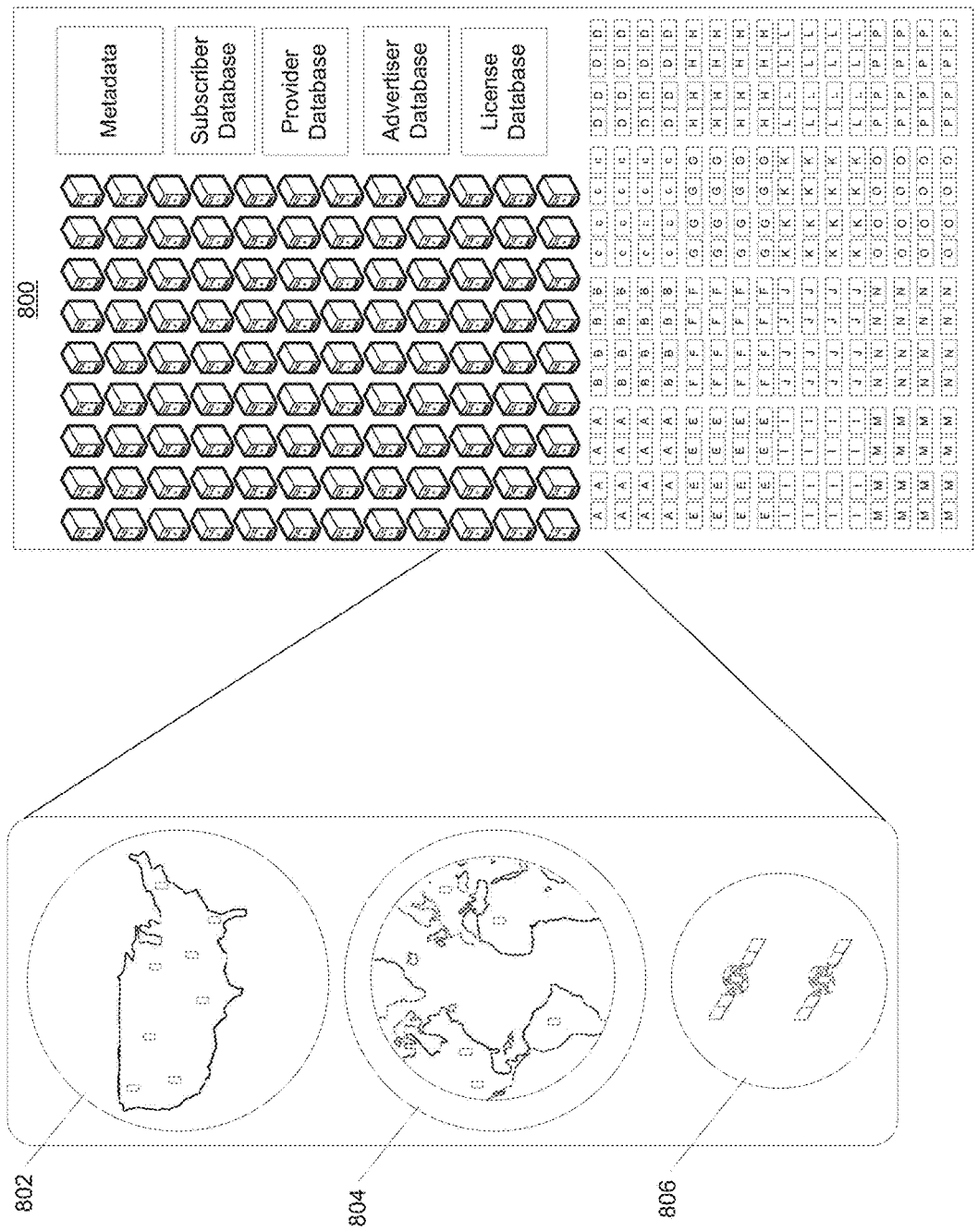
FIG. 8 depicts one embodiment of the distribution of video server farm.

Turning now to FIG. 8, one embodiment of a server farm 800 as previously discussed is shown. Generally speaking, server farm 800 is distributed throughout a particular geographic region 802, strategically distributed throughout the globe 804, and may also include distributed portions in satellite based systems. In this manner, data may be served to particular regions throughout the globe in a relatively efficient manner compared to having one or only a small number of server sites.

Figure 9:
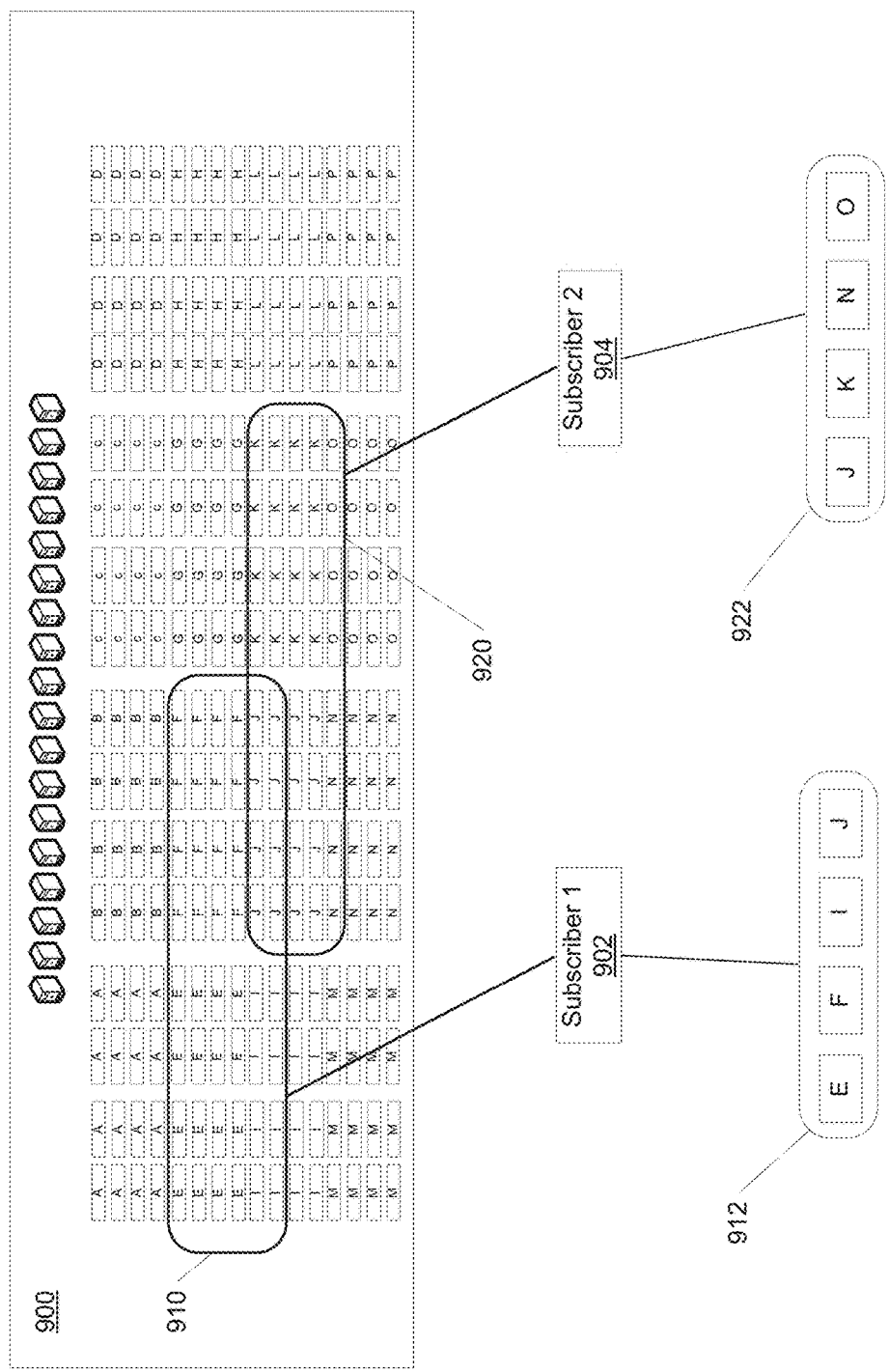
FIG. 9 depicts one embodiment of subscribers and video content.

Generally speaking in the prior art, a television subscription, such as a cable television subscription, is associated with one or more particular devices (set-top boxes). Such devices are uniquely identified by the cable television operator and communication is established with the device which enables the device to receive programming from the cable operator. In contrast, in various embodiments, primary subscriptions as described herein may be associated with particular subscribers rather than particular devices. Given such an approach, the subscriber's content may follow the subscriber wherever they may go. The following discussion illustrates these features. FIG. 9 depicts server farm 900 including video content that corresponds to multiple secondary subscriptions/providers. A first subscriber 902 has four secondary subscriptions 912 E, F, I and J. This entitles subscriber 1 902 access (e.g., viewing privileges) to the E, F, I and J content 910 stored as part of the content associated with farm 900. A second subscriber, subscriber 2 904, has secondary subscriptions 922 J, K, N and O. This entitles subscriber 2 904 access to the J, K, N and O content 920 stored as part of the content associated with farm 900. In this example, both subscribers have secondary subscriptions providing access to the content J.

Figure 10:
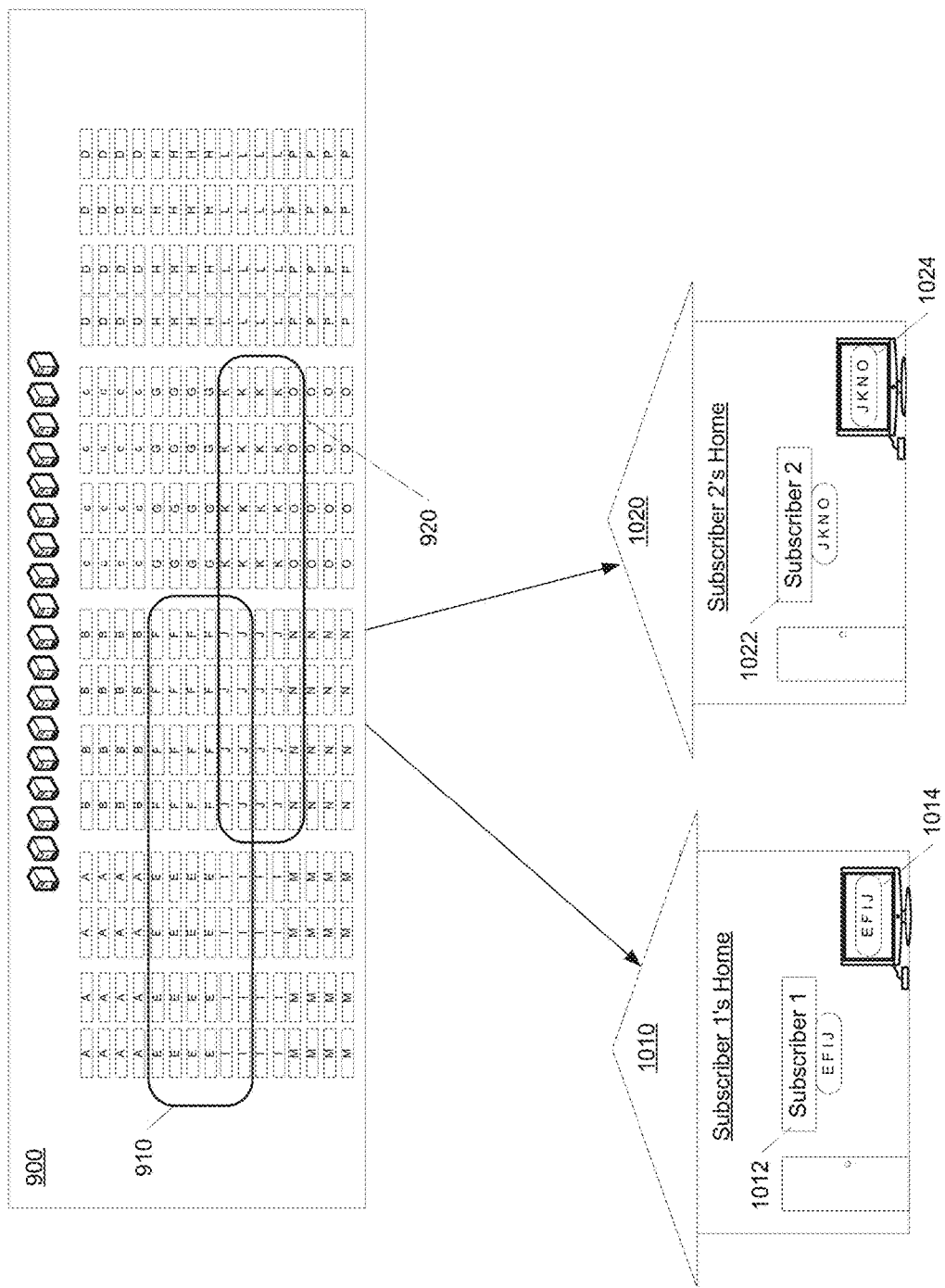
FIG. 10 depicts one embodiment of subscribers and video content.
Figure 11:
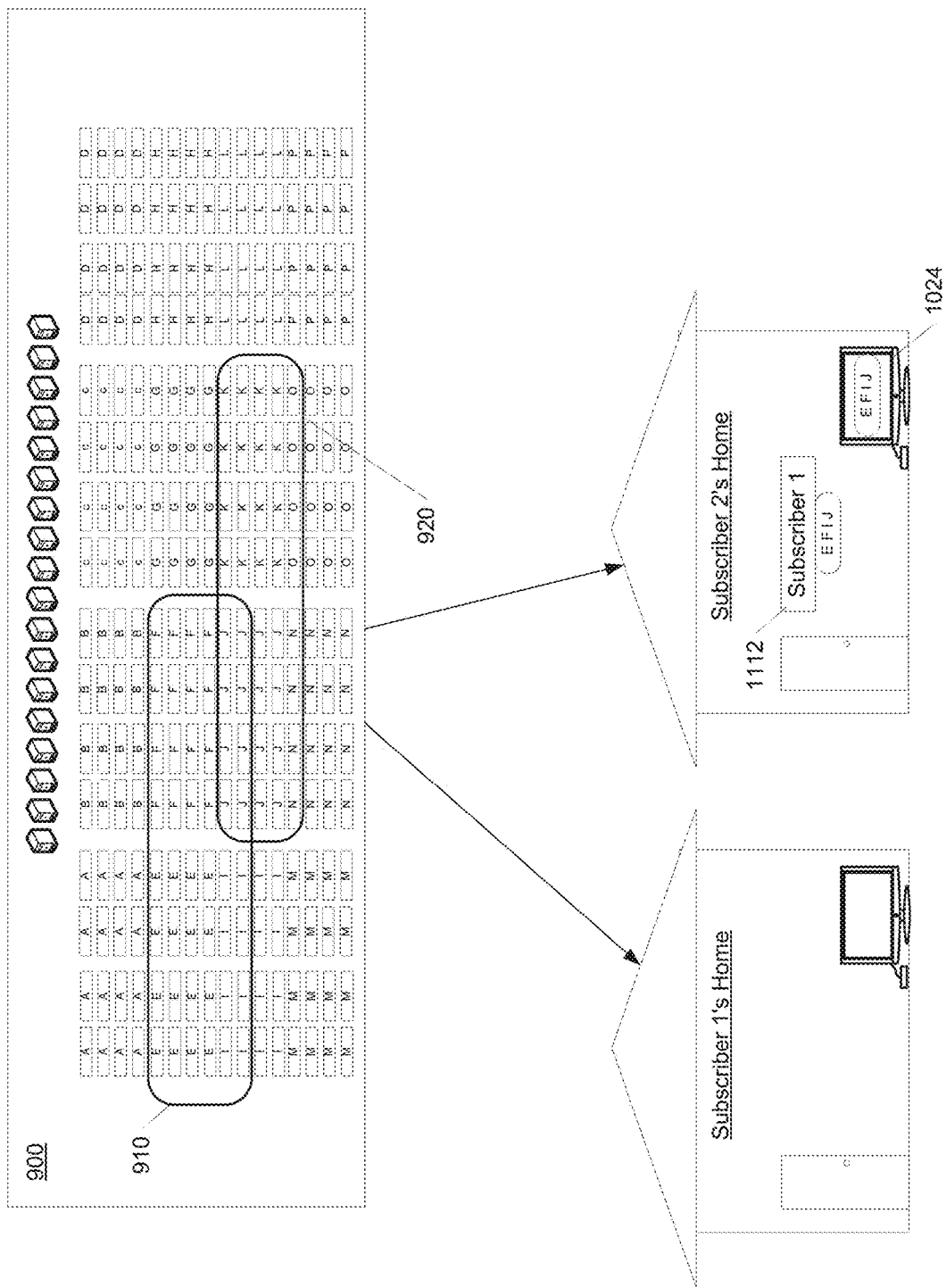
FIG. 11 depicts one embodiment of subscribers and video content.

Turning to FIG. 10, the homes of subscriber 1 1010 and the home of subscriber 2 102 are shown. Subscriber 1 1012 is shown to be present in the home 1010, and subscriber 2 1022 is shown to be present in home 1022. Subscriber 1 1012 is shown to have access to content E, F, I and J and the corresponding content is viewable on the television 1014. Subscriber 2 1022 is shown to have access to content J, K, N and O, and the corresponding content is viewable on the television 1024. FIG. 11 illustrates subscriber 1 1112 has now moved to subscriber 2's home. As subscriber 1's primary subscription is associated with subscriber 1 and is not viewable on a specific device, subscriber 1's content E, F, I and J is viewable in subscriber 2's home television 1024. Various embodiments for how subscriber 1's subscription follows the subscriber in this manner are contemplated. In one embodiment, subscriber 1's use of a remote control device in subscriber 2's home is recognized by the remote control and/or other video content display devices. For example, the remote control used with a set-top box may include biometric recognition capability to recognize a fingerprint, voice, or other characteristic of the person using the remote control. This biometric data could then be communicated to the set-top box and conveyed to the primary subscription provider for analysis. Identification of a particular subscriber may cause conveyance of particular codes or entitlement data to the set-top box which then enables it to receive subscriber 1's content.

In other embodiments, password or other login type information may be entered via a remote control device. Authorization may result in codes or entitlement data being conveyed similar to that discussed above. Still further, in other embodiments, subscribers may have particular mobile devices associated with their subscription. For example, a subscriber's smart phone may be associated with the subscription. In some cases, the smart phone itself may itself be authorized to receive and display subscription based video content. Additionally, the smart phone may be useable as a remote control for a television system. In such an embodiment, the smart phone may be configured to communicate with a television, set-top box, or other video system component. Based on such communication, the set-top box or other device may convey the smart phone data to the primary subscription service provider. If the smart phone is identified as being associated with a valid subscription, then entitlement/authorization type data may be conveyed to the set-top, television, or otherwise, which enables it to receive subscriber 1's subscription based content. Such embodiments would enable the viewing of one's own subscription content at a friend's house. Alternatively, subscription content could follow a subscriber to a hotel room during travel. Numerous such scenarios are possible and are contemplated.

Figure 12:
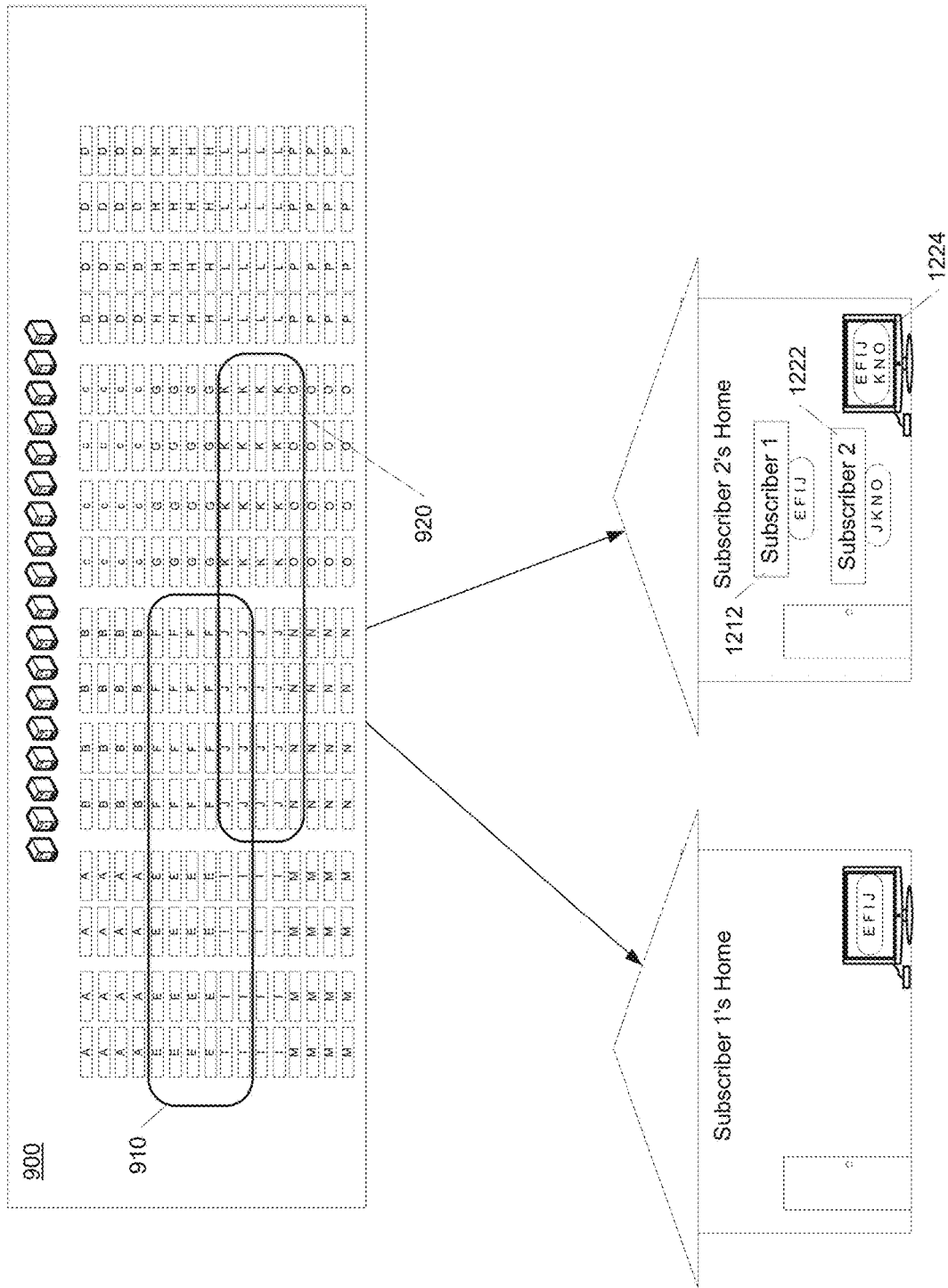
FIG. 12 depicts one embodiment of subscribers and video content.

FIG. 12 illustrates an embodiment in which subscription content for both subscriber 1 1212 and subscriber 2 1222 is concurrently available on the television 1224 in subscriber 2's home. In such an embodiment, a device such as a set-top box detects the presence of both subscribers and authorizes access to their combined content. In various embodiments, such as the smart phone embodiment described above, the detection and identification of the smart phone triggers the authorization mechanism for the subscriber content. In such an embodiment, the smart phone may have a setting which enables or disables the mechanism. For example, in one embodiment the mechanism may be enabled and have a broadcast mode in which the subscriber needn't take any action to cause the authorization to take place. The mere presence, such as walking in to the home, results in the set-top box being authorized to receive the subscription based content. In such an embodiment, simply walking into a neighbor's home may results in the same authorization. If such authorization is not desired, then the smart phone (or other mobile device) may have a setting which disables the automatic authorization mechanism.

In some embodiments, the feature of having a subscriber's content follow the subscriber and be displayed on another device (e.g., a friend's television or a hotel room television) may be a feature that is provided at an additional cost (e.g., a small monthly fee). Additionally, such a feature (which may be referred to as a "follow me" mode) may be enabled or disabled. For example, in some embodiments, when subscription content follows a subscriber to another location where it is then viewed, that content is not simultaneously viewable in the subscriber's home. In various embodiments, such a mode may be controllable by both a set-top box in the subscriber's home as well as by the subscriber while not at home. If desired, primacy be given to the set-top box at home. In this manner, content may follow the subscriber away from home, but when someone at the home wishes to access particular subscription based content it is permitted and the follow me mode is temporarily disabled. Numerous such alternatives are possible and are contemplated.

Figure 13:
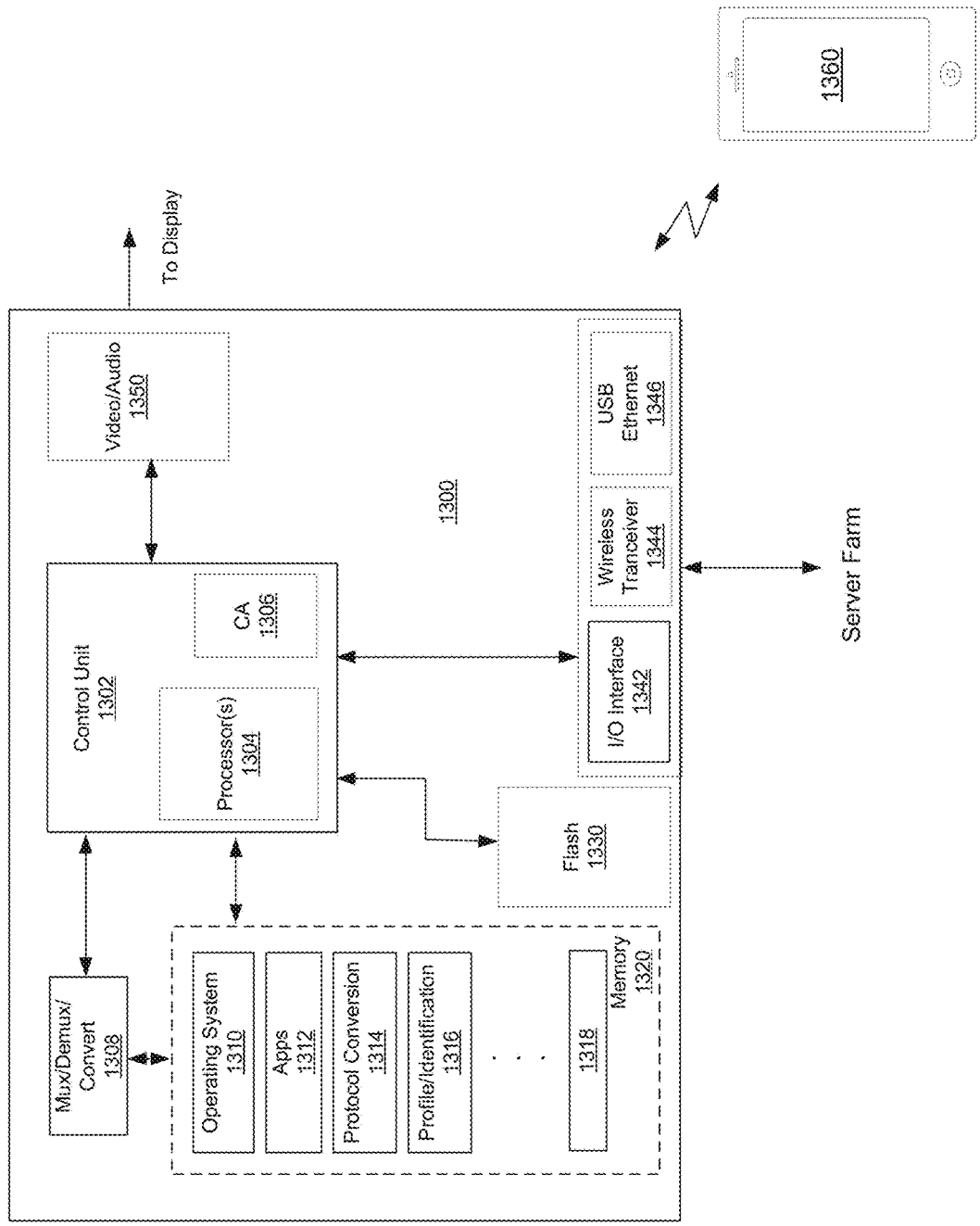
FIG. 13 depicts one embodiment of a receiver and mobile device.

Turning now to FIG. 13, a general block diagram illustrating one embodiment of a set-top box 1300 and mobile device 1360 is shown. Set-top box 1300 is shown to include a control unit 1302 including processor(s) 1304 and conditional access (CA) type unit 1306. Set-top box 1300 includes memory 1320, persistent memory (Flash) 1330, I/O interfaces 1342, wireless transceiver 1344 configured to support WiFi, Bluetooth, or any other wireless communication protocol, and USB and Ethernet interfaces 1346. A mux/demux/convert unit is included which may be configured to receive, demultiplex, and convert the formats of receive signals. A video/audio unit 1350 is included to convey audio and video data to a display device. Such audio and video data includes audio/video content received by the set-top box and also includes any overlays or other graphic elements generated by the set-top box 1300. Also included are operating system components 1310, applications (apps) 1312 executable by the processor(s) 1304, components 1314 for use in converting between communication protocols, viewer profile/identification 1316 related components, and any other 1318 suitable components. In various embodiments, the set-top box has no tuners in the conventional sense. In other words, the set-top box has no QAM or ATSC tuners. Rather, in various embodiments, the set-top box receives video content via a network interface such as an interface coupled to the Internet.

In various embodiments, set-top box does not include mass storage (such as a disk drive or similar DVR type mass storage device) and is not configured to provide access to locally attached mass storage. Rather, sufficient storage for some video buffering, operating system and application memory resident operations, and so on, may be all that is provided. In such an embodiment, set-top box is generally configured for video streaming and not video storage. Other embodiments could include or provide access to local mass storage. Mobile device 1360 may be a dedicated remote control device, smart phone, or other device that is configured to communicate with the set-top box 1300. As discussed above, in various embodiments the device 1360 may be identifiable as being associated with a subscriber. Responsive to such identification (e.g., using identification component 1316 and communication with a subscription service), the set-top box may be authorized to receive subscriber content. In other embodiments, biometric data may be entered to the device 1360 (e.g., a fingerprint or voice sample) which is then used for authentication/authorization. Once identified, the system may automatically enable various features for the given user. For example, the user may be automatically logged in for the purpose of making purchase. Content for kids may be automatically controlled upon identification of a child. These and other features will be discussed below. Various such embodiments are possible and are contemplated as per the discussion above.

Figure 14:
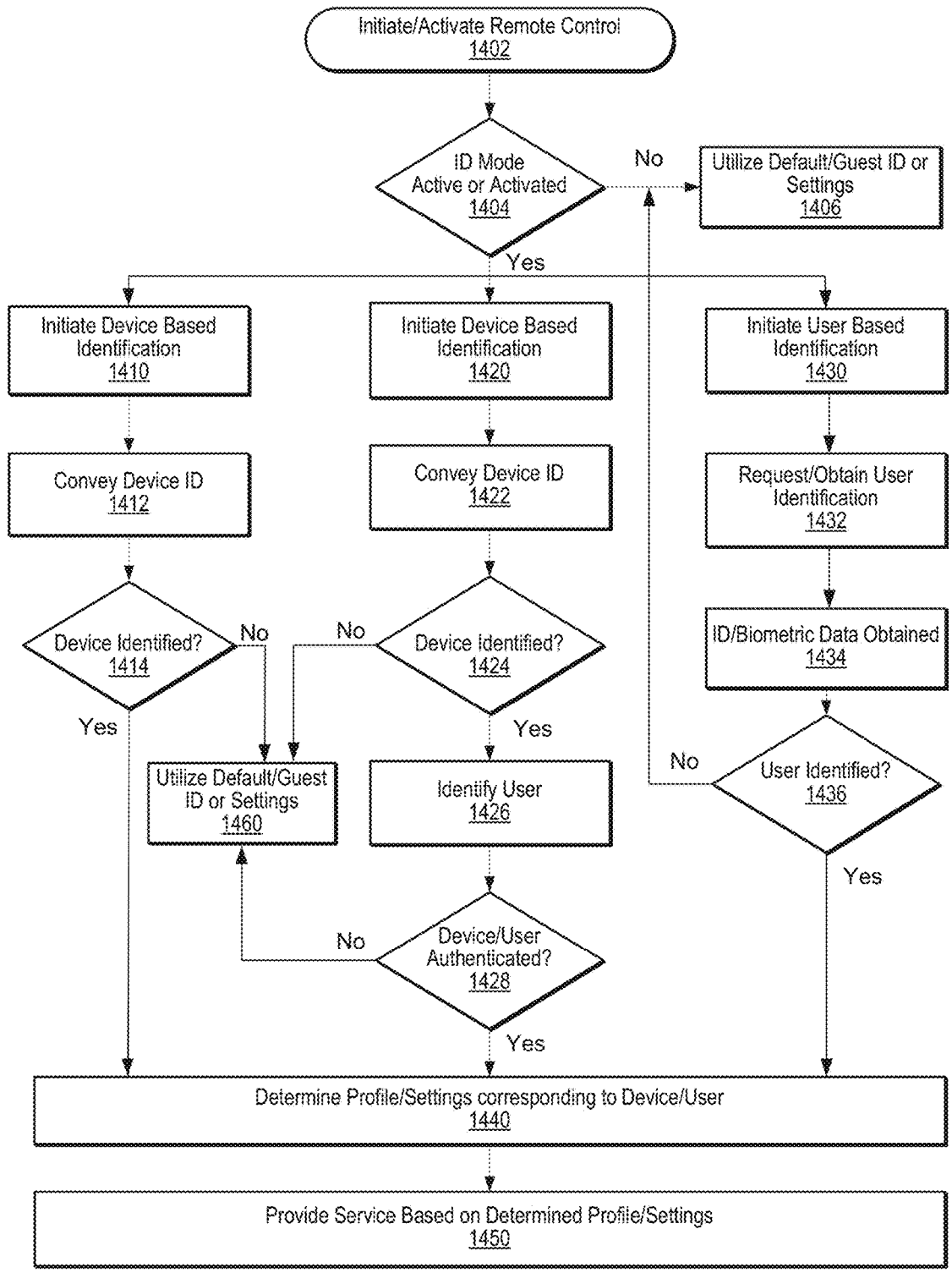
FIG. 14 depicts one embodiment of a method for identifying a subscriber.

FIG. 14 illustrates one embodiment of a method for use in identifying a subscriber and authorizing the receipt of subscriber content at a particular device. In the method shown, a remote control or other handheld device is used to initiate or activate the procedure (block 1402). In various embodiments, such activation may be initiated by starting a particular app on a smart phone, detecting movement of a remote control via an accelerometer or similar device, pushing a button on a remote control, detecting a finger resting on a touch pad of a remote control, and so on. In an embodiment in which the identification mode may be enabled and disabled, if the mode is disabled (decision block 1404), default settings or guest ID type settings (1406) may be used for the set-top box, television, or other associated video display device. For example, by default a set-top box may be configurable by a viewer to display particular content (for example, content that corresponds to the owner of the home in which the set-top box is located). If ID mode is activated (decision block 1404), the an identification/authorization procedure is initiated. For ease of discussion, three different embodiments are illustrated in FIG. 14. Block 1410 corresponds to an embodiments in which identification is based on the mobile device being used to communication with the set-top box (e.g., the smart phone based example described above). A second embodiment proceeds with block 1430 is represents a biometric or other approach that is not based on the particular mobile device being used. Finally, a third embodiment begins with block 1420 which represents a combination of device and user identification. Depending on the embodiment, one of these three paths will be chosen. In various embodiments, only one such path/embodiment is available. In other embodiments, multiple such paths/embodiments are available and may be selected as a preferred method by configuring the set-top box or other receiving device accordingly.

Beginning with block 410, device based identification is initiated. In this embodiment, an identification of the mobile device 1412 is received by the set-top box from the mobile device. While a set-top box is described as the receiving device for purposes of discussion, it is to be understood that the receiving device may be a television with supporting circuitry, a game console with supporting circuitry, or otherwise. Having received the device identifier, an effort to identify the device is undertaken (decision block 1414). Such identification may include communication with the subscription provider which accesses a subscriber database or otherwise to determine if the mobile device is associated with a subscription. In other embodiments, the set-top box may store device identifiers for a certain period of time (e.g., 24 hours) with associated authorization information. In such an embodiment, re-authorization would only be needed once per day or according to some other time interval. In such embodiments, the subscription provider may be able to invalidate such set-top box data at will in order to require re-authorization. If the device is not successfully identified, then default or guest settings 1450 may be used. If the device is successfully identified and it is associated with a valid subscription, then settings that correspond to the subscription may be obtained (e.g., settings for the set-top box environment, settings for the particular user, etc.) (block 1410), and access to the subscription based content is authorized (block 1450).

Alternatively, the path may begin with block 1430 where user based authentication is initiated. In such an embodiment, user identification may be requested by the remote control/mobile device (block 1432). In response, a viewer provides biometric or login type data (block 1432). If the user identification is successful (block 1436), then the method continues with block 1440. Otherwise, default or guest settings may be used (block 1406). User identification may include a process similar to that described in association with block 1414.

Finally, the third approach begins with block 1420 where device based identification is initiated. In this embodiment, the device is first identified (blocks 1422 and 1424). If the device is successfully identified, then an attempt to identify the user is made (block 1426). This may be used to verify that the remote control/mobile device is being used by the rightful owner or otherwise expected user. If both the device and user are properly identified as corresponding to a valid subscription (decision block 1428), then the method proceeds with block 1440. Otherwise, default or guest settings may be used (block 1406). In each of the embodiments, default settings may be configurable and may include disabling access completely, conveying a communication (email, text message, etc.) that indicates the failed attempt, or otherwise.

Figure 15:
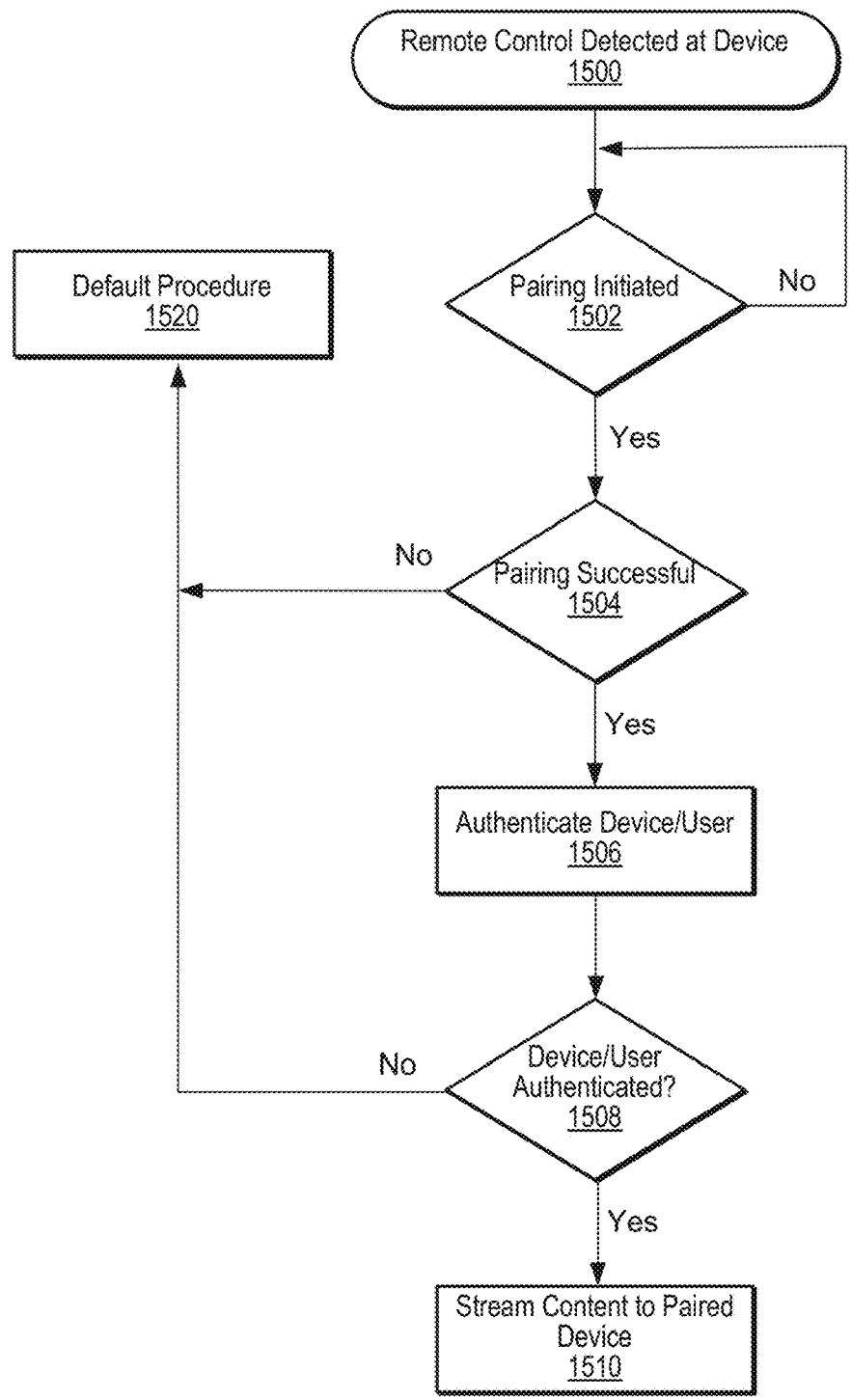
FIG. 15 depicts one embodiment of a method for pairing a television and mobile device.

Turning now to FIG. 15, one embodiment of a method for pairing a remote control or other mobile device with a set-top box or other video display device is shown. In various embodiments, a remote control or other device may use Bluetooth or any other suitable wireless communication protocol to establish communication with a set-top box or other device. In the example shown, a remote control device is detected (block 1500). This detection may be pursuant to an explicitly initiated detection procedure, or could be based on a constant broadcast and detection mechanism. Responsive to detecting a device, a pairing attempt may be initiated (decision block 1502). If pairing of the remote control with the set-top box is successful (decision block 1504), then device and/or user authentication is initiated (block 1506). This authentication may correspond to the various embodiments discussed in relation to FIG. 14. If authentication is successful (decision block 1508), then streaming of the subscription based content to the paired device (e.g., set-top box) is authorized. If authentication is not successful (decision block 1508), then a default procedure may be used (block 1520). This default procedure may include disabling access to the set-top box, using default or guest settings, or any other procedure deemed suitable.

Figure 16:
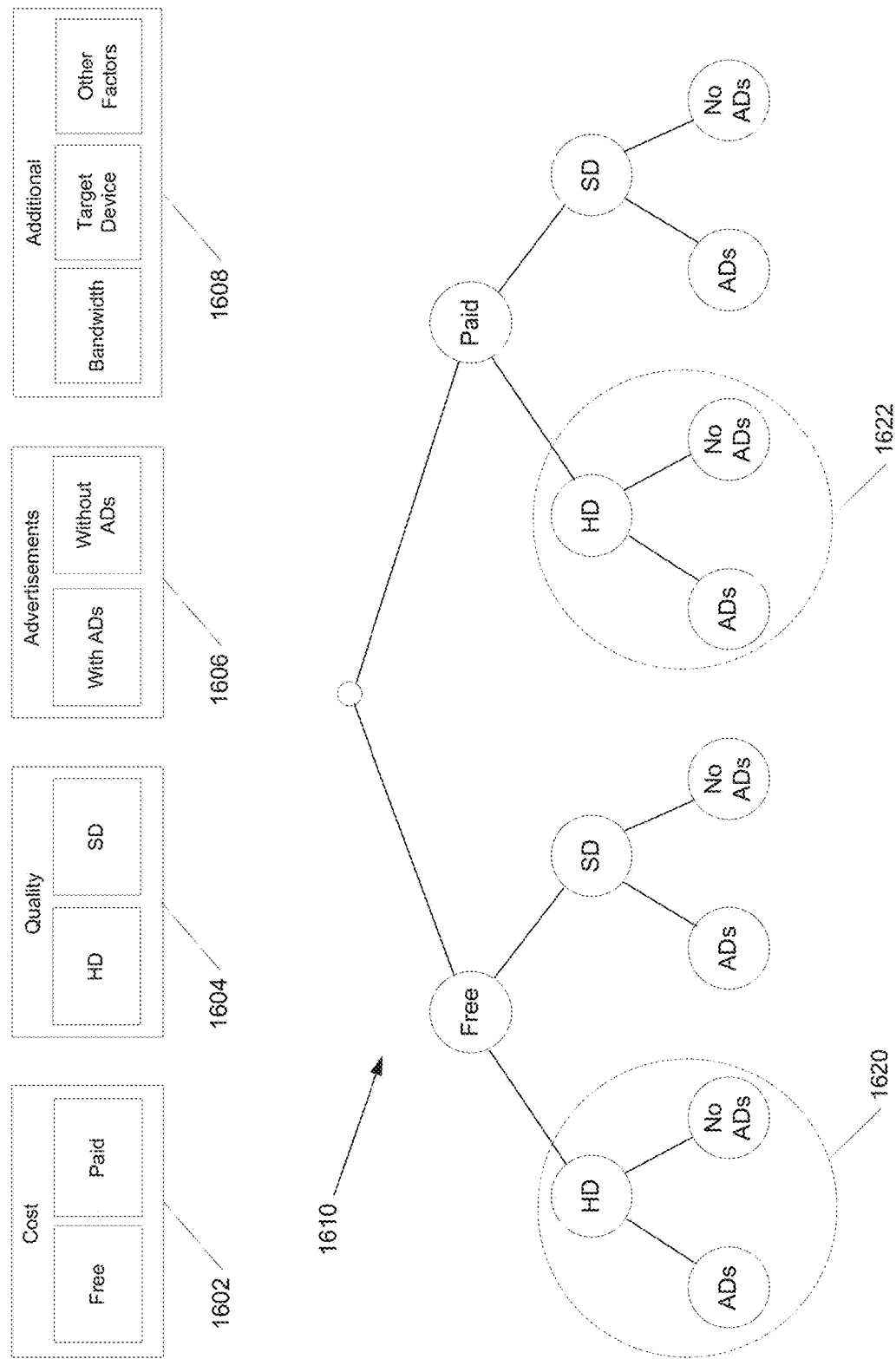
FIG. 16 depicts one embodiment of a method for prioritizing presentation of video content.

As discussed above, the primary provider will generally have a great deal of content available for viewing by a given subscriber. The content that is available may be determined in part based on secondary subscriptions of the viewer. As noted, there may be duplication among the secondary subscriptions and/or primary subscription as to available content. Additionally, particular content may be available in many forms. FIG. 16 illustrates some of the various forms that content may take.

In the example shown, content may differ as to cost 1602 (viewable for free or viewable for payment of a fee) and quality (HD or SD) 1604. In addition, presentation of content may include presentation with advertisements (ADs) or without ADs 1606. With only these variables, given content may correspond to one of eight different forms/presentations as shown by the tree 1610. In this case, the eight possibilities are:

1. Free, HD, with ADs
2. Free, HD, without ADs
3. Free, SD, with ADs
4. Free, SD, without ADs
5. Paid, HD, with ADs
6. Paid, HD, without ADs
7. Paid, SD, with ADs
8. Paid, SD, without ADs Given these possibilities, a viewer may have various preferences regarding how the given content is prioritized when either being presented as being available or when being selected for viewing. For example, a viewer may give a higher priority to free content over paid content. Also, HD content may be given priority over SD content, and so on. Using such preferences, selections from available content may be made for presentation to the viewer or when particular content is selected for viewing. In addition to such preferences, additional factors 1608 may be used to determine which content is provided to a viewer. For example, bandwidth considerations may affect the selection of content. If it is determined that the bandwidth to the viewer's device is limited, HD content may be disfavored (at least temporarily) until the condition eases. In such a case, the options indicated by 1620 and 1622 in FIG. 16 may be eliminated. Additionally, a viewer's preferences may generally indicate a preference for HD content. However, on a particular occasion, the viewer's target device may have a very small display which may not generally reveal significant differences between SD and HD content. In such a case, SD may be preferentially conveyed.

Figure 17:
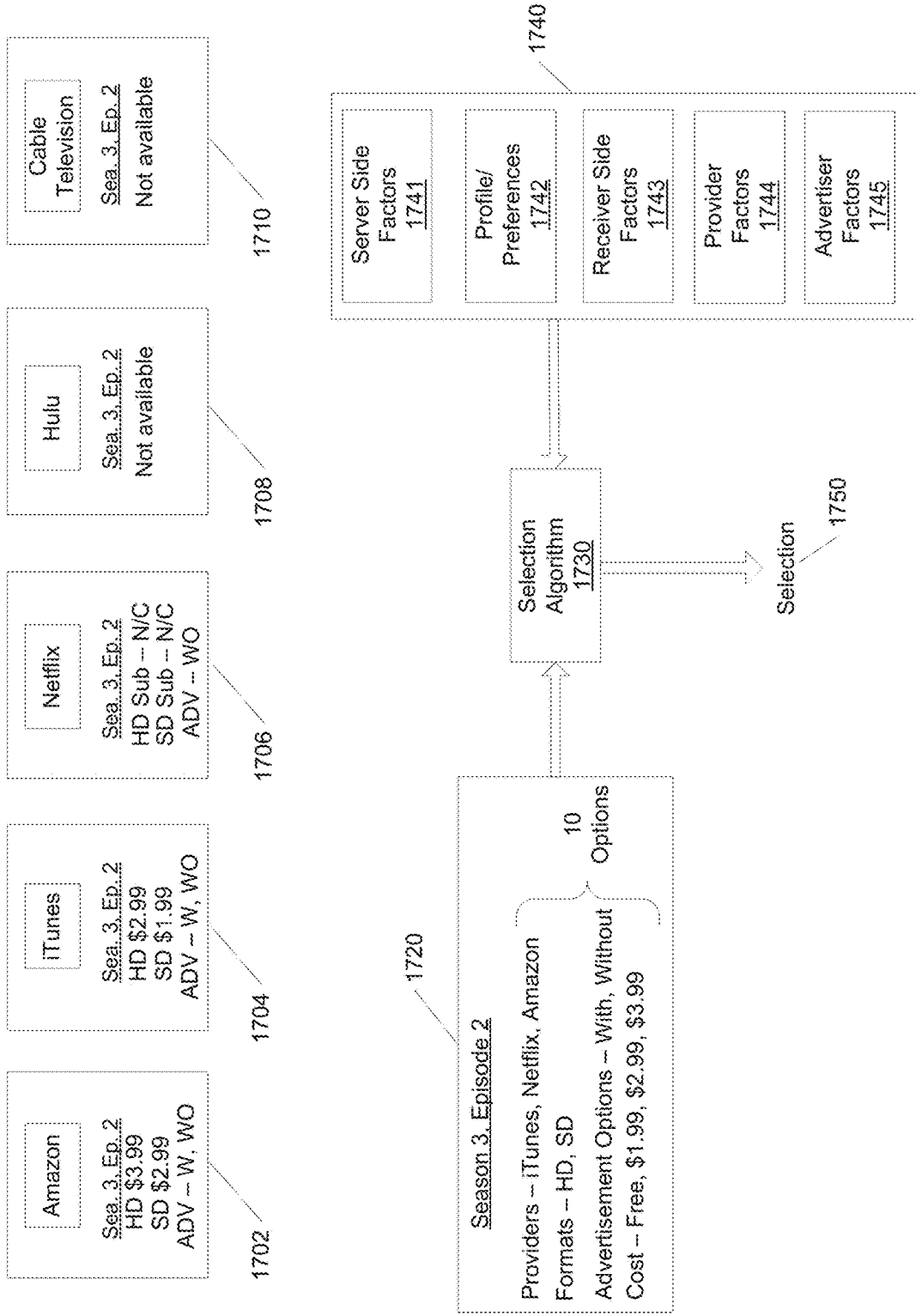
FIG. 17 depicts one embodiment of a method for prioritizing presentation of video content.

FIG. 17 depicts one embodiment in which multiple options for content are available. In the example shown, five secondary providers 1702, 1704, 1706, 1708 and 1710 are shown. The particular content in question is Season 3, Episode 2 of a given series. For this given episode, box 1720 shows there are 10 different selections available. There are three secondary providers of the particular content available—iTunes, Netflix, and Amazon. The content is available in both HD and SD. The content is available for free (Netflix subscription—no additional charge N/C), at a cost of $1.99, $2.99, and $3.99. Finally, the content is available with or without advertisements. All 10 options serve as input to a selection algorithm 1730. Also serving as input to the selection algorithm are server side factors 1741, viewer profile/preferences 1742, receiver side factors 1743, provider factors 1744, and advertiser factors 1745 (collectively factors 1740). Viewer profile/preferences 1742 may include information based on a viewer's viewing habits and activities, explicitly entered viewer preferences or information, profile and/or preference information related to other viewers, or any combination of these. Such profile and/or preference information may generally be referred to as a viewer "profile" herein. Server side factors 1741 may include processing and bandwidth considerations. Profile/Preferences 1742 have been discussed. Receiver side factors 1743 may include information received from a target device regarding processing, memory, or other condition that may affect performance. Provider factors 1744 may include agreements with secondary providers regarding how content is to be provided. Finally, advertiser factors 1745 may include agreements with advertisers how advertisements are to be presented. As may be appreciated, many other factors are possible and are contemplated.

Given the available content options and factors 1740, the algorithm 1730 selects one or more of the options for presentation to the viewer. Such a process may be repeated as need to generate a plurality of items for presentation to a viewer (e.g., a number of episodes of a given series).

In the following discussion, various embodiments of the operation of a receiving device and interface are shown. Generally speaking, the embodiments described in the following figures are configured to operate with the embodiments in the foregoing description. It is further noted that the following described embodiments may be implemented in association with other video content delivery systems. For example, the following embodiments may be utilized in association with traditional cable or satellite television systems, special purpose set top boxes (e.g., Roku type boxes), Internet video providers, and so on. All such embodiments are contemplated.

As discussed above, individual subscribers may be identified based on a particular device being used (e.g., a remote control), a password, login information, biometric data, or otherwise. Based on such identification, a subscribers content may also follow the subscriber as already noted. In addition to such embodiments, in various embodiments multiple users may be identified as being authorized for a given subscription. For example, multiple users within a given home may be identifiable and have content tailored for them. In such embodiments, various settings may be available to control the system behavior as it relates to a given user. For example, children within a home may be restricted from accessing content that parent's deem inappropriate for the children. Additionally, separate viewing histories and profiles may be maintained for each user such that recommendations may be tailored to a particular user. Still further, each user may establish their own lists of favorites, friends, and so on, in order to create a complete environment that is tailored according to their own needs and desires. These and other embodiments are discussed in the following.

Figure 18:
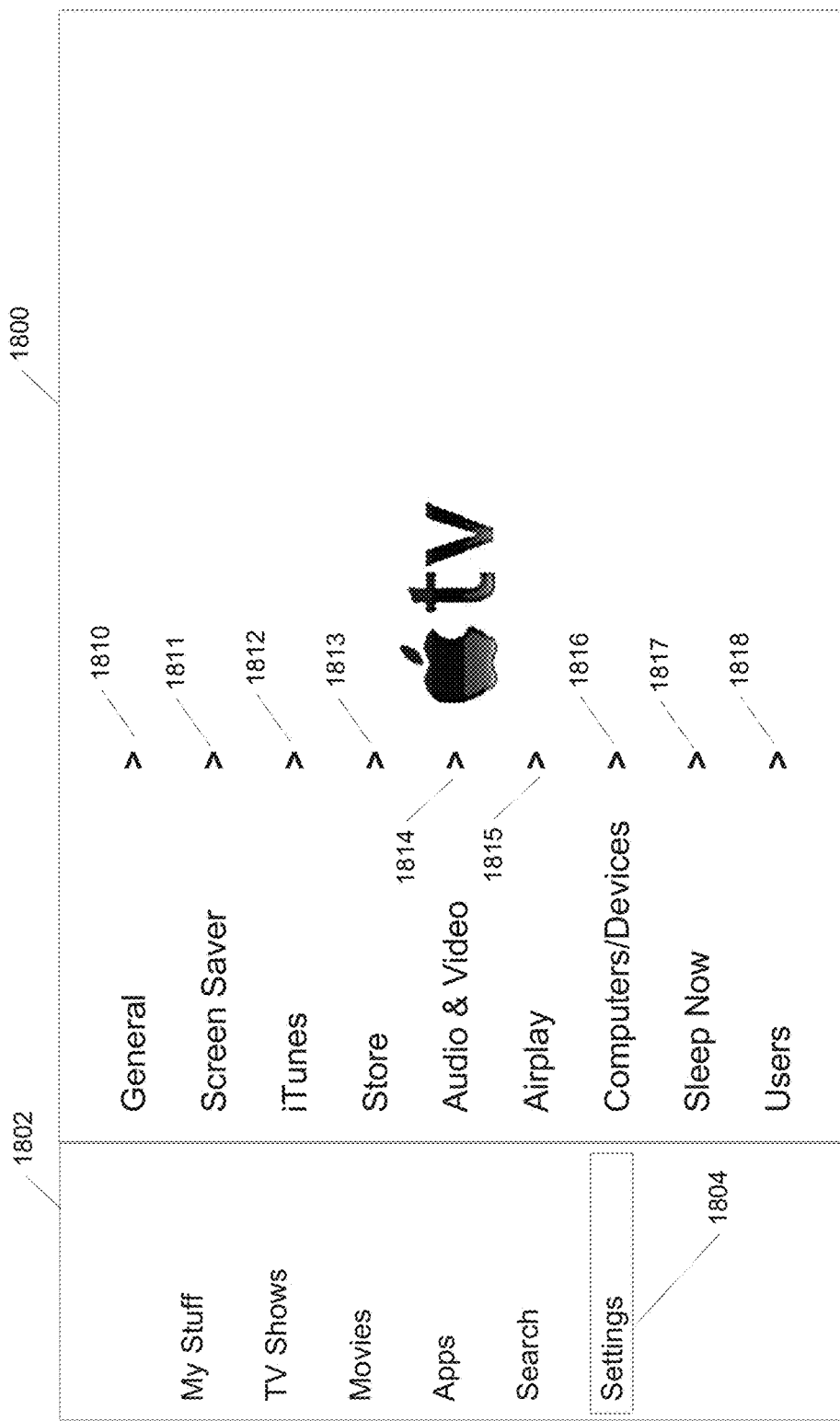
FIG. 18 depicts one embodiment of a video display and user interface.

FIG. 18 depicts one embodiment of a display 1800 with a user interface. In the example shown, the interface includes a sidebar 1802 with a listing of multiple categories. In particular, the categories include My Stuff, TV Shows, Movies, Apps, Search, and Settings. When a particular category is selected by the user, the portion of the display to the right of the sidebar displays content related to the selected category. In this particular example, the Settings category 1804 is selected (or otherwise highlighted) which causes the display of the subcategories 1810-1818. In this example, the display of a given subcategory also includes an indication (the symbol ">" in this example) that serves to indicate the subcategory may be selected to display further items. Generally speaking, the Settings category 1804 may allow the user to configure various aspects of the system. In various embodiments, the interface which is generated may be generated as an overlay by a set top box, circuitry incorporated in a television or other video device, a remote server, or otherwise. Additionally, settings configured by a user may be stored locally and/or remotely.

Figure 19:
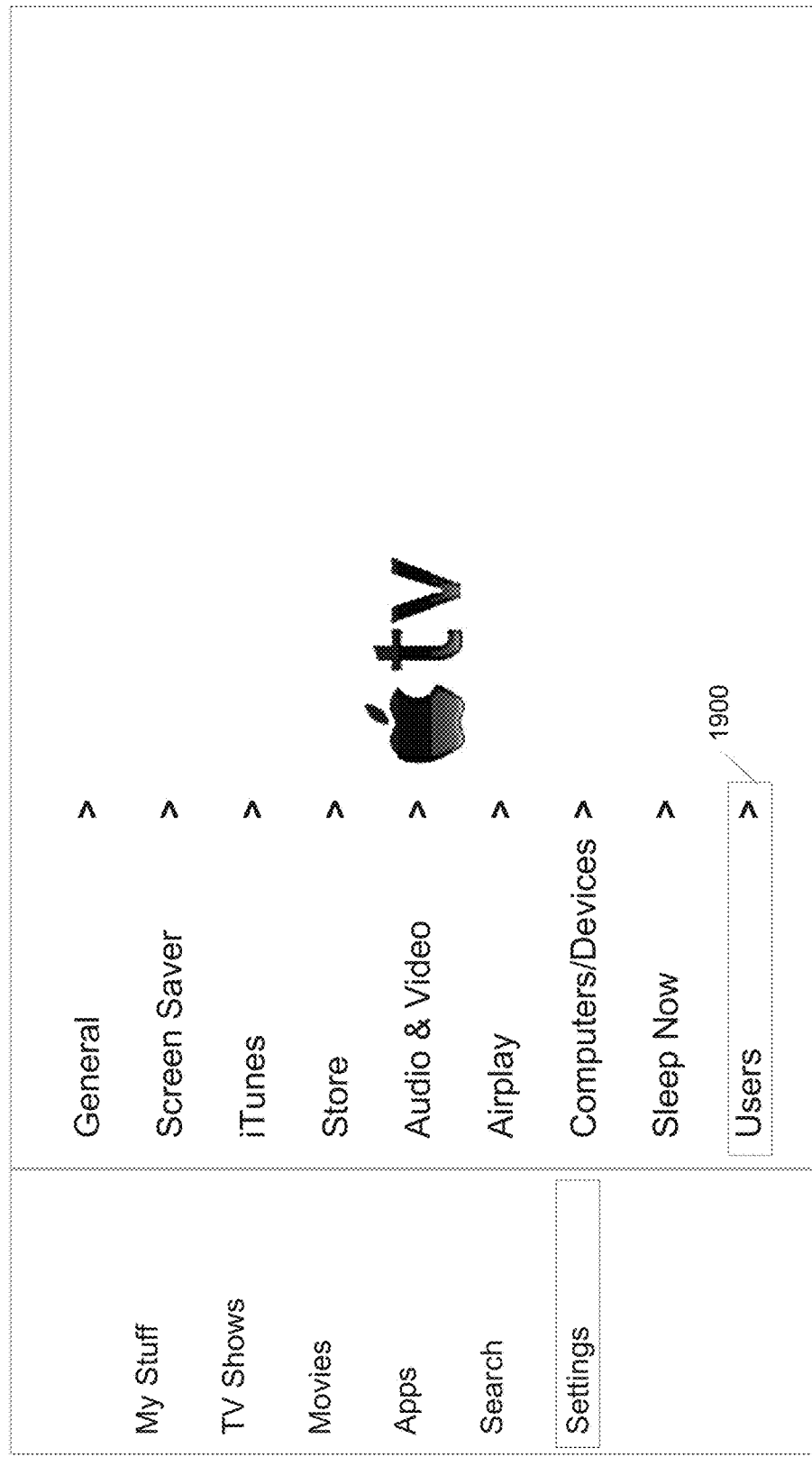
FIG. 19 depicts one embodiment of a video display and user interface.
Figure 20:
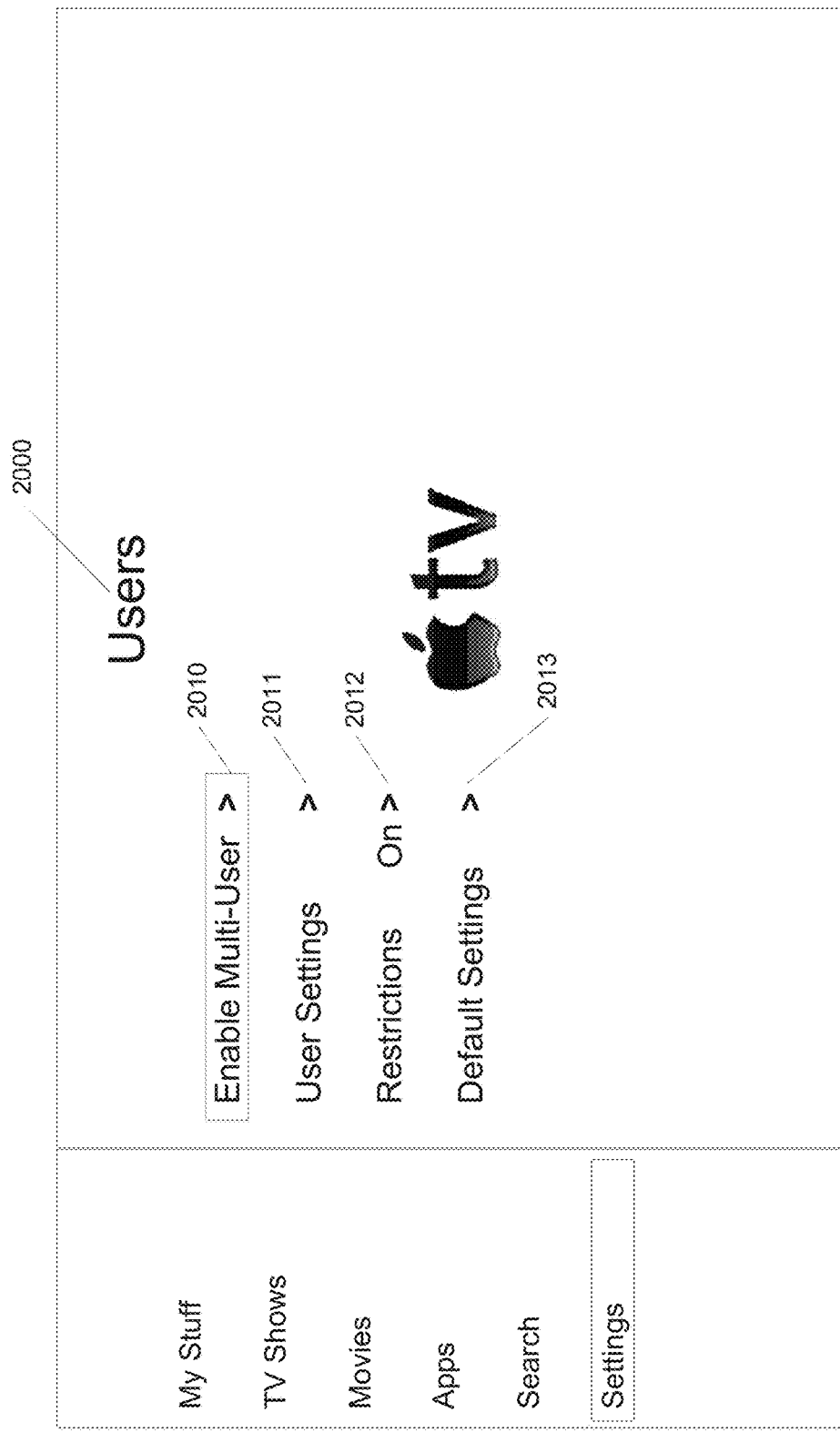
FIG. 20 depicts one embodiment of a video display and user interface.

In the embodiment of FIG. 18, the various subcategories available under the Settings category 1804 include General 1810, Screen Saver 1811, iTunes 1812, Store 1813, Audio & Video 1814, Airplay 1815, Computers/Devices 1816, Sleep Now 1817, and Users 1818. In this example, we will explore settings related to the configuration of multiple users of the system. Accordingly, FIG. 19 depicts the highlighting of the Users subcategory 1900 which when selected causes the display of user related items. One embodiment of such items is shown in FIG. 20. In various embodiments, traversing various levels of the Settings menu items may include the display of an indication 2000 of which item is currently being displayed. In an embodiment in which the menu items are arranged hierarchically, the displayed indication 2000 may indicate some portion of the hierarchy being presented. Some embodiments may include the display of the entire path (e.g., Settings→Users). Various such embodiments are possible and are contemplated.

In the example of FIG. 20, the Users 2000 subcategory includes four subcategories. In particular, the subcategories Enable Multi-User 2010, User Settings 2011, Restrictions 2012, and Default Settings 2013 are shown. The Enable Multi-User 2010 subcategory may be accessed to enable or disable the use of multiple users in the system for a given subscription. In some cases, there may be need or desire to have multiple users identified. For example, if the home only includes one user, then multiple user identification may not be needed. In some cases, a home may include a couple who wish to have only a single user identified. In other cases, enabling multi-user capability may be desired. For example, a home including adults, teenagers, and younger children may be a good candidate for multi-user identification for a given subscription. Each of these groups of viewers may have very distinct viewing preferences, friends, and so on. It is noted that the categories and subcategories discussed here and elsewhere are exemplary only. Any suitable categories and subcategories may be included or excluded as desired.

The User Settings subcategory 2011 may be accessed to configure particular settings for users of the system. The Restrictions subcategory 2012 may be accessed to configure various restrictions on users of the system. For example, a parent may enable restrictions to control content accessible by users of the system, control functions that may be performed by various users, and so on. Enabling such restrictions may include password or login protection to prevent others from gaining access to the Restrictions subcategory 2012 or otherwise making changes to such restrictions. In the example shown, the Restrictions subcategory 2012 further includes an indication as to whether restrictions are enabled. In this example, restrictions are shown to be "On". Finally a Default Settings subcategory 2013 is included. In various embodiments, the Default Settings subcategory 2013 may be used to establish default settings and configurations for the system. Such default settings may be used when a particular user has not been identified. For example, if a user doesn't wish to be identified for a given viewing session, then default settings may be used to control content which is accessible and/or functions which may be performed. As another example, default settings may be used for a "guest" viewer who does not have a user identification for the system. For example, a guest in the home may use the system without having to login. Still further, default settings may be used in the case of a failed login attempt. These and other embodiments are possible and are contemplated.

Figure 21:
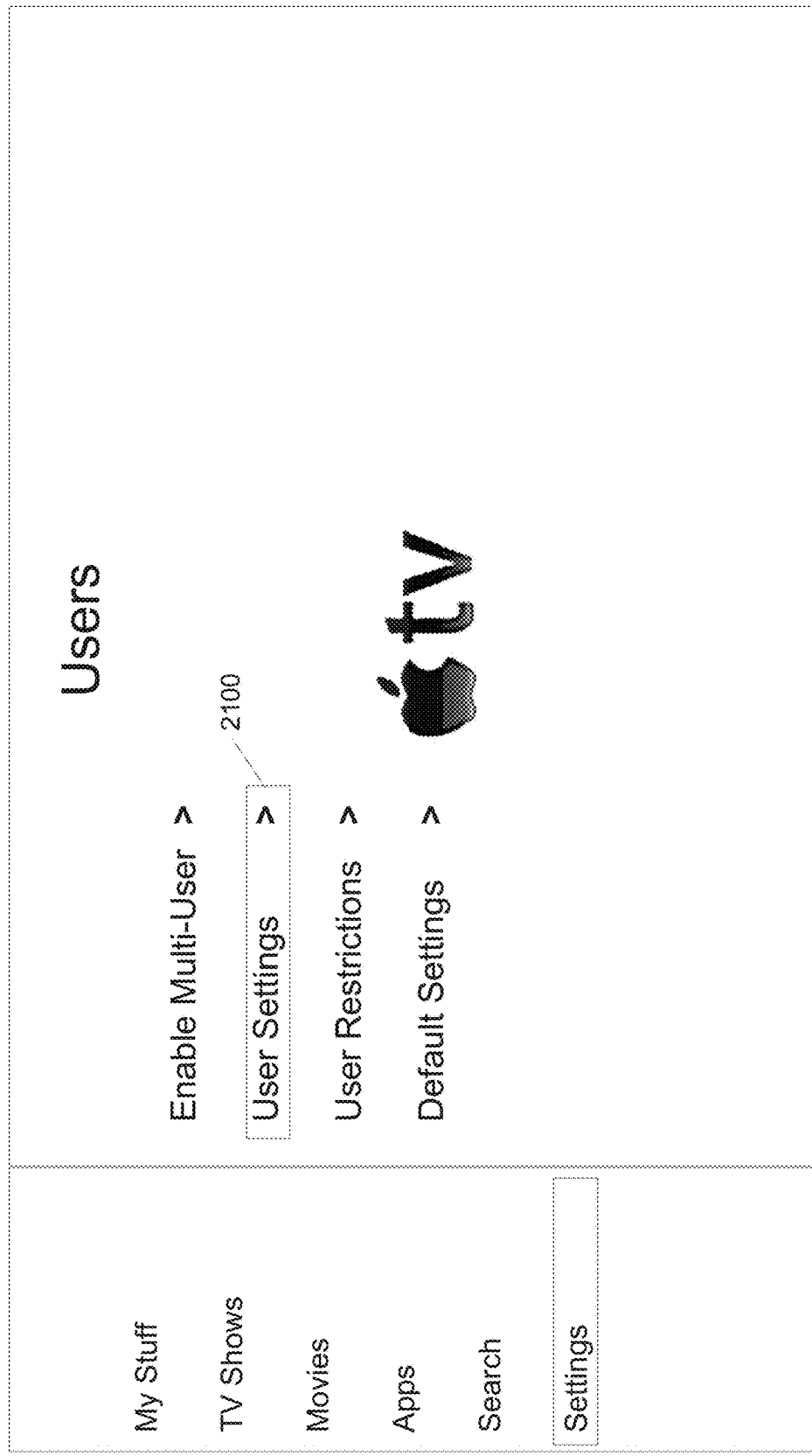
FIG. 21 depicts one embodiment of a video display and user interface.
Figure 22:
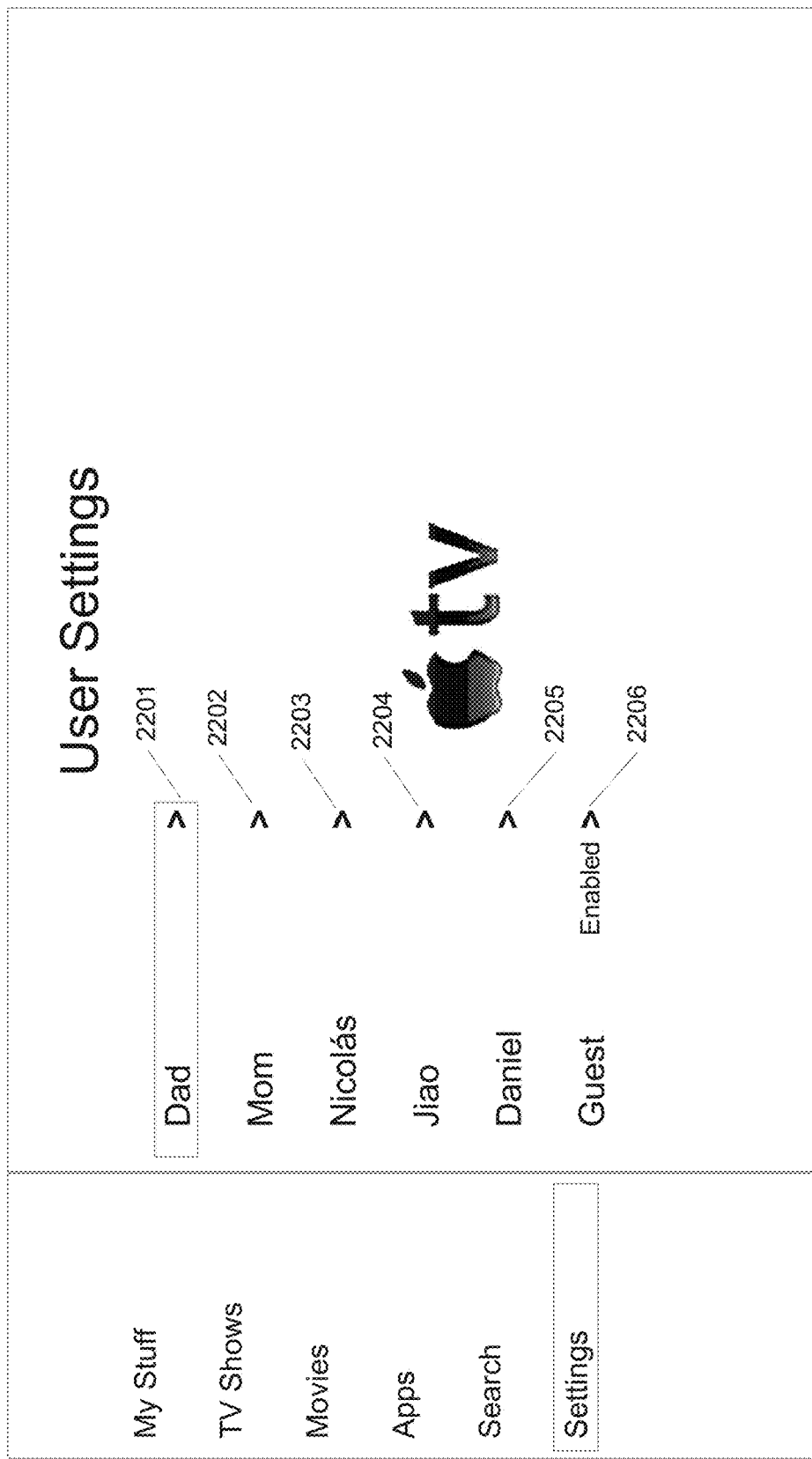
FIG. 22 depicts one embodiment of a video display and user interface.

Assuming a user selects the User Settings subcategory 2100 as shown in FIG. 21, a display such as that shown in FIG. 22 may be presented. In the example shown, a number of registered users 2201-2205 of the system are identified. In various embodiments, all of the users identified are associated with a single subscription. In other embodiments, multiple subscriptions may be available and configured with users in various combinations. However, for ease of discussion a single subscription with multiple users is described. Though it is to be understood that the methods and mechanisms described may be applied in the case of multiple subscriptions as well. Registration of a user may generally entail the creation of an identifier and settings for a user of the system. Selection of a given user 2201-2205 will provide access to settings for the selected user. In one embodiment, users 2201-2205 represent specific users that are identifiable or have otherwise been configured to use the system. In addition to these is a Guest user setting 2206. As per the discussion above, in various embodiments a user may cause their subscription content to be viewable on another users television. For example, one user's smart phone may be identifiable by another user's set top box. In various embodiments, such functionality may be enabled or disabled via a setting such as the Guest setting 2206 in FIG. 22. When disabled, a user may not be permitted to have their subscription content viewed via a display device on which the Guest setting is disabled. Various such embodiments are possible and are contemplated.

Figure 23:
FIG. 23 depicts one embodiment of a video display and user interface.

Assuming the Dad user 2201 is selected in FIG. 22, a display such as that of FIG. 23 may be presented. In the embodiment shown, an identification of the user 2300 is provided (Dad's Settings). In addition, a number of subcategories 2301-2307 are provided which allow various settings for the user to be configured. The first setting shown is a "Breadcrumbs" setting 2301. In various embodiments, the Breadcrumbs setting 2301 is used to enable or disable tracking of a user's viewing history and/or other actions within the system. For example, as a viewer is channel surfing, a history of the channels visited and the order in which they are visited may be maintained. Such a history may then be accessed by the user which enables them to move back through the history or directly access any given part of the history (e.g., by directly tuning to a program that was previously being watched). Presentation of the history may be in the form of a list, a presentation of multiple video displays (e.g., such as the miniature video displays of FIG. 26), or otherwise.

A second setting provided is a Ratings For setting 2302. This setting may be used to select a rating scheme used in a particular country or region. For example, FIG. 23 indicates that a rating scheme for the United States is currently selected (e.g., the Motion Picture Association of America film rating system). It is noted that multiple rating schemes may be configurable. For example, rating schemes for movies, television, games, music and other content may be configurable. FIG. 23 also shows the Music & Podcasts 2303 rating is currently set to "Clean". Alternatives settings for Music & Podcasts 2303 may include "Explicit" and/or others. Both the Movies 2304 and TV Shows 2305 settings are currently set to the "R" rating which will permit viewing of such content up to and including R rated content (e.g., G, PG, PG-13, and R). Also included is a Purchases setting 2306. This setting may allow or disallow purchases by the current user 2300. Such purchases may be for movies, television programs, games, apps, or otherwise. Also shown is a Require Password 2307 category that may be used to configure whether or not the user must enter a password when making purchases or making other changes. In some embodiments, entry of a password may be effective for a given period of time such that it need not be entered again during that duration. For example, the time could be set to 15 minutes, 30 minutes, 1 hour, and so on. In the example of FIG. 23, setting 2307 is currently set to "Immediately" which means the password must always be entered when a purchase or change is to be made.

Figure 24:
FIG. 24 depicts one embodiment of a video display and user interface.

Turning now to FIG. 24, one embodiment of settings for the Breadcrumbs subcategory is shown. In this example, an identification of the user and subcategory (Dad's Breadcrumbs) 2400 is shown. Settings in this example include Enable 2401, Duration 2402, Format 2403, Last Reset 2404, and Reset 2405. The Enable setting 2401 may be used to enable and disable the use of Breadcrumbs (tracking of history). In this embodiment, a graphic element in the form of a switch is presented and is currently set to "On" (enabled). The duration setting may be used to set how long into the past the breadcrumbs/history is to be maintained. In the example shown, the current setting is "Forever". A setting of Forever indicates the breadcrumbs/history are to be maintained indefinitely. By maintaining breadcrumbs/history forever, a user may be able to go to last week, last year, or 5 years ago on a particular date. Depending on how much of a history has been maintained, a calendar or timeline is presented which corresponds to the length of the history. For example, assuming a history of 3 months, a user may traverse back in time through the entire viewing history (every item). Alternatively, the user may cause the display of a calendar which permits selection of a given day, week, or month. A user may further be provided the ability to search through their history using keywords (e.g., title keywords, actors, genre, etc.). Such a search may be input via remote control or voice input (e.g., via simple voice input or via intelligent voice assistant such as Apple's Ski). In this manner, a user who may remember watching a particular show, but not remember either when it was watched or the title, may search to find the show. Numerous such embodiments are possible and are contemplated.

The Last Reset setting 2404 indicates the most recent reset of the Breadcrumbs setting. In various embodiments, a reset clears all history prior to that date. The Reset setting 2405 is used to perform such a reset. For example, if Duration 2402 is set to Forever, there is no limitation on how long the breadcrumbs/history are to be maintained. In such a case, Reset 2405 will clear the history and maintaining of the history will begin anew. In the example shown, the last reset is shown to have occurred on Jul. 12, 2010. Consequently, a history from the present back to Jul. 12, 2010 will be currently available.

Figure 25:
FIG. 25 depicts one embodiment of a video display and user interface.

FIG. 25 illustrates one embodiment of the Default Settings 2500. Generally speaking, the settings 2501-2506 here correspond to those of FIG. 23 (2301-2306). However, in this case there is no Require Password setting as the Default setting/profile may not be permitted to make purchases or changes to the system. Other embodiments may allow for purchases and/or changes and may utilize a Require Password setting similar to that of FIG. 23.

Having the ability to identify multiple users in the system, allows for content to be tailored to individual users. In various embodiments, assuming multi-user functionality is available and/or enabled, when a user wishes to use the system they may identify themselves via login, voice input, biometric input, or otherwise. For example, when turning on a display device (television, set top box, launching a video app on a computing device, etc.), the system may respond with a query as to whether or not the user wishes to be identified. In such a case, the viewer may decline and use default settings or accept and be identified. Identification may be performed in a manner similar to that of FIG. 14.

In some embodiments, the system may be configured to query a user if they wish to be identified (or use a particular user's settings) when the user picks up a remote control. Such detection may be via accelerometer, gyroscope, or otherwise. Other embodiments may include a particular remote control button or menu item which permits establishing a particular user's settings. In some embodiments, a user may be automatically identified based on a device being used to access the system. For example, as described in relation to FIG. 14, a particular device such as a smart phone may be associated with a particular user. Based on such an association, the user may be identified. As a particular device could be used by someone rather than the actual owner of the device, an additional authentication mechanism such as login or password procedure may be used to confirm the user's identification. It is also noted that one or more of the user's configured in a given system may have a password or other mechanism required in order to gain access to that user's settings. In this manner, parents can prevent children from user the parent's settings to gain access to content not accessible via their own settings.

Figure 26:
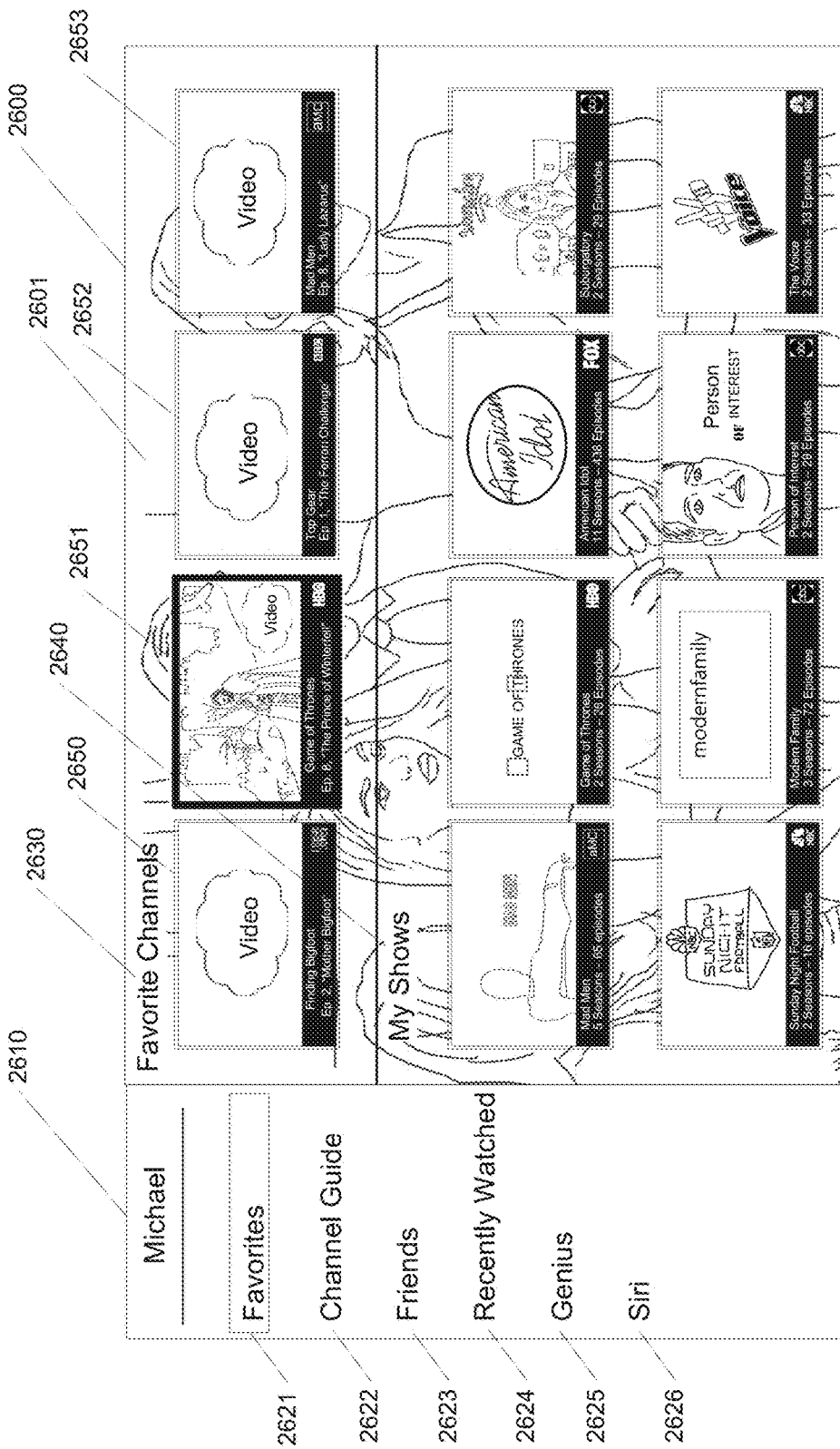
FIG. 26 depicts one embodiment of a video display and user interface.

Turning now to FIG. 26, one embodiment of a display 2600 is shown with the presentation of video content 2601. However, in this example, one embodiment of a "side bar" 2610 is presented with other content that will be described. It is noted that while the "side bar" is described as such for purposes of discussion, in various embodiments, the side bar may in fact be presented along the top, bottom, opposite side, center, or otherwise. For example, an embodiment in which the side bar is presented in the center may have related content displayed surrounding the bar. All such embodiments are contemplated. In various embodiments, the side bar 2610 and/or related elements are generated (e.g., by a set-top box) as overlays. However, as with all overlays discussed herein, presentation as integrated video elements is possible as well.

As shown in FIG. 26, the side bar 2610 includes an identification of a particular user (Michael) whose settings are currently in effect. In addition, multiple elements 2621-2626 that may be highlighted and/or selected by a viewer (e.g., using input via a remote control device). In this example, the displayed elements generally correspond to categories including Favorites 2621, Channel Guide 2622, Friends 2623, Recently Watched 2624. Also shown is a Recommendations category 2625 that may be selected to provide recommendations based on other content the viewer has watched, liked, purchased, rented, and so on. Further, a Voice Assistant category 2626 is included which may be selected for use in providing voice input to the system (e.g., directives, queries, etc.). Overlaying the remainder of the display are other side bar related elements. In this example, the Favorites element 2621 has been highlighted or selected by a viewer. In response to such a selection, video and/or other media content that the viewer has indicated are favorites of the viewer are displayed to the right. In this example, the favorite content includes Favorite Channels 2630 and favorite shows termed My Shows 2640.

In the Favorite Channels 2630 portion of the display, channels that have been previously identified by the user (Michael) as favorites are shown. In this example, four channel elements 2650-2653 ("channels") are displayed—each showing video content for the corresponding channel. The display of the channels is that of a miniature display with an aspect ratio that corresponds to a typical television. As may be appreciated, the size and aspect ratio of the depicted channels may differ from that shown. Additionally, the number of "channels" shown may be more than four, or fewer than four. For example, a large number of such channels may be depicted by making each of the channel depictions smaller. It is also noted that not all such channel depictions need be the same size. In various embodiments, some may be larger than the others. All such alternative embodiments are contemplated. The video content being shown for each channel may be live broadcast video, for example, or otherwise.

In the embodiment shown, each channel depiction includes not only video content for the corresponding channel, but also a description at the lower part of the depiction which identifies the television series to which the video content corresponds, an episode number for the television show, a title for the particular television show, and an identification of the channel. For example, channel element 2651 provides the series title Game of Thrones, with episode 8 (Ep. 8) entitled "The Prince of Winterfell" currently being displayed. The channel identifier identifies the corresponding channel as HBO. It is noted that in this discussion, and elsewhere in the described embodiments, various embodiments may permit the viewer to configure the system such that video may or may not be displayed. For example, in some cases, it may not be desirable to have video displayed which would include "spoilers". In various embodiments, the system may be configured so that only animations, still pictures, or "innocuous" (non-spoiling) video is displayed. In some cases, it may be configurable based on category. For example, the viewer may not wish to see video displayed for sports events which may give away the winner/winning team. In other embodiments, the viewer may wish to see the video for multiple sporting events at a time so that all may be watched simultaneously. All such embodiments are contemplated.

In the My Shows 2640 portion of the display, television shows previously identified by the user (Michael) for inclusion in this category are shown. In this example, eight television show elements are depicted. In this example, the television shows are depicted in a manner similar to that of the channels discussed above, and may vary in their depictions according to the above discussion as well. In the embodiment shown, each of the favorite shows depicts artwork for the corresponding show. However, as above, video or other content may be displayed. For each of the eight shows depicted, the lower portion of the depicted show includes descriptive information including a title of the show, how many seasons of the show (television series) are available for viewing, how many total episodes are available for viewing, and an identifier for the channel which carries the show. For example, the show in the upper left portion of My Shows 2640 depicts the Mad Men television show. Artwork representative of the television show is depicted. The title "Mad Men" is provided along with an indication that 5 seasons and 65 episodes are available for viewing. The identified channel in this case is AMC.

It is noted that while the example of FIG. 26 depicts four channels and eight shows, they could be divided differently. For example, a larger number of channels than shows could be depicted. In various embodiments, the viewer may scroll or page through each category (Channels and Shows) of elements to view different channels and/or shows. Additionally, the viewer may use a remote control to dynamically change how many elements are depicted at once. For example, a viewer may zoom in on a single show to enlarge its depiction. Alternatively, a viewer may effectively zoom out to increase the number of shows depicted to twelve, sixteen, or some other number of elements. In addition, in various embodiments, the underlying video content 2601 may be the content being displayed at the time the viewer caused the side bar 2610 to be displayed. In various embodiments, the viewer may cause the audio for one of the elements 2650-2653 (or one of the shows) to be presented by moving the focus to that corresponding element. For example, in FIG. 26 the bold outline indicates element 2651 has focus and the audio for Game of Thrones may then be presented. In some embodiments, moving focus to an element may cause the corresponding channel or show to be displayed as the underlying content 2601. All such embodiments are contemplated.

Figure 27:
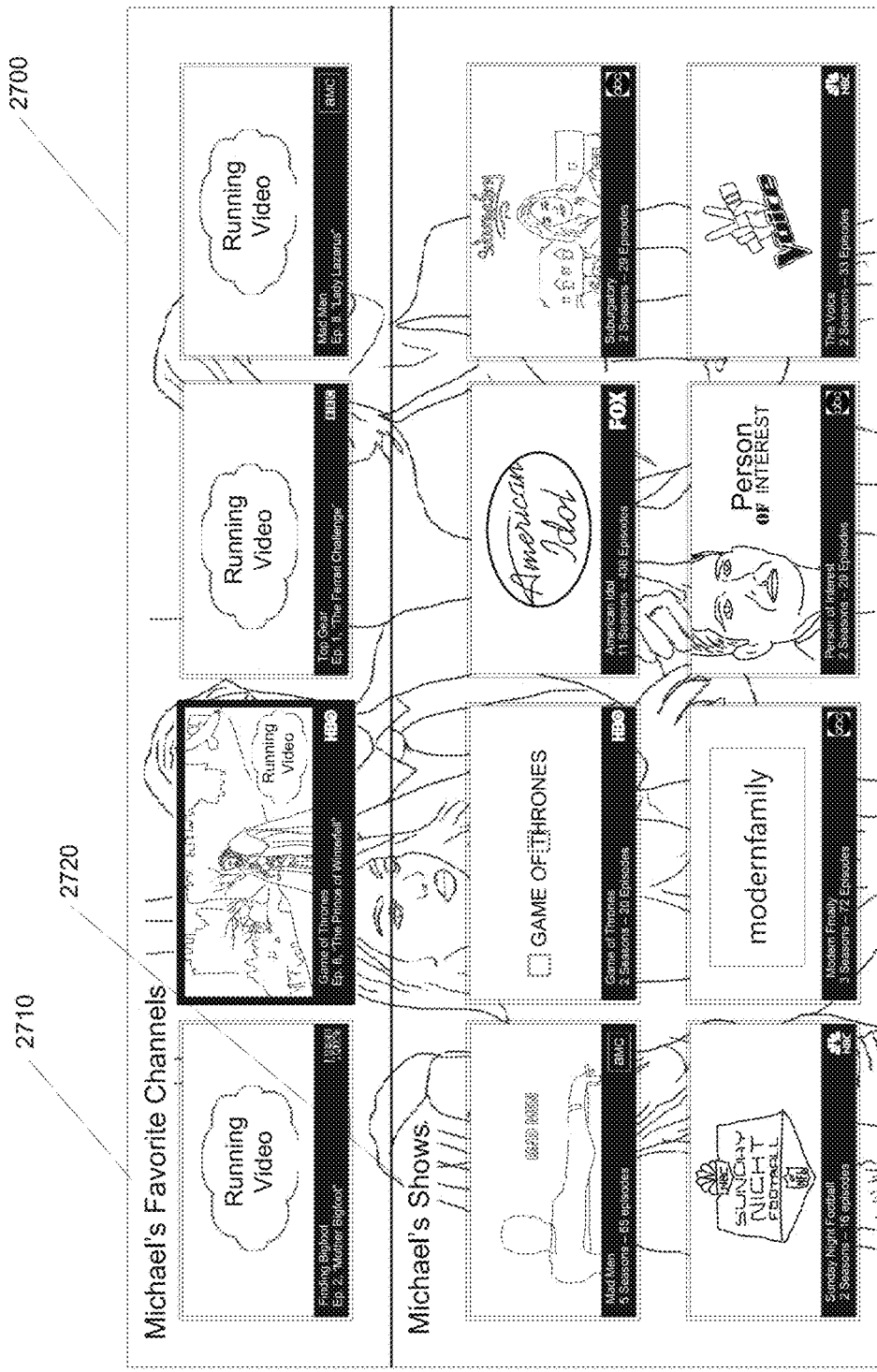
FIG. 27 depicts one embodiment of a video display and user interface.

FIG. 27 depicts a display 2700 the shows the side bar content of FIG. 26 without the side bar itself. In various embodiments, a viewer may use an input device to display or not display the side bar. Another input may be used to cause the side bar content to be removed entirely so that the underlying content is displayed in an unobstructed manner. In this example, there is no sidebar to indicate which user's settings are in effect. Therefore, selected headings have been changed to reflect the current user (settings). Here the Favorite Channels header has been changed to Michael's Favorite Channels, and My Shows has been changed to Michael's Shows.

Figure 28:
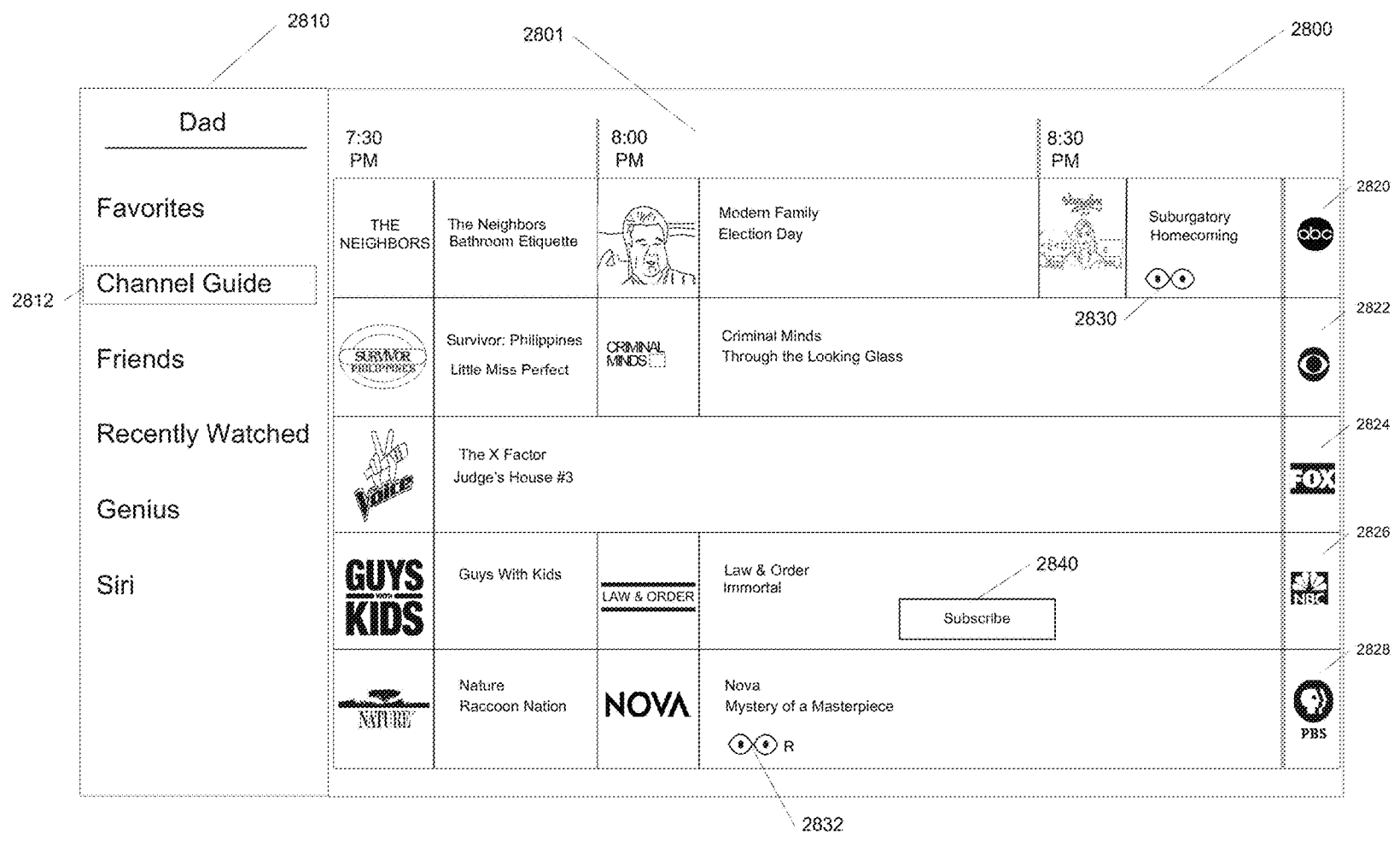

Turning now to FIG. 28, the side bar 2810 is again depicted on a display 2800. The side bar 2810 also indicates which user's settings are in effect (Dad). In this example, the Channel Guide element 2812 has been highlighted/has focus/or has been selected. In the embodiment shown, selection of the Channel Guide causes display of information regarding available channels. In this example, the embodiment is an electronic program guide (EPG) type display. Included is a time bar 2801 displaying time periods for the grid. A separate row is included for each of five different television channels—ABC 2826, CBS 2822, FOX 2824, NBC 2826, and PBS 2828. Each portion of the grid for a given time slot then displays an image and descriptive information such as series title, and episode title for a television program. For example, the 7:30 PM time slot for the CBS network includes an image for the Survivor Philippines series with series title and episode title Little Miss Perfect. In this example, the display corresponds to live television broadcast and the scrubber depicts an already broadcast portion (light colored) and an as yet broadcast portion (darker colored). However, a "watch now" indicator 2830 indicator appears for the show "Suburgatory" to be broadcast at 8:30 PM. As suggested, this indicator identifies content that is available for viewing immediately. Similarly, the "Nova" program includes a watch now indicator 2832 indicating it is immediately available for viewing. Having such watch now indicators in an EPG is rather strange given the television programs correspond to future broadcasts. However, given the systems, methods and mechanisms described herein, this is entirely possible.

In various embodiments, the content depicted in FIG. 28 is selected in accordance with the current user's settings. For example, is the current user is restricted from viewing particular content, in various embodiments such content (channels and/or particular programs) will not be displayed in the EPG shown. In other embodiments, the content may be displayed but may be greyed out (or otherwise distinguishable) to indicate it is not available to the user.

As previously discussed, the systems described herein are generally agnostic as to a source of particular video content and as to a timing of its acquisition. Consequently, the constraints suggested by a typical EPG and television system and are no longer present. The television service provider which provides an EPG does so to inform the viewer as to the broadcast lineup and when particular content will be available for viewing. In this manner, the viewer can view or record the content for later viewing as desired. However, in the embodiment of FIG. 28, the EPG is provided by the primary provider to indicate to the viewer the programming schedule of various networks and not necessarily to indicate the availability of the video content. Consequently, while the Nova show "Mystery of a Masterpiece" is scheduled for broadcast on PBS from 8-9 PM, the primary provider does provide that content to the viewer by acquiring it from PBS during such a broadcast. Rather, the content is simply content that may or may not exist in the primary provider's data stores. If it does currently exist, then it may be available immediately. In this case, the episode in question is a repeat as indicated by the R designation next to the watch now indicator. Therefore, the episode is immediately available. That the episode appears in the EPG as being scheduled for broadcast beginning at 8:00 PM is happenstance.

While the NOVA episode is a repeat, the Suburgatory episode is not a repeat. The question may then arise as to how an episode which has not yet been broadcast can be immediately available for viewing. The answer lies in the record everything all the time design of the primary provider system. The Suburgatory episode is scheduled for broadcast beginning at 8:30 PM in a given time zone. However, in the present case, the episode has already aired in an earlier time zone. The content already resides in the primary provider's data stores and is immediately available for viewing. It is noted that in some cases agreements may be in place which prevent such "early viewing" of an episode. Such agreements may require that live broadcast episodes such as these be viewable during their "proper" time slots. Nevertheless, the systems described herein are fully capable of providing such early viewing and identifying such episodes in an EPG. Also shown in FIG. 28 is a selectable element 2840 that enables the viewer to subscribe to the Law & Order show (i.e., it is not currently subscribed). Selecting element 2840 may then present the viewer with options for subscribing to the series, purchasing a single episode, or otherwise. In various embodiments, if the current user is not authorized to make purchases, then this "Subscribe" option 2840 may not be presented or may not be selectable. When selecting a particular series or episode (or any other content) for a subscription, as noted above there may be many sources available for the content. For example, numerous providers may be available for episodes of Law & Order. In such cases, the viewer may select from the available options to complete the subscription. In various embodiments, the various options may be prioritized or otherwise filtered for presentation to the viewer.

Turning now to FIG. 29, the side bar is again illustrated with an identification of the current user (Dad). In the display 2900 shown, the side bar 2910 is shown with the Friends element 2912 selected. In various embodiments, the systems and methods described herein enable viewers to identify other viewers as "friends". Such identification may use explicit input of friend identifier (IDs) to identify friends, sending and accepting of friend requests, the ability to establish one-way friendships (i.e., a first viewer identifying a second as a friend does not necessitate that the second identify the first as a friend), and so on. Associated with such friends may also be configurable levels of privacy. For example, close friends may have full access to a viewer's television viewing habits. Friends that are not so close may have more limited access to such information. In some embodiments, a viewer may be able to import friends from a social networking site. Various such embodiments are possible and are contemplated.

Figure 29:
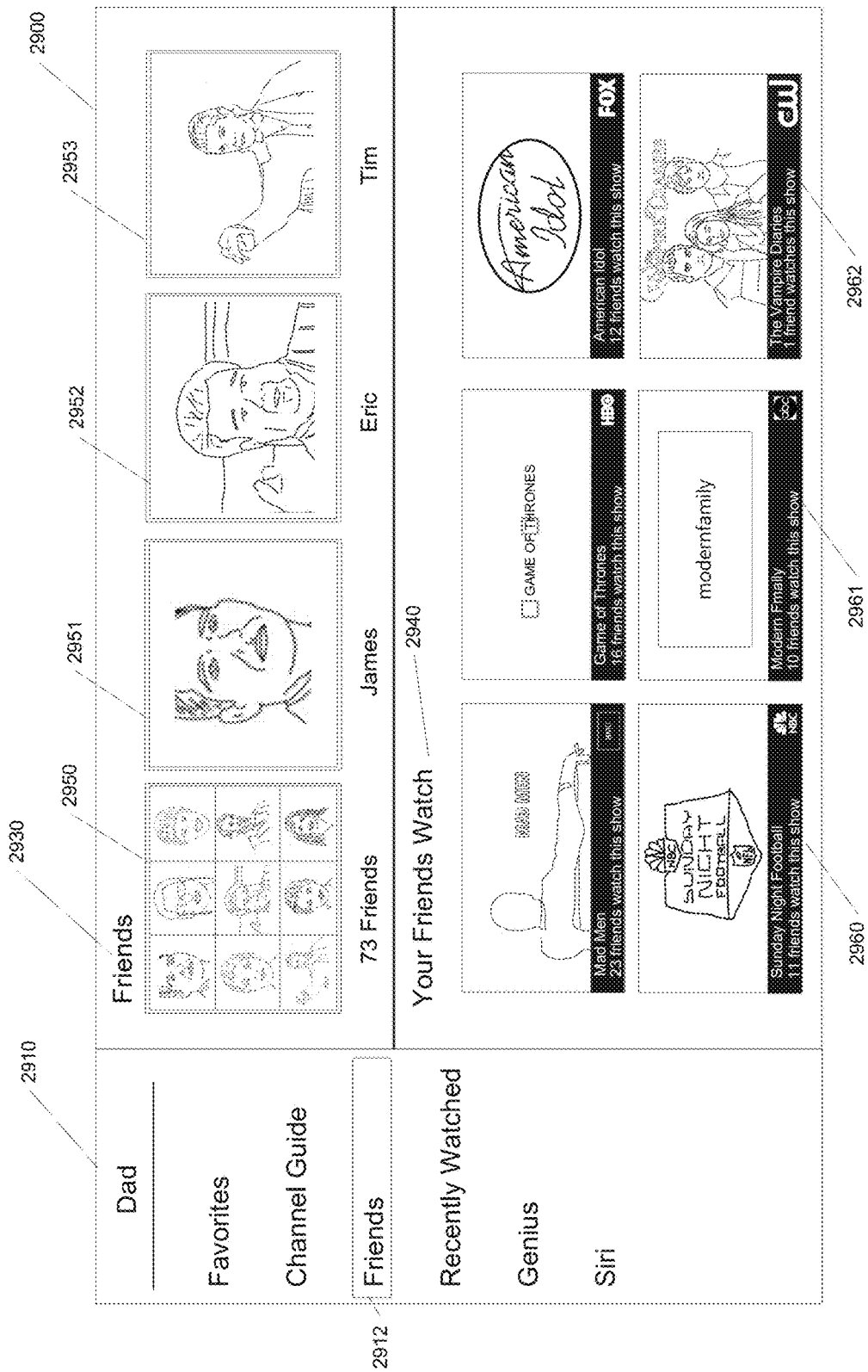
FIG. 29 depicts one embodiment of a video display and user interface.

In the embodiment shown, selection of the Friends element 2912 causes the display of a Friends 2930 category and a Your Friends Watch 2940 category. The friends category in this example includes a composite element 2950 representative of all of the current user's (Dad) friends (or some identified subset), along with selected individual friends 2951-2953 (e.g., these could be the closest friends, those most recently active in the system, those currently online, etc.). In various embodiments, friends may establish a profile within the television system that includes a picture, avatar, or other self-representation. While the Friends category 2930 depicts various friends of a viewer, the Your Friends Watch category 2940 depicts various television shows that are watched by the viewer's friends. In the example shown, artwork for each show is presented. However, other embodiments may display video (live or otherwise) for the given show. Also shown in the example of FIG. 29 is a brief description for each show in including its title an network. Additionally, each show provides an indication regarding the popularity of the show amongst friends. In the example shown, the number of friends that watch the particular show is indicated.

Figure 30:
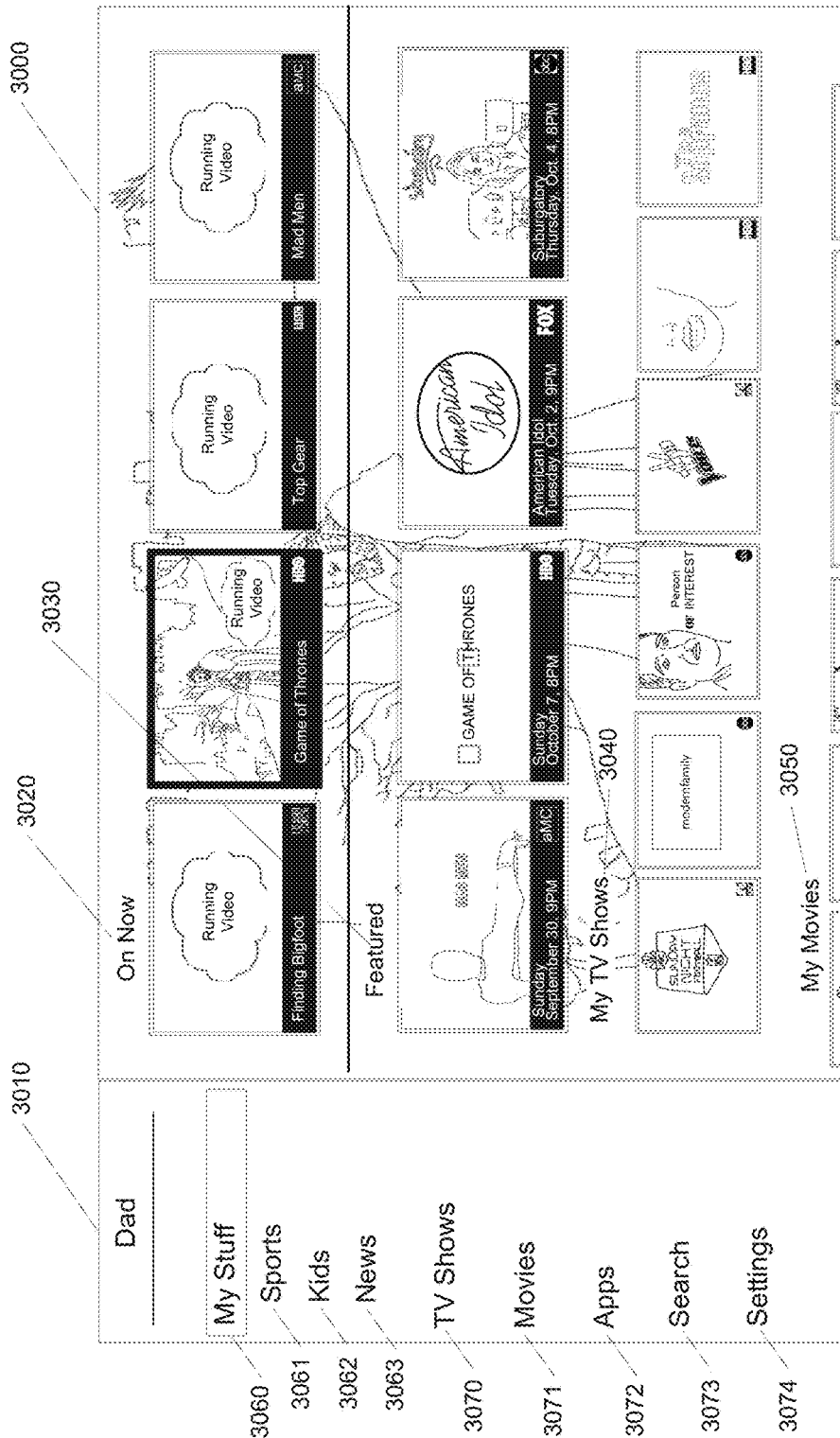
FIG. 30 depicts one embodiment of a video display and user interface.

Turning now to FIG. 30, an alternative embodiment of a side bar is shown. In the example presented, the display 3060 includes a side bar 3010 with an identification as Dad as the current user. In this embodiment, the content of the side bar and corresponding presentation is somewhat different. The side bar 3010 is shown to include six categories and a representative sample of three subcategories. The main categories depicted are My Stuff 3060, TV Shows 3070, Movies 3071, Apps 3072, Search 3073, and Settings 3074. Subcategories of the My Stuff category 3060 shown are Sports 3061, Kids 3062, and News 3063. As in the previous examples, side bar related content is shown overlaying the presented video content. In this case, My Stuff 3060 has focus and the side bar related content includes the categories On Now 3026, Featured 3030, My TV Shows 3040, and My Movies 3050.

Generally speaking, in various embodiments, the My Stuff category includes content that the current user (Dad) has identified as being reserved or otherwise set apart (collected) for easy access. This category may also include content rented or purchased by the viewer. In FIG. 30, shows that are currently being broadcast that are included in the current user's My Stuff category 3060 are displayed in the On Now 3026 portion of the display (the upper portion in this embodiment). Four such shows are displayed, though in other embodiments the number may differ. Also shown is a Featured category 3030. In various embodiments, this category may be used to promote selected shows to the viewer. Such shows may be predicted to be of interest to the viewer based on the viewer's profile or history. Alternatively, the shows could be selected based on what other people have indicated as being of interest. Still further, the selections could be made based on promotional space or time purchased by advertisers. These and other embodiments are contemplated. In this example, each promotional item includes an indication as to when and on what network the show can be viewed.

Also shown is a My TV Shows category 3040. In various embodiments, these shows have been identified by the viewer as being flagged or otherwise identified for inclusion as part of the current user's My Stuff. For example, these could represent favorite shows of the viewer. In various embodiments, artwork, video (live or otherwise), is shown for each show element. In some embodiments, particular video highlight clips may run. Finally, a My Movies category 3050 is shown. In the example shown, the corresponding elements extend beyond the bottom of the display. Accordingly, the viewer will scroll or page down to view the content. In this case, the content represents movies the viewer has identified for inclusion.

As noted in the side bar 3010, various subcategories are available under the My Stuff category 3060. In some embodiments, providing focus to one of these subcategories will cause the corresponding content displayed to the right to be filtered accordingly. For example, selection of the Sport subcategory 3061 will cause the On Now category 3026 to display sports that are currently being broadcast. Likewise, the Featured 3030, My TV Shows 3040, and My Movies 3050 categories will likewise be filtered to show sports related feature content, TV shows, and movies. In a similar manner, the subcategories Kids 3062 and News 3063 may be selected to cause the related content to be filtered for kids and news subject matter, respectively. These and other subcategories are possible and are contemplated. In various embodiments, these categories may be created by the viewer based on predefined selections. For example, numerous provider created subcategories may be chosen from for inclusion in the side bar by the viewer. In other embodiments, viewers may create, name, and define their own subcategories. Such viewer created subcategories may be made available to other viewers for inclusion in their own side bar user interfaces. All such embodiments are contemplated.

Figure 31:
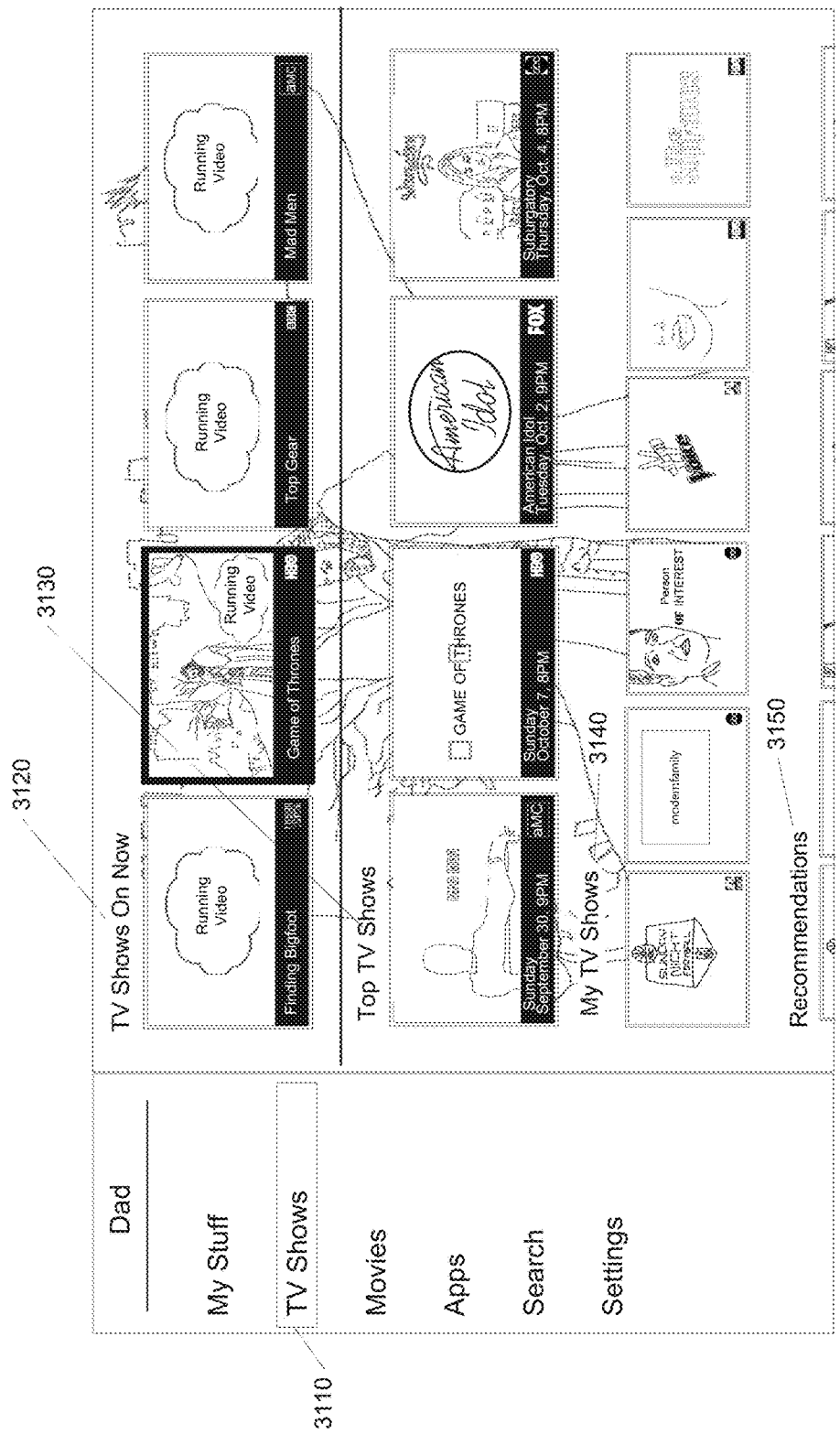
FIG. 31 depicts one embodiment of a video display and user interface.

FIG. 31 illustrates the side bar of FIG. 30 when the TV Shows category is highlighted or selected. In response to this selection, the related content which is displayed is changed to reflect this newly selected category. In this case, the related content which is displayed is related to television shows. In the exemplary embodiment of FIG. 31, there is included a TV Shows On Now category 3126, a Top TV Shows category 3130, a My TV Shows category 3140, and a Recommendations category 3150. In this case, the TV Shows On Now category 3126 may include a random selection of shows currently being broadcast or a particular selection of shows being broadcast. In various embodiments, the shows presented may be selected according to a profile for the current user (Dad). Each of the displayed elements in this category may display video of the live broadcast. The Top TV Shows 3130 may, for example, represent shows which are highly rated in general. The My TV Shows category 3140 may include depiction of television shows which the viewer has previously included as part of My Stuff. Finally, Recommendations 3150 may include television shows which are recommended to the viewer on the basis of the viewer's profile, history, friend's likes, critics reviews, current likes of the broader viewing audience, or otherwise. In other embodiments, recommendations could be based simply on the number of people watching them. In various embodiments, the Recommendations category (described here and elsewhere) includes recommended content for the current user (Dad). Such recommendations may be based on the current user's viewing history, purchases, allowed content, and so on. It is noted that in addition to such video content, advertisements may similarly be targeted to particular identified users as well. In this manner, advertising may be more effective as it may better reach those interested in the advertised product.

Figure 32:
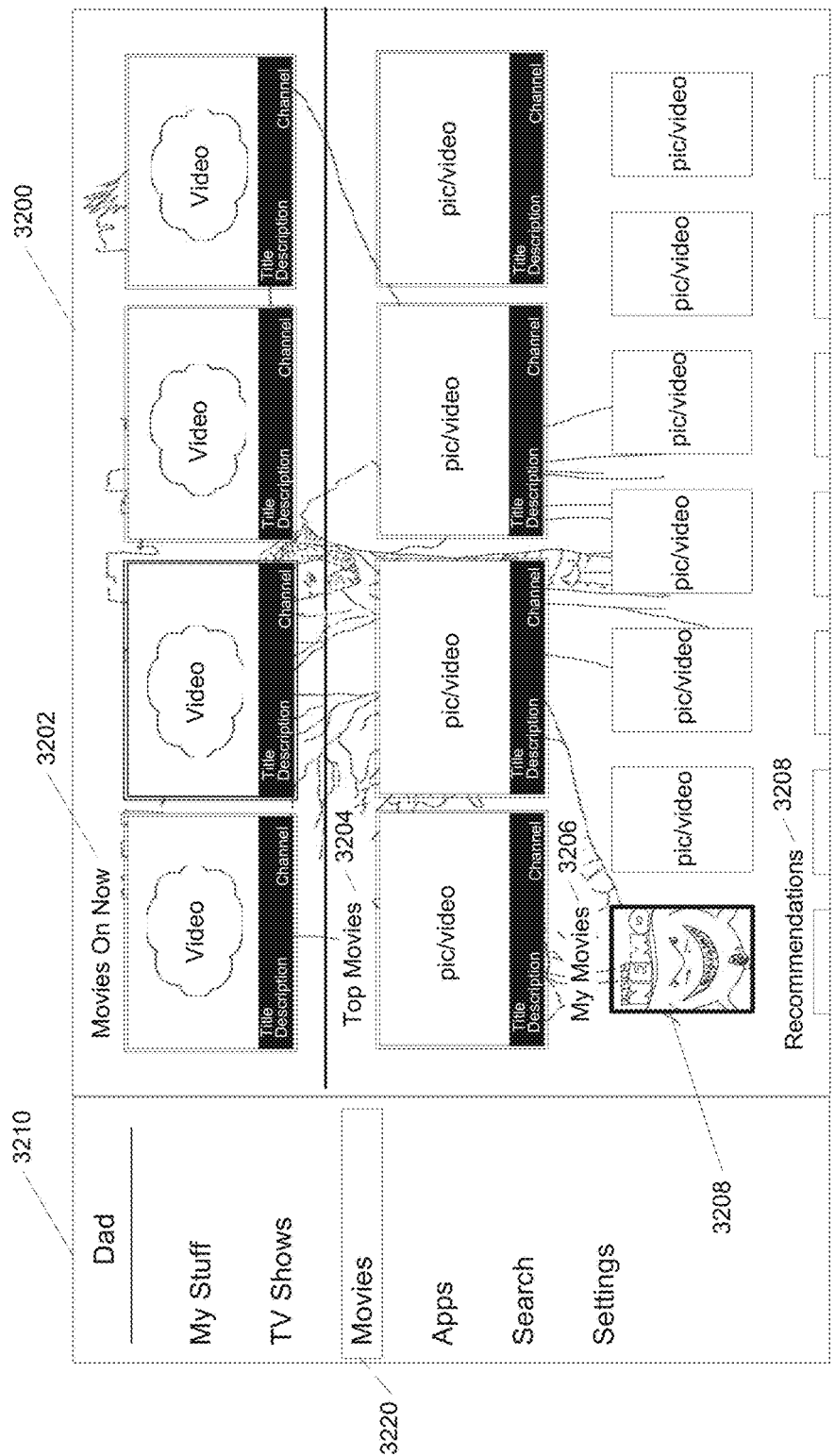
FIG. 32 depicts one embodiment of a video display and user interface.

Turning now to FIG. 32, one embodiment of a display 3200 with the side bar 3210 is shown. Side bar 3210 indicates that Dad's settings are currently in effect. In this example, the Movies category 3226 is selected which causes display of movie related content. Movies on Now 3202, Top Movies 3204, My Movies 3206, and Recommendations 3208 are shown. As may be appreciated, Movies on Now 3202 includes the display of multiple movies that are currently being broadcast—selected in accordance with the current user's settings. Video of each may be simultaneously displayed as per the previous examples. Each movie element may also include an indication of title, brief description, and title. Focus, as before, may provide for presentation of the corresponding audio.

The Top Movies 3204 category includes display of movies which are highly rated, being promoted, or otherwise. My Movies 3206 represents a collection of movies which the viewer has added to their My Stuff collection. Finally, the Recommendations category 3208 provides recommended movies to the user. Such movies may be recommended based on the current user's profile, history, friend's likes, or otherwise. As before, each of the elements may be selectable to cause the display of further content.

Figure 33:
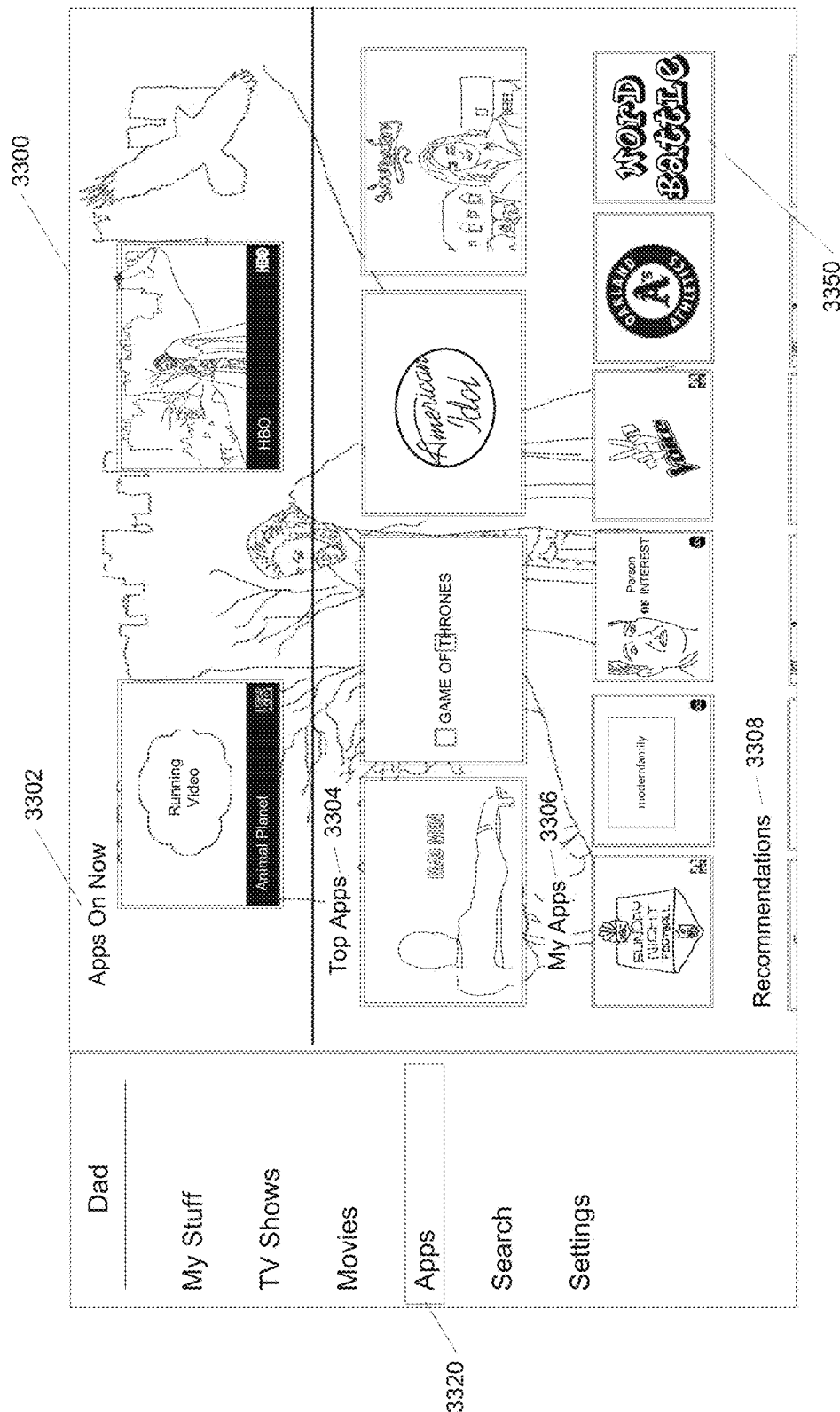
FIG. 33 depicts one embodiment of a video display and user interface.

FIG. 33 depicts the side bar with the APPS category 3326 selected. In various embodiments, various executable applications (similar to the apps available from Apple's iTunes) are available. Apps depicted may generally correspond to those purchased by the current user (Dad). In other embodiments, all apps purchased by multiple users (e.g., in a home) may be displayed. In such an embodiment, the ability to run a particular app may depend on whether the current user has permission to use the app. Apps may provide additional content related to television viewing and/or may otherwise enhance the viewing of television related content. Some apps may be executable by a set-top box. Others may be executable on a smart phone or tablet computer to provide a second screen for use while viewing television content. In the example shown, an Apps On Now category 3302 provides an indication of apps which are currently running or otherwise memory resident (e.g., in the set top box). A Top Apps category 3304 depicts various apps which are popular (for example), highly rated, etc. My Apps 3306 shows a collection of apps which are included as part of the viewer's My Stuff collection. Finally, Recommendations 3308 provides recommended apps to the viewer. It is noted that the apps needn't be strictly television viewing related. For example a game app 3350 is shown in the embodiment. Such game apps may be playable by a single person, may be playable with other viewer's, may be playable with other's via an Internet connection, or otherwise. In some embodiments, particular apps may be promoted to the side bar for easy access. All such embodiments are contemplated.

Figure 34:
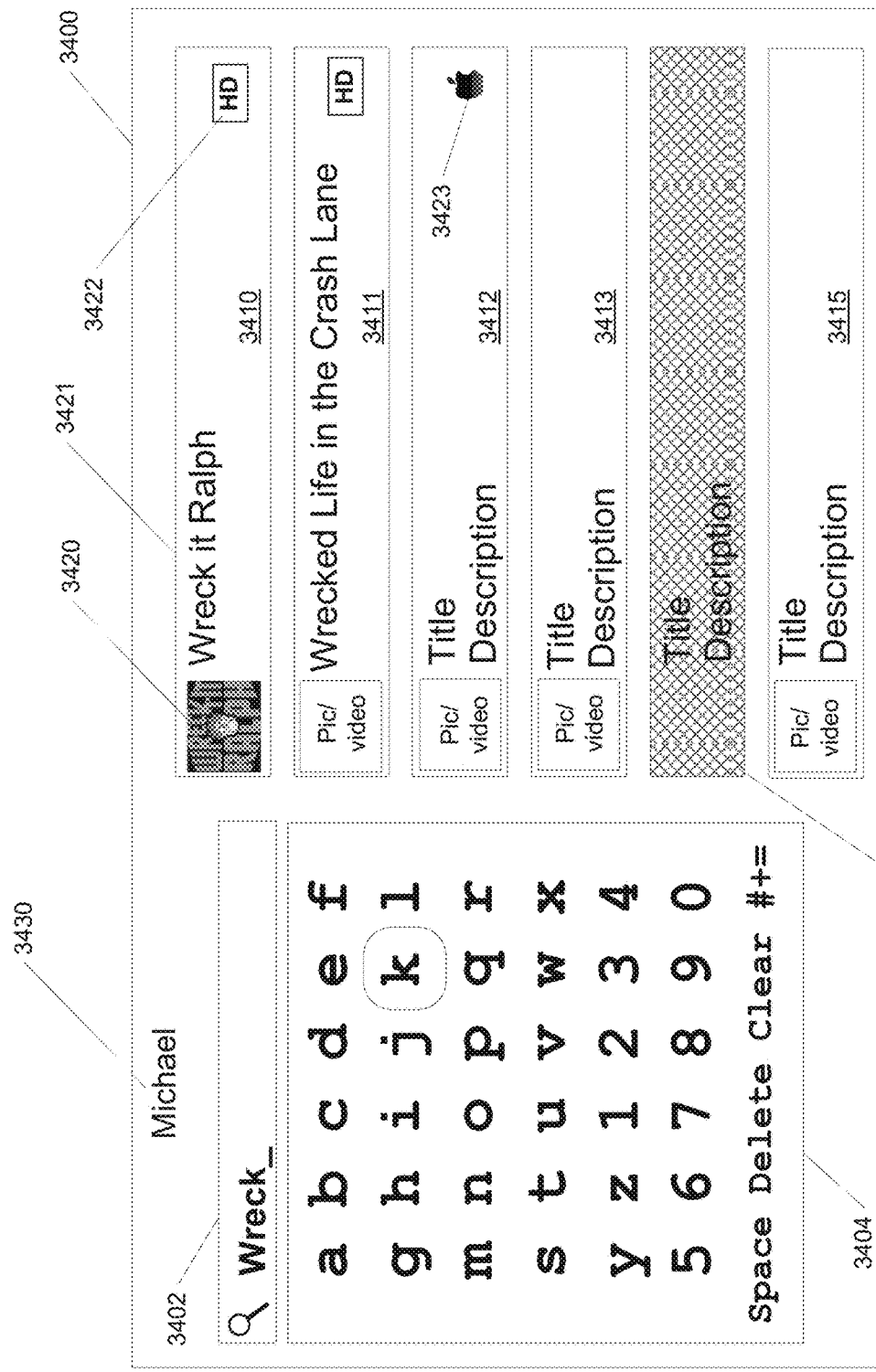
FIG. 34 depicts one embodiment of a video display and user interface.

Finally, FIG. 34 depicts one embodiment of a search screen that may be displayed by selecting the Search category from the side bar. In this example, the current user 3430 is identified. In this example, an input bar 3402 displays characters which have been selected from the selection box 3404. Matching entries 3410-3415 are displayed to the right with video/picture/artwork 3426 and title 3421. Other suitable information may be displayed as desired, such as quality/resolution indicator 3422. Other indications, such as indicator 3423, may be included which identify content available for purchase. In various embodiments, search results may be limited based on a current user's settings. For example, if the current user has a setting which does not permit viewing of R rated content, then such content may not be returned in the search results. In other embodiments, such content may be returned in the results, but may not be accessible. For example, in FIG. 34 the item 3414 is greyed out to indicate it is not accessible by the current user. Various ways of indicating a particular item is not accessible are possible and are contemplated. In addition, such restricted items may exclude some information from the search results. For example, the description and/or title may not be displayed. Numerous alternative embodiments for presentation of search screen and results are possible and are contemplated.

Figure 35:
FIG. 35 depicts one embodiment of a video display and user interface.

FIG. 35 illustrates an embodiment in which a display 3500 with video content has a "Recommendations for Dad" portion 3510. This portion 3510 may be at least in part an overlay generated by a set-top box with the incorporation of selected images 3520, 3530 and 3540 received via the primary provider. In various embodiments, the video content may continue playing while the overlay 3510 is presented. In other cases, the video content could be automatically paused. Additionally, the overlays may be semi-transparent to allow the underlying video to be partially visible. Numerous such alternatives are possible and are contemplated in this and other displays described herein. The display of such recommendations may be initiated directly via a remote control key press, or could be initiated automatically (e.g., at the end of the television program currently displayed).

In the example shown, a variety of content is depicted as being recommended for the current user (Dad) and currently available for viewing. As may be appreciated, recommendations for different users may differ according to their indicated preferences, viewing history, friend's likes, and so on. In particular, three different television series are shown as being available—5 seasons of Mad Men, 2 seasons of Game of Thrones, and 1 season of Suburgatory. As the primary provider is generally configured to record all video data all of the time as previously discussed, all video content related to these series is available for the viewer. As previously discussed, depiction as to what is available to a viewer may be based on what the viewer currently has subscriptions to view or anything available for provision by the primary provider. In this case, anything may be displayed as available for the viewer.

In the embodiment shown, each of the displayed series in the recommendation portion 3510 represent selectable items by the viewer. Assuming the viewer selects the Mad Men item 3520, in one embodiment a "landing page" for the Mad Men television series may be presented which provides the user access to additional information and episodes of the show.

Figure 36:
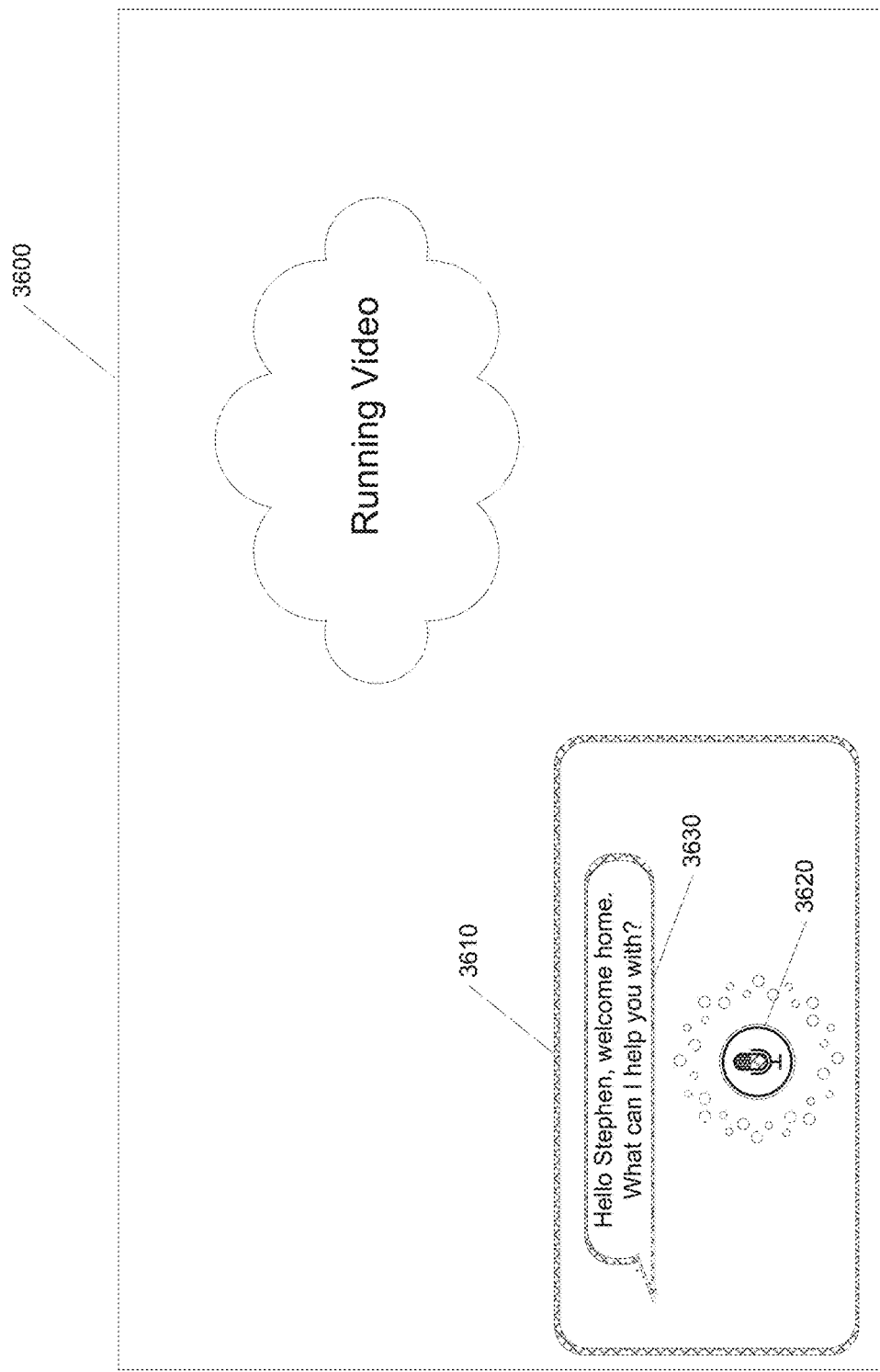
FIG. 36 depicts one embodiment of a video display and user interface.

Turning now to FIG. 36, one embodiment of a multi-user system is illustrated. In the embodiment shown, a display device 3600 is currently showing video content. Also shown is a text box 3610 associated with an intelligent voice assistant such as Apple Computer's Siri. In various embodiments, the voice assistant may provide audible speech in addition to such a text box. In some embodiment the text box may not be shown, or the text box may be shown without audible speech. Such features may be configured as desired by the user. In the example shown, an icon 3620 associated with the voice assistant is also depicted. In the example shown, the voice assistant asks an identified user a question 3630. In some embodiments, the user may initiate interaction with the voice assistant via a voice prompt, remote control button, or otherwise.

In the example shown, the voice assistant states "Hello Stephen, welcome home. What can I help you with?" Here the voice assistant has identified the user as Stephen. Such identification may be based on the device being used to access the system. For example, the user may be using a smart phone or tablet computer associated with the user Stephen. Alternatively, the user may have logged in or provided a fingerprint to a remote control device that identifies the user as Stephen. In addition, the voice assistant states "welcome home". In various embodiments, the display device (e.g., set top box or television) is configured to detect various devices (such as described above in FIGS. 14-15) and associate those devices with particular users. For example, a user's smart phone may be registered with the television system. In such embodiment, the system may be configured to detect the presence or absence of such a device. In some cases, location information for the device may be used by the television system to track the location of a user. For example, both a registered smart phone and the user's set top box may be network connected (e.g., to the Internet). In such embodiments, the device and set top box may be configured to communicate via the network. In this manner, the set top box may be able to access or otherwise receive location information for the smart phone. Alternatively, the set top box may download such information when the smart phone comes into close proximity to the set top box (e.g., at home). Numerous such methods for obtaining the location information are possible and are contemplated.

Given such embodiments, the voice assistant (associated with the system) may determine the user has been absent from the home and has now returned. In this manner, the voice assistant is able to provide relevant conversational speech such as—welcome home." It is noted that the voice assistant may further key of the obtained location information. For example, the location information may show the user was at a movie theater for 2 hours and then Miguel's restaurant prior to returning home. In such a case, the voice assistant can use this information to generate conversational speech such as—"Hello Stephen, welcome home. Hope you enjoyed the movie and the food at Miguel's. What movie did you see?." In reply, the user could give the name of the movie. Based on the user's identification of the movie that was viewed, the voice assistant could then identify related information to offer to the user. For example, the voice assistant may reply—"Oh, the performance by Mike Myers got good reviews in that movie. Would you like to see some other movies he is in?"

Figure 37:
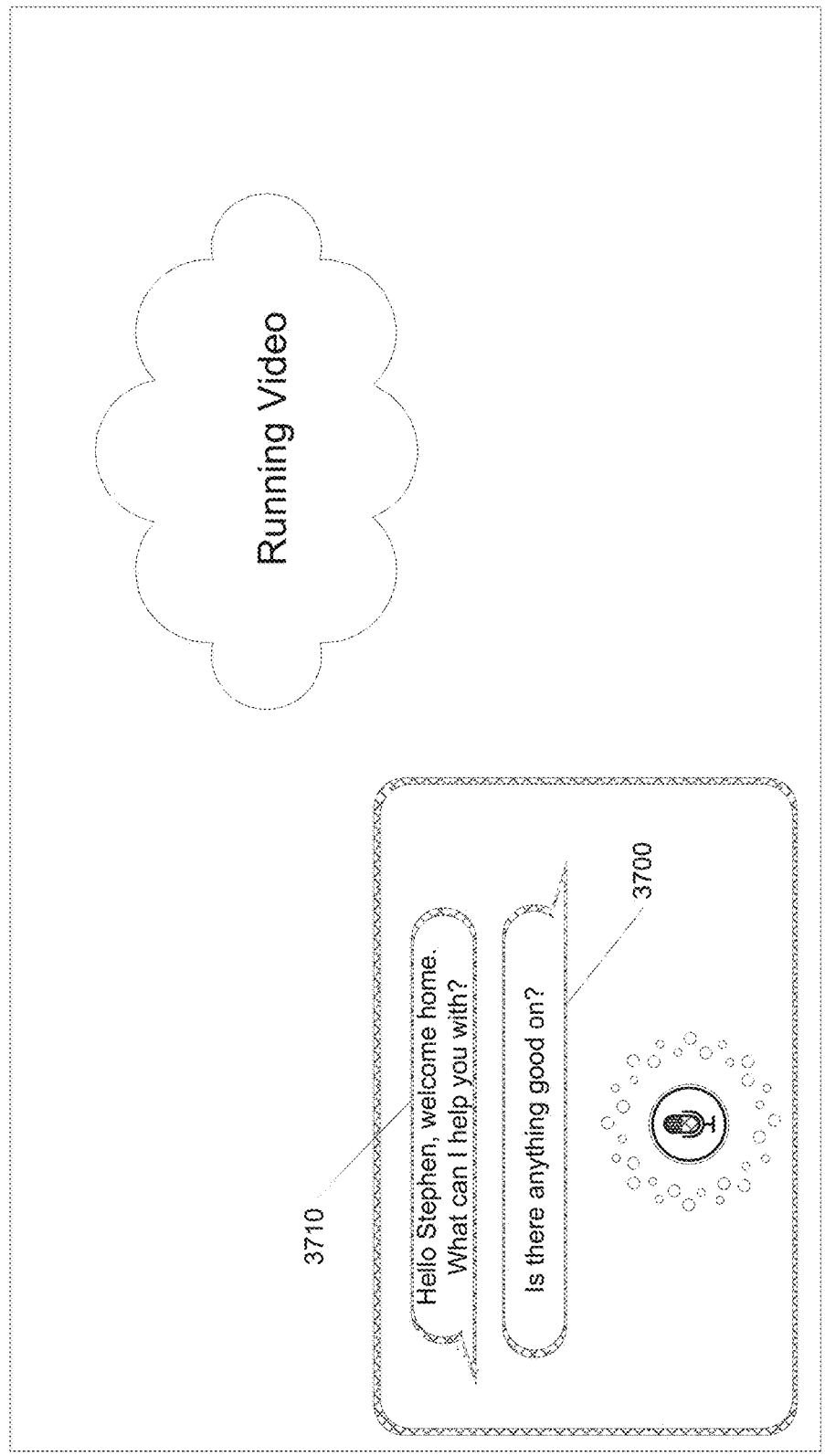
FIG. 37 depicts one embodiment of a video display and user interface.

In the example of FIG. 37, the user replies 3700 (e.g., via voice or text input)—"Is there anything good on?" As the user has not identified any specific content, the system may refer to the user's viewing history, profile, friend's likes and so on, to make some recommendations to the user. In these examples, the text box expands to accommodate the conversation text with older items moving up 3710 and newer items at the bottom. Of course, the presentation could be otherwise.

Figure 38:
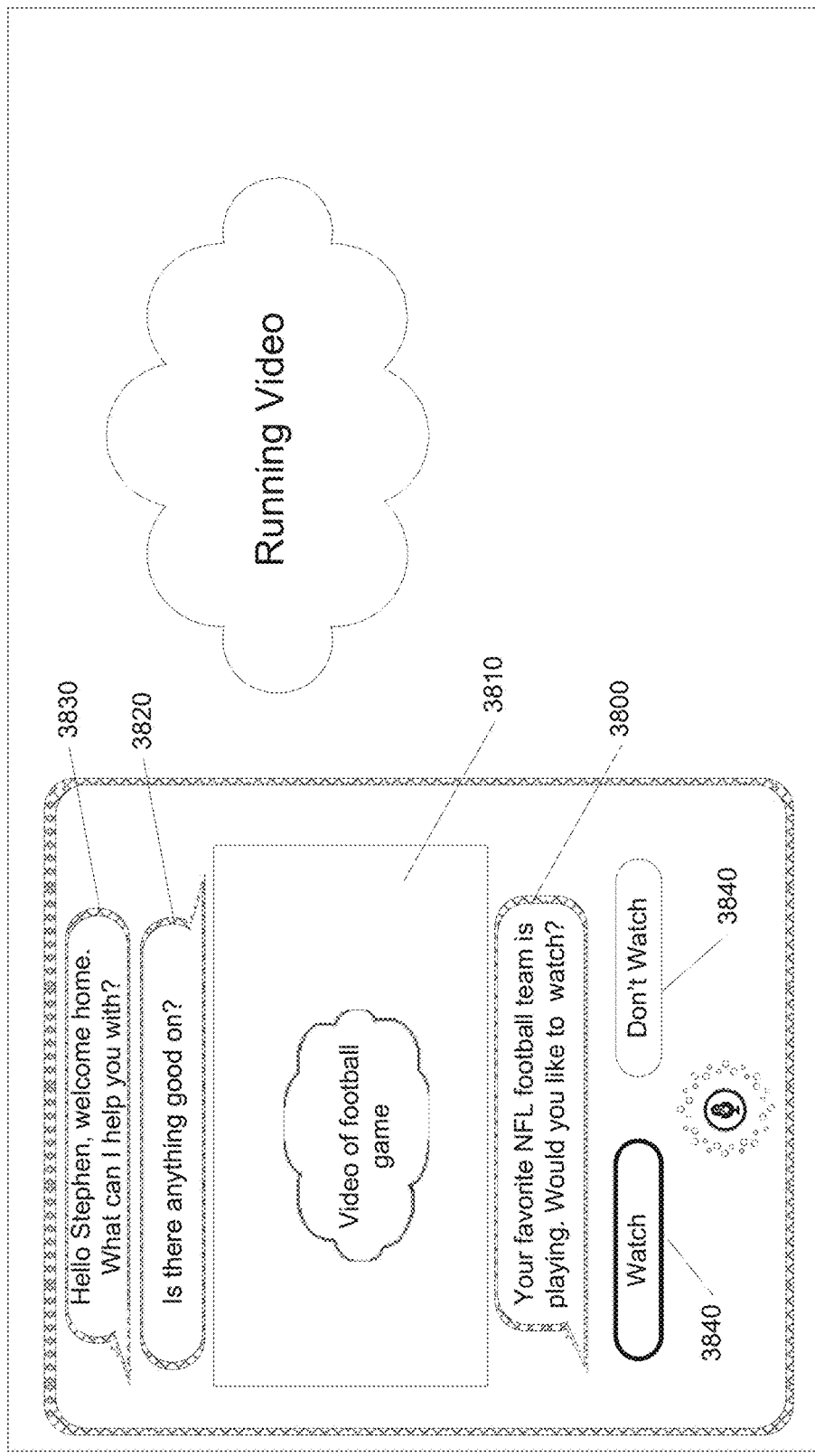
FIG. 38 depicts one embodiment of a video display and user interface.
Figure 39:
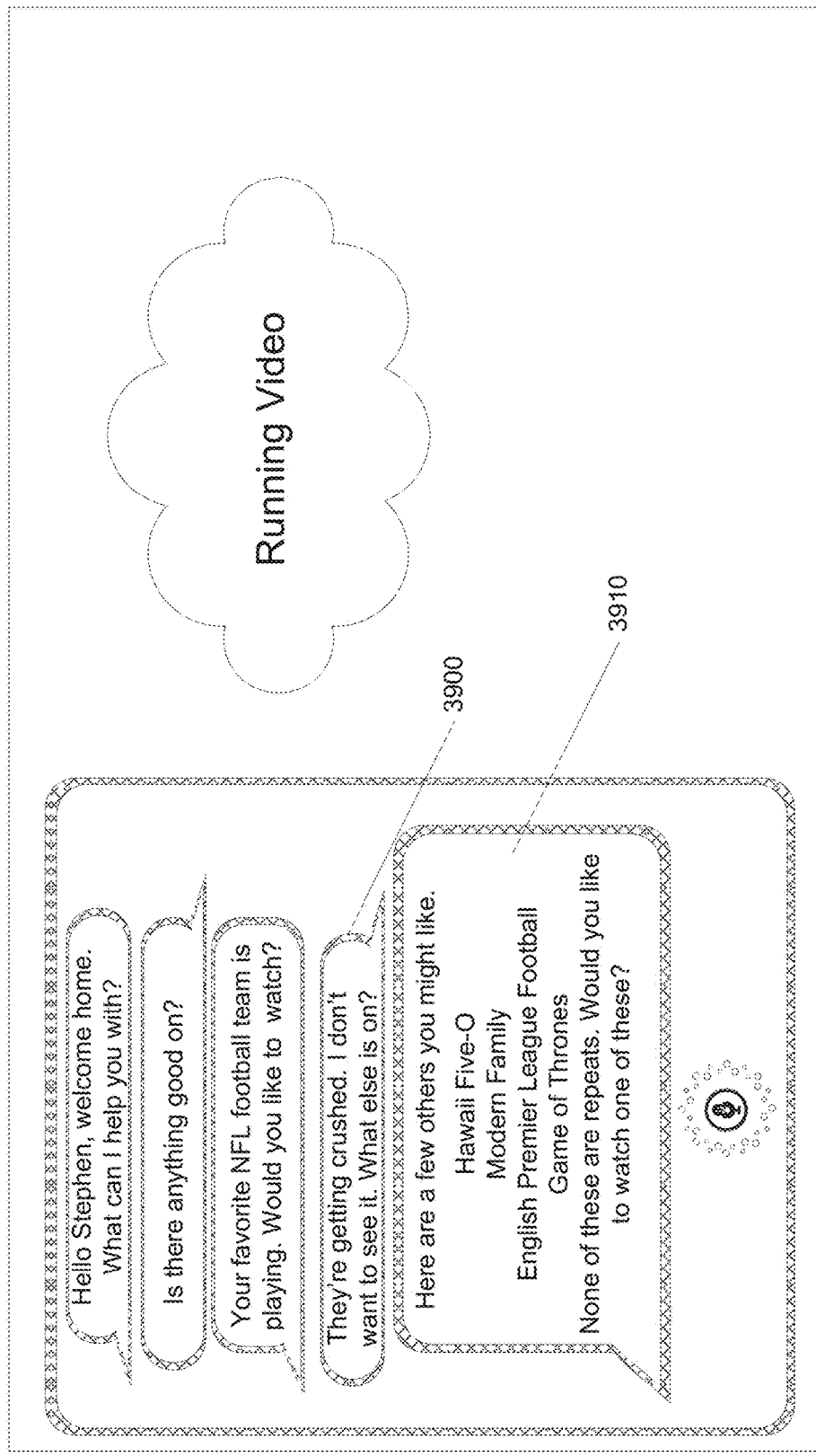
FIG. 39 depicts one embodiment of a video display and user interface.
Figure 40:
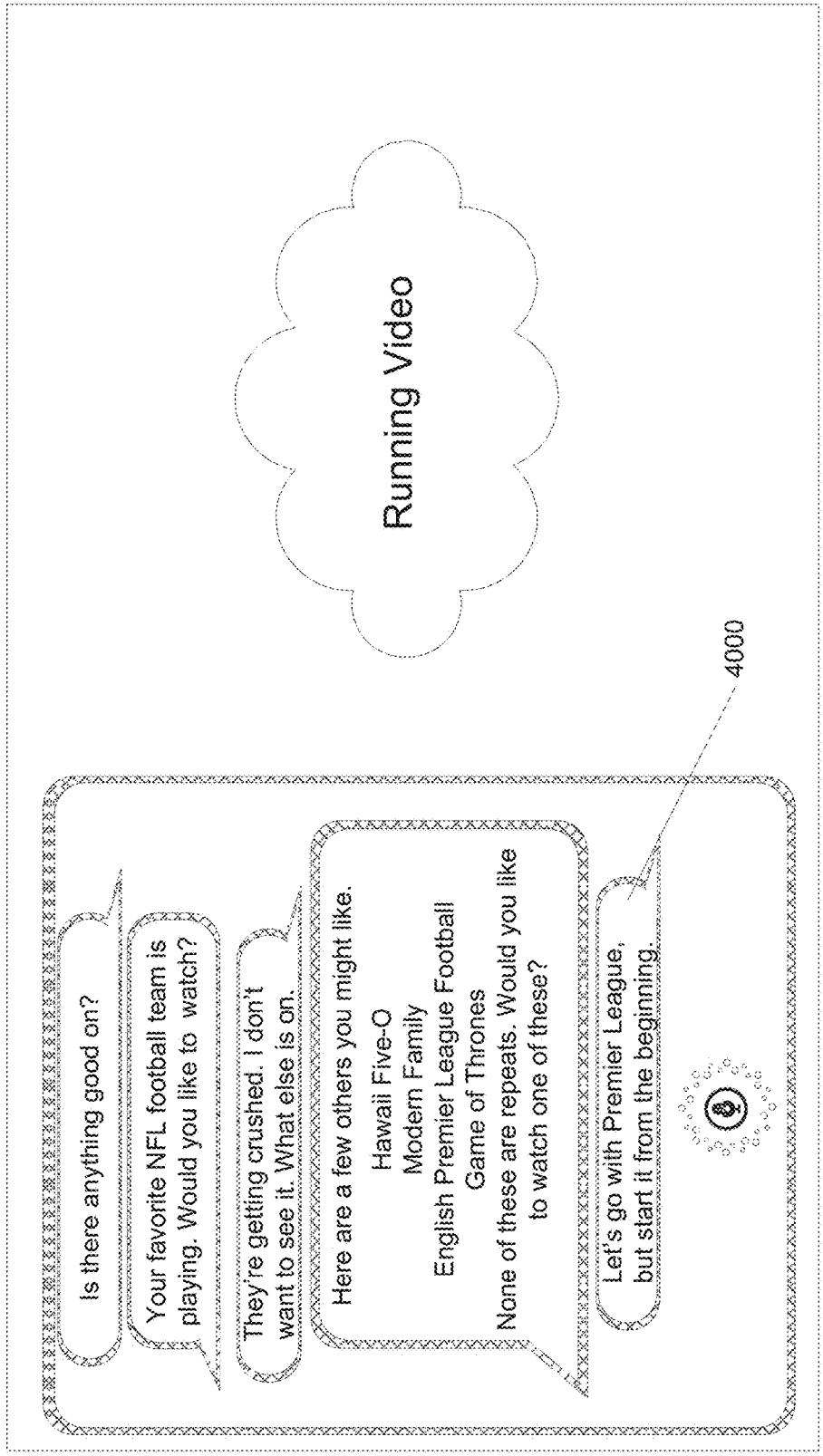
FIG. 40 depicts one embodiment of a video display and user interface.
Figure 41:
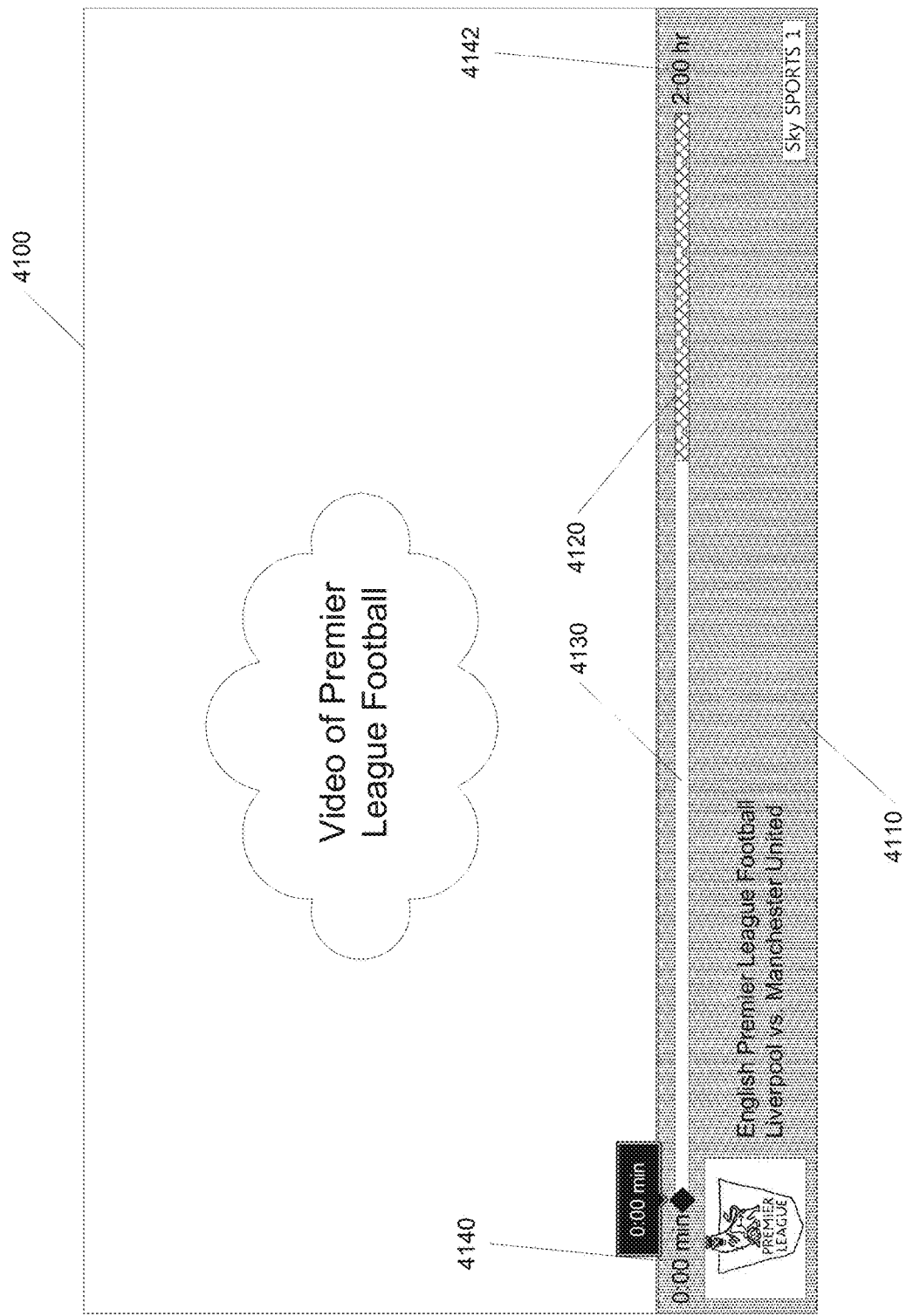
FIG. 41 depicts one embodiment of a video display and user interface.

Having identified selected recommendations, in FIG. 38 the voice assistant responds 3800—"Your favorite NFL football team is playing. Would you like to watch?" Also shown is a video presentation of the game 3810. Selectable elements Watch 3840 and Don't Watch 3840 may also be presented to permit remote control input if desired. In FIG. 39, the user replies 3900—"They're getting crushed. I don't want to see it. What else is on?" The voice assistant responds with additional offerings 3910. In this case, the voice assistant names Hawaii Five-O, Modern Family, English Premier League Football, and Game of Thrones. The voice assistant also provides further available information—"None of these are repeats. Would you like to watch one of these?" In FIG. 40 the user replies 4000—"Let's go with Premier League, but start if from the beginning." In this manner, the user has made a selection, but also provided instruction as to how it is to be presented—"start it from the beginning." Finally, in response to the user's instructions, the system tunes to the football game and starts from the beginning as shown in the display 4100. In this example, a channel bar 4110 may be temporarily shown that identifies the content (English Premier League Football, Liverpool vs. Manchester United), the network (Sky SPORTS 1), and scheduled duration 2:00 hours. A scrubber bar is also presented showing which portion of the football game has already been broadcast 4130 (lighter colored) and which remains to be broadcast (4120). It is noted that the entire conversation presented in the foregoing may be with speech only. Other embodiments may use text input, or a combination of speech and text input.

Figure 42:
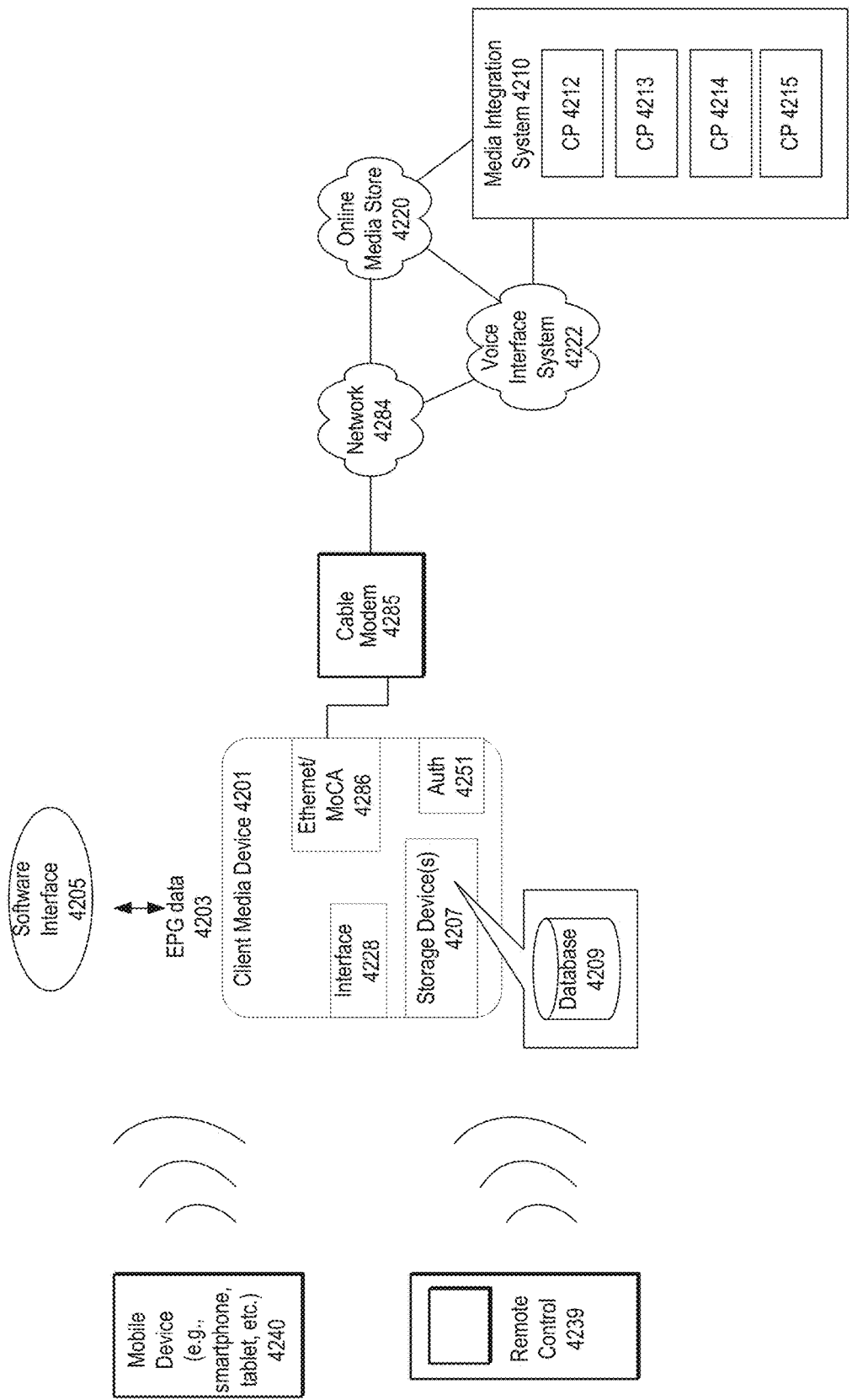
FIG. 42 depicts one embodiment of a media content delivery system.

FIG. 42 illustrates a system including a client media device 4201 configured to receive media content via a network 4284. The client media device may provide the media content to one or more display devices, audio devices, or other devices enabling a user of the client device to view, hear, or otherwise use the media content.

The client media device 4201 may communicate with an online media store 4220 through the network 4284 to receive information for displaying a user interface showing various media content available for delivery to the client media device. Each piece of media content may be referred to as a "media production." Examples of media productions include various kinds of movies and films, television programs, music videos, albums/songs, etc. In general, a given media production may include any kind of content that includes video and/or audio information.

In some embodiments the online media store may be coupled to or may include a media integration system 4210 which integrates media productions from a plurality of third-party content provider systems, such as the content providers CP 4212-4215. Each of the content provider systems may be managed by or affiliated with any kind of company or organization, such as cable or satellite television providers, television networks or channels, movie studios, sporting leagues, news organizations, music labels, online media services, etc. Thus, the user interface displayed by the client media device may aggregate the media productions available from many different content providers or sources, and may provide a convenient way for the user to see the content from different providers in an integrated view.

In various embodiments the client media device may communicate with the online media store 4220 through any kind of network 4284. The network 4284 may include any type of network or combination of networks. For example, the network 4284 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks.

In the illustrated embodiment the client media device is coupled to the network 4284 via Ethernet hardware or Multimedia over Coax Alliance (MoCA) hardware 4286, which in turn couples to a cable modem 4285. In other embodiments the client media device may be coupled to the network 4284 via any other type of wired or wireless connection medium or device. For example, wired mediums may include Ethernet, fiber channel, a modem, etc. Wireless connection mediums may include a wireless connection using a wireless communication protocol such as IEEE 802.11 (wireless Ethernet), a modem link through a cellular service, a satellite link, etc.

The client media device may include one or more storage devices 4207 configured to store data. At least one of the storage devices 4207 may include non-volatile memory configured to persistently store data. In various embodiments the storage device(s) may include one or more disk drives, solid state drives, flash memory devices, optical storage devices, or any other kinds of devices for storing data. In some embodiments the storage device(s) may also include various kinds of volatile memory, such as random access memory (RAM), e.g., synchronous dynamic RAM (SDRAM), static RAM (SRAM), etc.

Electronic Programming Guide (EPG) data 4203 may be periodically delivered to the client media device 4201 via a software interface 4205. The software interface 4205 may include any kind of programming interface or messaging interface that enables the client media device to communicate with an external system to receive the EPG data 4203 or other data. As one example, the software interface 4205 may include a JavaScript Object Notation (JSON) interface. As another example, the software interface 4205 may include a URL-based interface that enables the client media device to perform various functions or exchange information by referencing uniform resource locators (URLs) with particular parameters embedded in them.

The client media device may store the EPG data 4203 on the storage device(s) 4207. For example, one or more databases 4209 may be stored on the storage device 4207, and the EPG data 4203 may be stored in one or more of the databases. The EPG data 4203 may include information about television programming, such as the listing of programs, their scheduled times, the channel lineup, images associated with the programs, etc. The EPG data 4203 may be customized for the particular user of the client media device 4201. For example, if the user subscribes to some subscription-based content providers, but not others, then the EPG data 4203 may include information for only the programs or media productions offered by the providers to which the user subscribes.

The database(s) 4209 may also store other information, such as personalization information for the user(s) of the client media device 4201. The personalization information may include the user's favorite programs or channels, list of recently viewed content, stored play positions for various media content, watch lists, bookmarks, etc.

The client media device may be configured to receive user input from a remote control device 4239 via an interface 4228. The remote control device may use infrared communication, Bluetooth communication, or any of various other kinds of wireless or wired communication techniques to transmit signals to the client media device indicating the user input.

In some embodiments the client media device may be configured to communicate with the media integration system 4210 and/or the online media store 4220 through a voice interface system 4222. For example, in some embodiments the remote control device or the client media device may include a microphone device 4224 that receives speech from the user, e.g., where the speech includes commands, requests, questions, etc. The client media device may convert the speech into digital packets for transmission over the network 84 to the voice interface system 4222. The voice interface system may perform speech recognition to recognize the user's commands or questions. The voice interface system may communicate with the online media store 4220 and/or the media integration system 4210 to pass the user's commands or questions on to them via an interface. The online media store 4220 and/or the media integration system 4210 may then generate information in response to the user's commands or questions and return it to the client media device (or return it to the voice interface system, which may then forward it to the client media device). For example, the user may request to lookup a television program having a certain title or actor, and the system may return information that the client media device uses to display a list of programs matching the title or actor.

In various embodiments the information transmitted from the online media store or voice interface system to the client media device may include any kind of information useable by the client media device to display information regarding the media content available for delivery to the client media device. For example, in some embodiments the system may utilize Extensible Markup Language (XML) code or other markup language code which describes the information to be displayed. The client media device may parse the XML code and display a user interface based on the described information. In some embodiments the system may also transmit graphics files or video feeds which the client media device may incorporate into the user interface.

In some embodiments the client media device may also communicate with a mobile computing device 4240, e.g., where the user may hold the mobile device. For example, the mobile device 4240 may be a handheld computing device, wearable computing device, or other portable computing device. Examples of mobile devices include smartphones, tablet computers, personal digital assistants, portable music players, handheld game devices, wearable computers (e.g., glasses watches), etc. In some embodiments the user may control the client media device 4201 using the mobile device 4240, e.g., using the mobile device 4240 as a remote control. In some embodiments the client media device may also forward the media content received from the online media store 4220 or media integration system 4210 to the mobile device 4240, e.g., so that it can be displayed on a display device included in the mobile device 4240. In other embodiments the mobile device 4240 may communicate directly with the online media store 4220 and/or the media integration system 4210, e.g., without going through the client media device 4201 as an intermediate. The client media device may also be included as a component within the mobile device in some embodiments, and/or the mobile device may be configured to perform the functions described with reference to the client media device.

The client media device may be configured to utilize digital rights management (DRM) techniques to ensure that the user is authorized to receive and view selected media content. For example, the client media device may include an authorization module 4251 configured to communicate with one or more remote servers to implement the digital rights management for the media content. In various embodiments the client media device may communicate with servers associated with any of various systems or organizations in order to implement the digital rights management, such as one or more servers in the online media store 4220 or the content provider systems whose media productions are integrated by the media integration system 4210.

In the above discussion, various embodiments have been described. It is noted that these embodiments may be combined in any manner desired. In various embodiments, program instructions of a software application may be used to implement the methods and/or mechanisms previously described. The program instructions may be stored on a computer readable storage medium. Numerous types of storage media are available. The storage medium may be accessible by a computer or other processing device during use to provide the program instructions and accompanying data to the computer or device for program execution.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    at an electronic device that controls display of a user interface on a display device based on inputs detected via one or more input devices:
    while displaying, on the display device, first video content, receiving a first input, via the one or more input devices, corresponding to a request to provide voice input to the electronic device;
    in response to receiving the first input, causing display, on the display device, of a voice input user interface element overlaid on the first video content while the first video content continues playing on the electronic device, the voice input user interface element including a prompt for receiving voice input from a user; and
    while the voice input user interface element is displayed, on the display device, overlaid on the first video content while the first video content continues playing on the display device:
        receiving a first voice input via the one or more input devices, wherein the first voice input corresponds to a request to display, on the display device, information about a plurality of content items available for viewing on the electronic device; and
        in response to receiving the first voice input, concurrently displaying, on the display device:
            the first video content playing on the electronic device;
            information about a first content item, including a title of the first content item, corresponding to the first voice input and available for viewing on the electronic device; and
            information about a second content item, including a title of the second content item, corresponding to the first voice input and available for viewing on the electronic device,
            wherein the first and second content items are selected for display based on one or more characteristics of the first voice input.

2. The method of claim 1, wherein the voice input user interface element includes a graphical representation of a microphone.

3. The method of claim 1, further comprising in response to receiving the voice input, removing the prompt for voice input from the voice input user interface element, and adding an indication of the content of the first voice input to the voice input user interface element.

4. The method of claim 3, wherein the indication of the content of the first voice input is a graphical representation of one or more words recognized in the first voice input.

5. The method of claim 1, further comprising in response to receiving the voice input, changing a size of the voice input user interface element in response to receiving the first voice input.

6. The method of claim 1, further comprising:
while displaying the information about the first content item and the second content item, receiving a second voice input that corresponds to a request to view the second content item on the electronic device; and
in response to receiving the second voice input, playing the second content item on the electronic device.

7. The method of claim 1, including while displaying the information about the first content item and the second content item, receiving a second voice input, and in response to receiving the second voice input, displaying, on the display device, information corresponding to the second voice input.

8. The method of claim 7, wherein displaying, on the display device, the information corresponding to the second voice input includes maintaining display, on the display device, of the information corresponding to the information about the first content item and the second content item.

9. The method of claim 1, wherein the first input corresponding to the request to provide the voice input to the electronic device comprises a button press on the input device functioning as a remote control of the electronic device.

10. The method of claim 9, wherein the input device functioning as the remote control of the electronic device is a phone.

11. The method of claim 9, wherein the input device functioning as the remote control of the electronic device includes a microphone on which the first voice input is received.

12. The method of claim 1, wherein the voice input user interface element is overlaid proximate to an edge of the user interface while a central region of the displayed first video content remains visible.

13. The method of claim 1, wherein the first content item has a user-controllable playback position such that the first content item can be played on the electronic device at a plurality of playback positions.

14. The method of claim 1, wherein the information about the first content item and the information about the second content item are concurrently displayed with the first video content playing on the electronic device without displaying, on the display, information about a source of the first content item and without displaying, on the display, information about a source of the second content item.

15. The method of claim 1, wherein the information about the first content item and the information about the second content item are displayed with an indication of a repeat status of the content items.

16. An electronic device comprising:
one or more processors configured to control display of a user interface on a display device based on inputs received via an input device configured to control the electronic device, wherein the input device is separate and distinct from the electronic device and the display device;
memory; and
one or more programs, wherein the one or more programs are stored in the memory and configured to be executed by the one or more processors, the one or more programs including instructions for:
while displaying, on the display device, first video content, receiving a first input, via the one or more input devices, corresponding to a request to provide voice input to the electronic device;
in response to receiving the first input, causing display, on the display device, of a voice input user interface element overlaid on the first video content while the first video content continues playing on the electronic device, the voice input user interface element including a prompt for receiving voice input from a user; and
while the voice input user interface element is displayed, on the display device, overlaid on the first video content while the first video content continues playing on the display device:
receiving a first voice input via the one or more input devices, wherein the first voice input corresponds to a request to display, on the display device, information about a plurality of content items available for viewing on the electronic device; and
in response to receiving the first voice input, concurrently displaying, on the display device:
the first video content playing on the electronic device;
information about a first content item, including a title of the first content item, corresponding to the first voice input and available for viewing on the electronic device; and
information about a second content item, including a title of the second content item, corresponding to the first voice input and available for viewing on the electronic device,
wherein the first and second content items are selected for display based on one or more characteristics of the first voice input.

17. The electronic device of claim 16, wherein the voice input user interface element includes a graphical representation of a microphone.

18. The electronic device of claim 16, wherein the one or more programs further include instructions for, in response to receiving the voice input, removing the prompt for voice input from the voice input user interface element, and adding an indication of the content of the first voice input to the voice input user interface element.

19. The electronic device of claim 18, wherein the indication of the content of the first voice input is a graphical representation of one or more words recognized in the first voice input.

20. The electronic device of claim 16, wherein the one or more programs further include instructions for, in response to receiving the voice input, changing a size of the voice input user interface element in response to receiving the first voice input.

21. The electronic device of claim 16, wherein the one or more programs further include instructions for:
while displaying the information about the first content item and the second content item, receiving a second voice input that corresponds to a request to view the second content item on the electronic device; and
in response to receiving the second voice input, playing the second content item on the electronic device.

22. The electronic device of claim 16, wherein the one or more programs further include instructions for, while displaying the information about the first content item and the second content item, receiving a second voice input, and in response to receiving the second voice input, displaying, on the display device, information corresponding to the second voice input.

23. The electronic device of claim 22, wherein displaying, on the display device, the information corresponding to the second voice input includes maintaining display, on the display device, of the information corresponding to the information about the first content item and the second content item.

24. The electronic device of claim 16, wherein the first input corresponding to the request to provide the voice input to the electronic device comprises a button press on the input device functioning as a remote control of the electronic device.

25. The electronic device of claim 24, wherein the input device functioning as the remote control of the electronic device is a phone.

26. The electronic device of claim 24, wherein the input device functioning as the remote control of the electronic device includes a microphone on which the first voice input is received.

27. The electronic device of claim 16, wherein the voice input user interface element is overlaid proximate to an edge of the user interface while a central region of the displayed first video content remains visible.

28. The electronic device of claim 16, wherein the first content item has a user-controllable playback position such that the first content item can be played on the electronic device at a plurality of playback positions.

29. The electronic device of claim 16, wherein the information about the first content item and the information about the second content item are concurrently displayed with the first video content playing on the electronic device without displaying, on the display, information about a source of the first content item and without displaying, on the display, information about a source of the second content item.

30. The electronic device of claim 16, wherein the information about the first content item and the information about the second content item are displayed with an indication of a repeat status of the content items.

31. A non-transitory computer readable storage medium storing one or more programs, the one or more programs comprising instructions, which when executed by one or more processors of an electronic device configured to control display of a user interface on a display device based on inputs received via an input device configured to control the electronic device, wherein the input device is separate and distinct from the electronic device and the display device, cause the electronic device to:
while displaying, on the display device, first video content, receive a first input, via the one or more input devices, corresponding to a request to provide voice input to the electronic device;
in response to receiving the first input, cause display, on the display device, of a voice input user interface element overlaid on the first video content while the first video content continues playing on the electronic device, the voice input user interface element including a prompt for receiving voice input from a user; and
while the voice input user interface element is displayed, on the display device, overlaid on the first video content while the first video content continues playing on the display device:
receive a first voice input via the one or more input devices, wherein the first voice input corresponds to a request to display, on the display device, information about a plurality of content items available for viewing on the electronic device; and
in response to receiving the first voice input, concurrently display, on the display device:
the first video content playing on the electronic device;
information about a first content item, including a title of the first content item, corresponding to the first voice input and available for viewing on the electronic device; and
information about a second content item, including a title of the second content item, corresponding to the first voice input and available for viewing on the electronic device,
wherein the first and second content items are selected for display based on one or more characteristics of the first voice input.

32. The non-transitory computer readable storage medium of claim 31, wherein the voice input user interface element includes a graphical representation of a microphone.

33. The non-transitory computer readable storage medium of claim 31, wherein the one or more programs further include instructions for receiving the voice input, removing the prompt for voice input from the voice input user interface element, and adding an indication of the content of the first voice input to the voice input user interface element.

34. The non-transitory computer readable storage medium of claim 33, wherein the indication of the content of the first voice input is a graphical representation of one or more words recognized in the first voice input.

35. The non-transitory computer readable storage medium of claim 31, wherein the one or more programs further include instructions, which when executed by the one or more processors, cause the electronic device to, in response to receiving the voice input, change a size of the voice input user interface element in response to receiving the first voice input.

36. The non-transitory computer readable storage medium of claim 31, wherein the one or more programs further include instructions, which when executed by the one or more processors, cause the electronic device to:
while displaying the information about the first content item and the second content item, receive a second voice input that corresponds to a request to view the second content item on the electronic device; and
in response to receiving the second voice input, play the second content item on the electronic device.

37. The non-transitory computer readable storage medium of claim 31, wherein the one or more programs further include instructions, which when executed by the one or more processors, cause the electronic device to, while displaying the information about the first content item and the second content item, receive a second voice input, and in response to receiving the second voice input, display, on the display device, information corresponding to the second voice input.

38. The non-transitory computer readable storage medium of claim 37, wherein displaying, on the display device, the information corresponding to the second voice input includes maintaining display, on the display device, of the information corresponding to the information about the first content item and the second content item.

39. The non-transitory computer readable storage medium of claim 31, wherein the first input corresponding to the request to provide the voice input to the electronic device comprises a button press on the input device functioning as a remote control of the electronic device.

40. The non-transitory computer readable storage medium of claim 39, wherein the input device functioning as the remote control of the electronic device is a phone.

41. The non-transitory computer readable storage medium of claim 39, wherein the input device functioning as the remote control of the electronic device includes a microphone on which the first voice input is received.

42. The non-transitory computer readable storage medium of claim 31, wherein the voice input user interface element is overlaid proximate to an edge of the user interface while a central region of the displayed first video content remains visible.

43. The non-transitory computer readable storage medium of claim 31, wherein the first content item has a user-controllable playback position such that the first content item can be played on the electronic device at a plurality of playback positions.

44. The non-transitory computer readable storage medium of claim 31, wherein the information about the first content item and the information about the second content item are concurrently displayed with the first video content playing on the electronic device without displaying, on the display, information about a source of the first content item and without displaying, on the display, information about a source of the second content item.

45. The non-transitory computer readable storage medium of claim 31, wherein the information about the first content item and the information about the second content item are displayed with an indication of a repeat status of the content items.

* * * * *